US010100052B2

(12) United States Patent
Aktoudianakis et al.

(10) Patent No.: US 10,100,052 B2
(45) Date of Patent: Oct. 16, 2018

(54) COMPOUNDS FOR THE TREATMENT OF HEPATITIS B VIRUS INFECTION

(71) Applicant: Gilead Sciences, Inc., Foster City, CA (US)

(72) Inventors: Evangelos Aktoudianakis, Redwood City, CA (US); Eda Canales, San Mateo, CA (US); Elbert Chin, San Mateo, CA (US); Kevin S. Currie, North Bend, WA (US); Ashley Anne Katana, North Olmsted, OH (US); Darryl Kato, San Francisco, CA (US); John O. Link, San Francisco, CA (US); Samuel E. Metobo, Newark, CA (US); Roland D. Saito, San Mateo, CA (US); Zheng-Yu Yang, Palo Alto, CA (US)

(73) Assignee: GILEAD SCIENCES, INC., Foster City, CA (US)

( * ) Notice: Subject to any disclaimer, the term of this patent is extended or adjusted under 35 U.S.C. 154(b) by 0 days.

(21) Appl. No.: 15/596,844

(22) Filed: May 16, 2017

(65) Prior Publication Data

US 2017/0342068 A1    Nov. 30, 2017

Related U.S. Application Data

(60) Provisional application No. 62/342,689, filed on May 27, 2016, provisional application No. 62/362,710, filed on Jul. 15, 2016.

(51) Int. Cl.
C07D 471/04    (2006.01)

(52) U.S. Cl.
CPC .................................. *C07D 471/04* (2013.01)

(58) Field of Classification Search
CPC .................................................... C07D 471/04
See application file for complete search history.

(56) References Cited

U.S. PATENT DOCUMENTS

| 9,845,325 B2 | 12/2017 | Fu et al. |
| 2015/0210682 A1 | 7/2015 | Han et al. |
| 2016/0122344 A1 | 5/2016 | Han et al. |
| 2016/0176899 A1 | 6/2016 | Schwitter et al. |
| 2016/0207914 A9 | 7/2016 | Han et al. |
| 2017/0157133 A1 | 6/2017 | Yang et al. |
| 2017/0342069 A1 | 11/2017 | Han et al. |

FOREIGN PATENT DOCUMENTS

| WO | WO-2015113990 A1 | 8/2015 |
| WO | WO-2015173164 A1 | 11/2015 |
| WO | WO-2016012470 A1 | 1/2016 |
| WO | WO-2016023877 A1 | 2/2016 |
| WO | WO-2016071215 A1 | 5/2016 |
| WO | WO-2016102438 A1 | 6/2016 |
| WO | WO-2016107832 A1 | 7/2016 |
| WO | WO-2016107833 A1 | 7/2016 |
| WO | WO-2016113273 A1 | 7/2016 |
| WO | WO-2016128335 A1 | 8/2016 |
| WO | WO-2016146598 A1 | 9/2016 |
| WO | WO-2016177655 A1 | 11/2016 |
| WO | WO-2016202721 A1 | 12/2016 |
| WO | WO-2017013046 A1 | 1/2017 |
| WO | WO-2017016921 A1 | 2/2017 |
| WO | WO-2017016960 A1 | 2/2017 |
| WO | WO-2017017042 A1 | 2/2017 |
| WO | WO-2017017043 A1 | 2/2017 |
| WO | WO-2017064156 A1 | 4/2017 |
| WO | WO-2017076791 A1 | 5/2017 |
| WO | WO-2017102648 A1 | 6/2017 |
| WO | WO-2017108630 A1 | 6/2017 |
| WO | WO-2017114812 A1 | 7/2017 |
| WO | WO-2017140821 A1 | 8/2017 |
| WO | WO-2017-205115 A1 | 11/2017 |
| WO | WO-2017216685 A1 | 12/2017 |
| WO | WO-2017216686 A1 | 12/2017 |
| WO | WO-2018019297 A1 | 2/2018 |
| WO | WO-2018022282 A1 | 2/2018 |

OTHER PUBLICATIONS

Fecik, R. et al. (2005) "Chiral DNA Gyrase inhibitors.3. Probing the chiral preference of the active site of DNA Gyrase. Synthesis of 10-fluoro-6methyl-6,7-dihydro-9-piperaziny1-2H-benzo[a]guinolizin-20-one-3-carboxylic acid analogues" *Journal of Medicinal Chemistry* 48(4):1229-1236.

Geng, Chang-An et al. (2013) "Small-Molecule Inhibitors for the Treatment of Hepatitis B Virus Documented in Patents" *Mini-Reviews in Medicinal Chemistry* 13(5):749-776.

Xu, B. et al. (2014) "A facile synthesis of novel tricyclic 4-pyridones" *Tetrahedron Letters* 55(52):7194-7197.

*Primary Examiner* — Paul V Ward
(74) *Attorney, Agent, or Firm* — Joel Silver

(57) ABSTRACT

The present disclosure generally relates to compounds and pharmaceutical compositions which may be used in methods of treating a hepatitis B virus infection.

9 Claims, No Drawings

COMPOUNDS FOR THE TREATMENT OF HEPATITIS B VIRUS INFECTION

CROSS-REFERENCE TO RELATED APPLICATIONS

This application claims priority benefit to U.S. Application Ser. No. 62/342,689, filed May 27, 2016 and U.S. Application Ser. No. 62/362,710, filed Jul. 15, 2016, the disclosure of which is herein incorporated by reference in its entirety.

BACKGROUND

The hepatitis B virus (HBV) is an enveloped, partially double-stranded DNA virus. HBV is an infectious disease that affects the liver. Initial symptoms of infection may include vomiting, jaundice, lethargy, dark urine, and abdominal pain. Chronic HBV infection can result in cirrhosis and liver cancer. Currently available therapies can inhibit replication of the virus and minimize liver damage; however, there are no currently available therapies that can clear an HBV infection.

HBV surface antigen (HBsAg) is a protein located in the HBV envelope. It allows HBV virion entry into host cells by binding to the hepatocyte sodium-taurocholate cotransporting polypeptide (NTCP) receptor. HBsAg may also function as a tolerogen, suppressing immune elimination of infected cells. Total HBsAg loss and seroconversion are rarely achieved in chronically infected patients. Inhibiting HBsAg secretion and/or production is thus believed to be a strategy for the treatment of HBV infection, including chronic HBV infection. (Wieland, S. F. & F. V. Chisari, *J. Virol.* (2005), 79, 9369-80; Woltman et al. *PLoS One* (2011), 6, e15324; Op den Brouw et al. *Immunology* (2009b), 126, 280-89).

BRIEF SUMMARY

The present disclosure provides compounds of Formula (I):

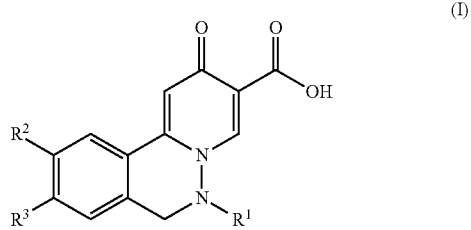

wherein:
  $R^1$ is selected from $C_{1-6}$alkyl, $C_{1-6}$haloalkyl, $C_{3-8}$cycloalkyl, fused $C_{5-12}$bicycloalkyl, and bridged $C_{4-12}$bicycloalkyl,
    wherein:
      said $C_{1-6}$alkyl is optionally substituted with hydroxyl or $C_{1-6}$alkoxy, and
      said $C_{3-8}$cycloalkyl, fused $C_{5-12}$bicycloalkyl, and bridged $C_{4-12}$bicycloalkyl are optionally substituted with one or two substituents independently selected from halogen, $C_{1-6}$alkyl, and $C_{1-6}$haloalkyl;
  $R^2$ is halogen or $C_{1-6}$alkoxy; and
  $R^3$ is selected from $C_{1-6}$alkoxyC$_{1-6}$alkoxy, $C_{1-6}$haloalkoxyC$_{1-6}$alkoxy, $C_{1-6}$deuteroalkoxyC$_{1-6}$alkoxy, and $C_{3-8}$cycloalkoxyC$_{1-6}$alkoxy;
or a pharmaceutically acceptable salt thereof.

In some embodiments provided herein is a pharmaceutical composition comprising a compound of Formula (I), or a pharmaceutically acceptable salt thereof, and a pharmaceutically acceptable excipient. In some embodiments, the pharmaceutical composition further comprises one or more additional therapeutic agents.

In some embodiments provided herein is a method of inhibiting the production and/or secretion of HBsAg in an individual (e.g. a human) infected with HBV comprising administering a therapeutically effective amount of a compound of Formula (I), or a pharmaceutically acceptable salt thereof, to the individual. In some embodiments, the human is chronically infected with HBV.

In some embodiments provided herein is a method of treating or preventing a HBV infection comprising administering to an individual (e.g. a human) in need thereof a therapeutically effective amount of a compound of Formula (I), or a pharmaceutically acceptable salt thereof. In some embodiments, the individual is chronically infected with HBV. In some embodiments, the methods further comprise administering one or more additional therapeutic agents.

In certain embodiments, a compound of Formula (I), or a pharmaceutically acceptable salt thereof, for use in medical therapy is provided.

In certain embodiments, a compound of Formula (I), or a pharmaceutically acceptable salt thereof, for use in treating or preventing HBV infection is provided In certain embodiments, the use of a compound of Formula (I), or a pharmaceutically acceptable salt thereof, for the manufacture of a medicament for treating or preventing HBV infection is provided.

Kits comprising a compound of Formula (I), or pharmaceutically acceptable salts thereof, or pharmaceutical compositions of the foregoing are also provided. Articles of manufacture comprising a unit dose of the compounds, or pharmaceutically acceptable salts thereof, of the foregoing are also provided. Methods of preparing compounds of the present disclosure are also provided.

DETAILED DESCRIPTION

The description below is made with the understanding that the present disclosure is to be considered as an exemplification of the claimed subject matter, and is not intended to limit the appended claims to the specific embodiments illustrated. The present disclosure provides reference to various embodiments and techniques. However, it should be understood that many variations and modifications may be made while remaining within the spirit and scope of the present disclosure. The headings used throughout this disclosure are provided for convenience and are not to be construed to limit the claims in any way. Embodiments illustrated under any heading may be combined with embodiments illustrated under any other heading.

Unless defined otherwise, all technical and scientific terms used herein have the same meaning as commonly understood by one of ordinary skill in the art. A dash at the front or end of a chemical group is a matter of convenience to indicate the point of attachment to a parent moiety; chemical groups may be depicted with or without one or more dashes without losing their ordinary meaning. A prefix such as "$C_{u-v}$" or ($C_u$-$C_v$) indicates that the following group has from u to v carbon atoms, where u and v are integers. For example, "$C_{1-6}$alkyl" indicates that the alkyl group has from 1 to 6 carbon atoms.

Unless the context requires otherwise, throughout the present specification and claims, the word "comprise" and variations thereof, such as, "comprises" and "comprising" are to be construed in an open, inclusive sense, that is as "including, but not limited to".

As used herein, "alkyl" is a linear or branched saturated monovalent hydrocarbon. Examples of alkyl groups include, but are not limited to, methyl (Me, —CH$_3$), ethyl (Et, —CH$_2$CH$_3$), 1-propyl (n-Pr, n-propyl, —CH$_2$CH$_2$CH$_3$), 2-propyl (i-Pr, i-propyl, —CH(CH$_3$)$_2$), 1-butyl (n-Bu, n-butyl, —CH$_2$CH$_2$CH$_2$CH$_3$), 2-methyl-1-propyl (i-Bu, i-butyl, —CH$_2$CH(CH$_3$)$_2$), 2-butyl (s-Bu, s-butyl, —CH(CH$_3$)CH$_2$CH$_3$), 2-methyl-2-propyl (t-Bu, t-butyl, —C(CH$_3$)$_3$), 1-pentyl (n-pentyl, —CH$_2$CH$_2$CH$_2$CH$_2$CH$_3$), 2-pentyl (—CH(CH$_3$)CH$_2$CH$_2$CH$_3$), 3-pentyl (—CH(CH$_2$CH$_3$)$_2$), 2-methyl-2-butyl (—C(CH$_3$)$_2$CH$_2$CH$_3$), 3-methyl-2-butyl (—CH(CH$_3$)CH(CH$_3$)$_2$), 3-methyl-1-butyl (—CH$_2$CH$_2$CH(CH$_3$)$_2$), 2-methyl-1-butyl (—CH$_2$CH(CH$_3$)CH$_2$CH$_3$), 1-hexyl (—CH$_2$CH$_2$CH$_2$CH$_2$CH$_2$CH$_3$), 2-hexyl (—CH(CH$_3$)CH$_2$CH$_2$CH$_2$CH$_3$), 3-hexyl (—CH(CH$_2$CH$_3$)(CH$_2$CH$_2$CH$_3$)), 2-methyl-2-pentyl (—C(CH$_3$)$_2$CH$_2$CH$_2$CH$_3$), 3-methyl-2-pentyl (—CH(CH$_3$)CH(CH$_3$)CH$_2$CH$_3$), 4-methyl-2-pentyl (—CH(CH$_3$)CH$_2$CH(CH$_3$)$_2$), 3-methyl-3-pentyl (—C(CH$_3$)(CH$_2$CH$_3$)$_2$), 2-methyl-3-pentyl (—CH(CH$_2$CH$_3$)CH(CH$_3$)$_2$), and 2,3-dimethyl-2-butyl (—C(CH$_3$)$_2$CH(CH$_3$)$_2$), 3,3-dimethyl-2-butyl (—CH(CH$_3$)C(CH$_3$)$_3$.

The term "halo" or "halogen" as used herein refers to fluoro (—F), chloro (—Cl), bromo (—Br) and iodo (—I).

The term "haloalkyl" as used herein refers to an alkyl as defined herein, wherein one or more hydrogen atoms of the alkyl are independently replaced by a halogen substituent, which may be the same or different. For example, C$_{1-6}$haloalkyl is a C$_{1-6}$alkyl wherein one or more of the hydrogen atoms of the C$_{1-6}$alkyl have been replaced by a halo substituent. Examples of haloalkyl groups include, but are not limited to, fluoromethyl, fluorochloromethyl, difluoromethyl, difluorochloromethyl, trifluoromethyl, 1,1,1-trifluoroethyl, and pentafluoroethyl.

The term "alkoxy" as used herein refers to a radical of the formula —OR$_A$ where R$_A$ is an alkyl radical as defined above. Non-limiting examples of alkoxy include methoxy, ethoxy, propoxy, and butoxy.

The term "deuteroalkoxy" as used herein refers to a radical of the formula —OR$_A$ wherein R$_A$ is an alkyl radical as defined above, and wherein one or more hydrogens on the alkyl radical are replaced with deuterium.

The term "haloalkoxy" as used herein refers to a radical of the formula —OR$_A$ wherein R$_A$ is an alkyl radical as defined above, and wherein one or more hydrogens on the alkyl radical are replaced with halogen.

The terms "alkoxyalkoxy," "haloalkoxyalkoxy," and "deuteroalkoxyalkoxy" refer to an alkoxy radical that is substituted with alkoxy, haloalkoxy, or deuteroalkoxy, respectively. For illustrative purposes only, a non-limiting example of "alkoxyalkoxy" is

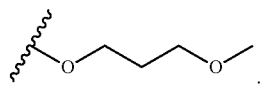 [SMILES: *OCCCOC]

The term "cycloalkyl" or "carbocycle" as used herein refers to a saturated or partially saturated all carbon ring radical. Non-limiting examples of cycloalkyl include cyclopropyl, cyclobutyl, cyclopentyl, cyclopentenyl, and cyclohexyl.

The term "fused bicycloalkyl" as used herein refers to a radical comprising two carbocycles that share a carbon-carbon bond.

The term "bridged bicycloalkyl" as used herein refers to a radical comprising a cycloalkyl ring and an alkylene chain (i.e. —(CH$_2$)$_n$— wherein n is an integer (e.g. 1 to 4)) that is attached at each end to non-adjacent carbon atoms of the cycloalkyl ring. Non-limiting examples of bridged bicycloalkyls include adamantyl, myrtanyl, norbomyl, bicyclo[2.2.1]heptyl, 6,6-dimethylbicyclo[3.1.1]heptyl, bicyclo[3.2.1]octyl, bicyclo[2.2.2]octyl, bicyclo[3.1.0]hexane, bicyclo[2.1.1]hexane, and bicylo[1.1.1.]pentane.

The term "cycloalkoxy" as used herein refers to a radical of the formula —OR$_A$ wherein R$_A$ is a cycloalkyl radical as defined above.

The nomenclature used herein to name the subject compounds is illustrated in the Examples and elsewhere herein.

As used herein, "treatment" or "treating" is an approach for obtaining beneficial or desired results. For purposes of the present disclosure, beneficial or desired results include, but are not limited to, alleviation of a symptom and/or diminishment of the extent of a symptom associated with a disease or condition. In one embodiment, "treatment" or "treating" includes one or more of the following: a) inhibiting the disease or condition (e.g., decreasing one or more symptoms resulting from the disease or condition, and/or diminishing the extent of the disease or condition); b) slowing or arresting the development of one or more symptoms associated with the disease or condition (e.g., stabilizing the disease or condition, delaying the worsening or progression of the disease or condition); and c) relieving the disease or condition, e.g., causing the regression of clinical symptoms, ameliorating the disease state, delaying the progression of the disease, increasing the quality of life, and/or prolonging survival.

As used herein, "prevention" or "preventing" refers to a regimen that protects against the onset of the disease or disorder such that the clinical symptoms of the disease do not develop. Thus, "prevention" relates to administration of a therapy (e.g., administration of a therapeutic substance) to a subject before signs of the disease are detectable in the subject (e.g., administration of a therapeutic substance to a subject in the absence of detectable infectious agent (e.g., virus) in the subject). The subject may be an individual at risk of developing the disease or disorder, such as an individual who has one or more risk factors known to be associated with development or onset of the disease or disorder. Thus, in certain embodiments, the term "preventing HBV infection" refers to administering to a subject who does not have a detectable HBV infection an anti-HBV therapeutic substance. It is understood that the subject for anti-HBV preventative therapy may be an individual at risk of contracting the HBV virus.

As used herein, the term "therapeutically effective amount" or "effective amount" refers to an amount that is effective to elicit the desired biological or medical response, including the amount of a compound that, when administered to a subject for treating a disease, is sufficient to effect such treatment for the disease. The effective amount will vary depending on the particular compound, and characteristics of the subject to be treated, such as age, weight, etc. The effective amount can include a range of amounts. As is understood in the art, an effective amount may be in one or more doses, i.e., a single dose or multiple doses may be required to achieve the desired treatment endpoint. An effective amount may be considered in the context of administering one or more therapeutic agents, and a single agent may be considered to be given in an effective amount if, in conjunction with one or more other agents, a desirable or beneficial result may be or is achieved. Suitable doses of any co-administered compounds may optionally be lowered due to the combined action (e.g., additive or synergistic effects) of the compounds.

As used herein, "co-administration" includes administration of unit dosages of the compounds disclosed herein before or after administration of unit dosages of one or more additional therapeutic agents, for example, administration of the compound disclosed herein within seconds, minutes, or hours of the administration of one or more additional therapeutic agents. For example, in some embodiments, a unit dose of a compound of the present disclosure is administered first, followed within seconds or minutes by administration of a unit dose of one or more additional therapeutic agents. Alternatively, in other embodiments, a unit dose of one or more additional therapeutic agents is administered first, followed by administration of a unit dose of a compound of the present disclosure within seconds or minutes. In some embodiments, a unit dose of a compound of the present disclosure is administered first, followed, after a period of hours (e.g., 1-12 hours), by administration of a unit dose of one or more additional therapeutic agents. In other embodiments, a unit dose of one or more additional therapeutic agents is administered first, followed, after a period of hours (e.g., 1-12 hours), by administration of a unit dose of a compound of the present disclosure.

Also provided herein are pharmaceutically acceptable salts, hydrates, solvates, tautomeric forms, polymorphs, and prodrugs of the compounds described herein. "Pharmaceutically acceptable" or "physiologically acceptable" refer to compounds, salts, compositions, dosage forms and other materials which are suitable for veterinary or human pharmaceutical use.

Compounds described herein may be prepared and/or formulated as pharmaceutically acceptable salts. Pharmaceutically acceptable salts are non-toxic salts of a free base form of a compound that possesses the desired pharmacological activity of the free base. These salts may be derived from inorganic or organic acids or bases. For example, a compound that contains a basic nitrogen may be prepared as a pharmaceutically acceptable salt by contacting the compound with an inorganic or organic acid. Non-limiting examples of pharmaceutically acceptable salts include sulfates, pyrosulfates, bisulfates, sulfites, bisulfites, phosphates, monohydrogen-phosphates, dihydrogenphosphates, metaphosphates, pyrophosphates, chlorides, bromides, iodides, acetates, propionates, decanoates, caprylates, acrylates, formates, isobutyrates, caproates, heptanoates, propiolates, oxalates, malonates, succinates, suberates, sebacates, fumarates, maleates, butyne-1,4-dioates, hexyne-1,6-dioates, benzoates, chlorobenzoates, methylbenzoates, dinitrobenzoates, hydroxybenzoates, methoxybenzoates, phthalates, sulfonates, methylsulfonates, propylsulfonates, besylates, xylenesulfonates, naphthalene-1-sulfonates, naphthalene-2-sulfonates, phenylacetates, phenylpropionates, phenylbutyrates, citrates, lactates, γ-hydroxybutyrates, glycolates, tartrates, and mandelates. Lists of other suitable pharmaceutically acceptable salts are found in Remington: The Science and Practice of Pharmacy, 21$^{st}$ Edition, Lippincott Wiliams and Wilkins, Philadelphia, Pa., 2006.

Non-limiting examples of "pharmaceutically acceptable salts" of the compounds disclosed herein also include salts derived from an appropriate base, such as an alkali metal (for example, sodium, potassium), an alkaline earth metal (for example, magnesium), ammonium and $NX_4^+$ (wherein X is $C_1$-$C_4$ alkyl). Also included are base addition salts, such as sodium or potassium salts.

A "stereoisomer" refers to a compound made up of the same atoms bonded by the same bonds but having different three-dimensional structures, which are not interchangeable. The present disclosure contemplates various stereoisomers and mixtures thereof and includes "enantiomers", which refers to two stereoisomers whose molecules are non-superimposable mirror images of one another.

A "tautomer" refers to a proton shift from one atom of a molecule to another atom of the same molecule. The present disclosure includes tautomers of any said compounds.

A "solvate" is formed by the interaction of a solvent and a compound. Solvates of salts of the compounds described herein are also provided. Hydrates of the compounds described herein are also provided.

The term "prodrug" as used herein is a biologically inactive derivative of a drug that upon administration to the human body is converted to the biologically active parent drug according to some chemical or enzymatic pathway.

Compounds

The present disclosure provides compounds of Formula (I):

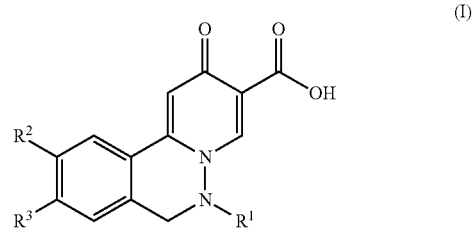

wherein:
R$^1$ is selected from C$_{1-6}$alkyl, C$_{1-6}$haloalkyl, C$_{3-8}$cycloalkyl, fused C$_{5-12}$bicycloalkyl, and bridged C$_{4-12}$bicycloalkyl,
  wherein:
    said C$_{1-6}$alkyl is optionally substituted with hydroxyl or C$_{1-6}$alkoxy, and
    said C$_{3-6}$cycloalkyl, fused C$_{5-12}$bicycloalkyl, and bridged C$_{4-12}$bicycloalkyl are optionally substituted with one or two substituents independently selected from halogen, C$_{1-6}$alkyl, and C$_{1-6}$haloalkyl;
R$^2$ is halogen or C$_{1-6}$alkoxy; and
R$^3$ is selected from C$_{1-6}$alkoxyC$_{1-6}$alkoxy, C$_{1-6}$haloalkoxyC$_{1-6}$alkoxy, C$_{1-6}$deuteroalkoxyC$_{1-6}$alkoxy, and C$_{3-8}$cycloalkoxyC$_{1-6}$alkoxy;
or a pharmaceutically acceptable salt thereof.

In some embodiments, R$^1$ is selected from C$_{1-6}$alkyl, C$_{1-6}$haloalkyl, C$_{3-6}$cycloalkyl, fused C$_{5-12}$bicycloalkyl, and bridged C$_4$-12bicycloalkyl and said C$_{3-6}$cycloalkyl, fused C$_{5-12}$bicycloalkyl, and bridged C$_{4-12}$bicycloalkyl are optionally substituted with one or two substituents independently selected from halogen, C$_{1-6}$alkyl, and C$_{1-6}$haloalkyl.

In some embodiments, R$^1$ is selected from C$_{1-6}$alkyl, C$_{1-6}$haloalkyl, C$_{3-8}$cycloalkyl, fused C$_{5-12}$bicycloalkyl, and bridged C$_{4-12}$bicycloalkyl and said C$_{3-8}$cycloalkyl, fused C$_{5-12}$bicycloalkyl, and bridged C$_{4-12}$bicycloalkyl are optionally substituted with one or two substituents independently selected from halogen, C$_{1-6}$alkyl, and C$_{1-6}$haloalkyl.

In some embodiments of Formula (I), R$^2$ is halogen. In certain embodiments of Formula (I), R$^2$ is chloro. In some embodiments of Formula (I), R$^2$ is methoxy.

In some embodiments of Formula (I), $R^3$ is $C_{1-6}$alkoxy$C_{1-6}$alkoxy. In some embodiments of Formula (I), $R^3$ is selected from

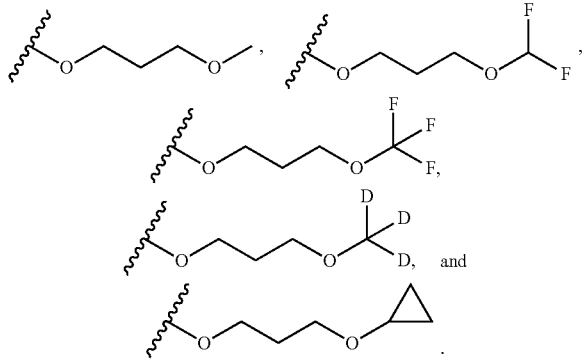

In certain embodiments of Formula (I), $R^3$ is

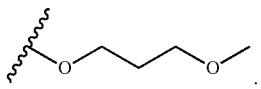 [SMILES: *OCCCOC]

In certain embodiments of Formula (I), $R^3$ is

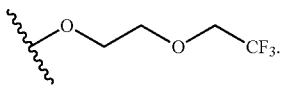 [SMILES: *OCCOCC(F)(F)F]

In some embodiments of Formula (I), $R^1$ is $C_{3-6}$cycoalkyl substituted with $C_{1-6}$haloalkyl. In some embodiments of Formula (I), $R^1$ is $C_{3-6}$cycloalkyl substituted with trifluoromethyl. In some embodiments of Formula (I), $R^1$ is $C_{3-6}$cycloalkyl substituted with $C_{1-6}$alkyl. In some embodiments of Formula (I), $R^1$ is $C_{1-6}$alkyl. In some embodiments of Formula (I), $R^1$ is $C_{3-6}$cycloalkyl is substituted with methyl. In some embodiments of Formula (I), $R^1$ is selected from

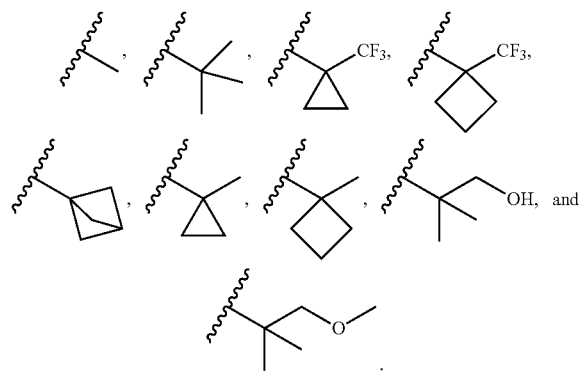

In some embodiments of Formula (I), $R^1$ is selected from

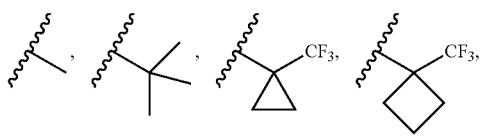

-continued

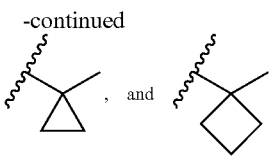

In some embodiments of Formula (I), $R^1$ is

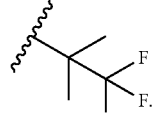

In some embodiments, provided herein is a compound of Formula (I), wherein:
$R^1$ is selected from $C_{1-6}$alkyl, $C_{3-8}$cycloalkyl, and bridged $C_{4-12}$bicycloalkyl, wherein said $C_{3-6}$cycloalkyl is optionally substituted with one or two substituents independently selected from $C_{1-6}$alkyl and $C_{1-6}$haloalkyl;
$R^2$ is halogen; and
$R^3$ is $C_{1-6}$alkoxy$C_{1-6}$alkoxy; or a pharmaceutically acceptable salt thereof.

In some embodiments, provided herein is a compound of Formula (I), wherein:
$R^1$ is $C_{1-6}$alkyl or $C_{1-6}$haloalkyl, wherein said $C_{1-6}$alkyl is optionally substituted with $C_{1-6}$alkoxy;
$R^2$ is halogen or $C_{1-6}$alkoxy; and
$R^3$ is $C_{1-6}$alkoxy$C_{1-6}$alkoxy; or a pharmaceutically acceptable salt thereof.

In some embodiments, provided herein is a compound of Formula (I), wherein:
$R^1$ is selected from $C_{1-6}$alkyl, $C_{3-8}$cycloalkyl, and bridged $C_{4-12}$bicycloalkyl, wherein said $C_{3-6}$cycloalkyl is optionally substituted with one or two substituents independently selected from $C_{1-6}$alkyl and $C_{1-6}$haloalkyl;
$R^2$ is chloro or methoxy; and
$R^3$ is $C_{1-6}$alkoxy$C_{1-6}$alkoxy; or a pharmaceutically acceptable salt thereof.

In some embodiments, provided herein is a compound of Formula (I), wherein:
$R^1$ is selected from $C_{1-6}$alkyl, $C_{3-8}$cycloalkyl, and bridged $C_{4-12}$bicycloalkyl, wherein said $C_{3-6}$cycloalkyl is optionally substituted with one or two substituents independently selected from $C_{1-6}$alkyl and $C_{1-6}$haloalkyl;
$R^2$ is chloro; and
$R^3$ is $C_{1-6}$alkoxy$C_{1-6}$alkoxy; or a pharmaceutically acceptable salt thereof.

In some embodiments, provided herein is a compound of Formula (I), wherein:
$R^1$ is selected from $C_{1-6}$alkyl, $C_{3-8}$cycloalkyl, and bridged $C_{4-12}$bicycloalkyl, wherein said $C_{3-6}$cycloalkyl is optionally substituted with one or two substituents independently selected from $C_{1-6}$alkyl and $C_{1-6}$haloalkyl;
$R^2$ is chloro; and
$R^3$ is

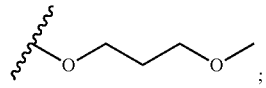

or a pharmaceutically acceptable salt thereof.

In some embodiments, provided herein is a compound of Formula (I), wherein:
$R^1$ is selected from

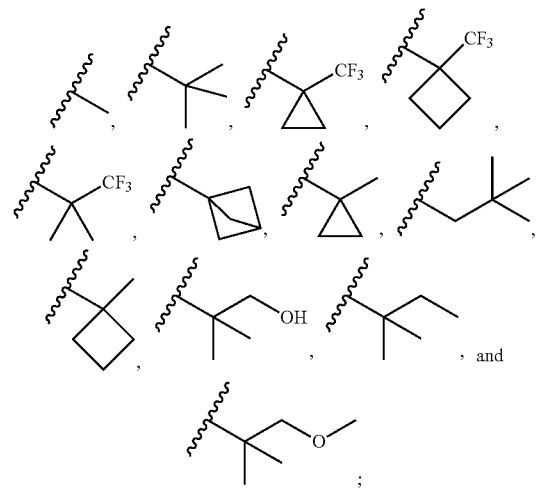

or a pharmaceutically acceptable salt thereof

In some embodiments, provided herein is a compound of Formula (I), wherein:
$R^1$ is selected from

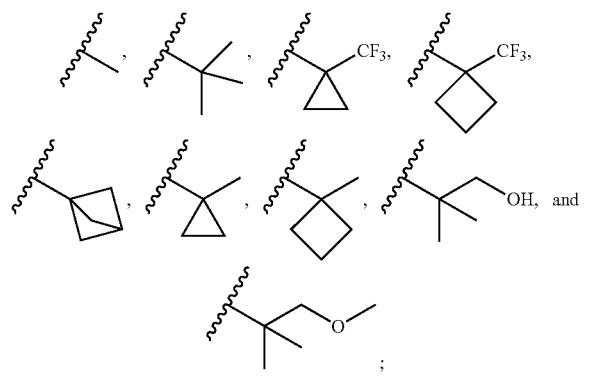

$R^2$ is halogen; and
$R^3$ is $C_{1-6}$alkoxy$C_{1-6}$alkoxy; or a pharmaceutically acceptable salt thereof.

In some embodiments, provided herein is a compound of Formula (I), wherein:
$R^1$ is selected from

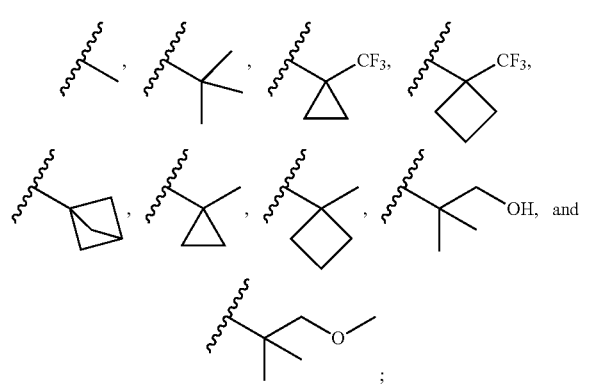

$R^2$ is chloro or methoxy; and
$R^3$ is $C_{1-6}$alkoxy$C_{1-6}$alkoxy; or a pharmaceutically acceptable salt thereof.

In some embodiments, provided herein is a compound of Formula (I), wherein:
$R^1$ is selected from

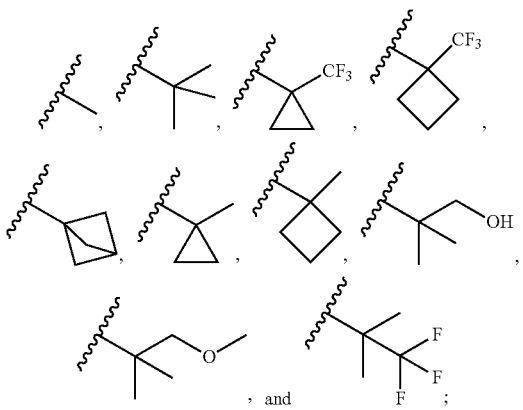

$R^2$ is chloro or methoxy; and
$R^3$ is $C_{1-6}$alkoxy$C_{1-6}$alkoxy; or a pharmaceutically acceptable salt thereof.

In some embodiments, provided herein is a compound of Formula (I), wherein:
$R^1$ is selected from

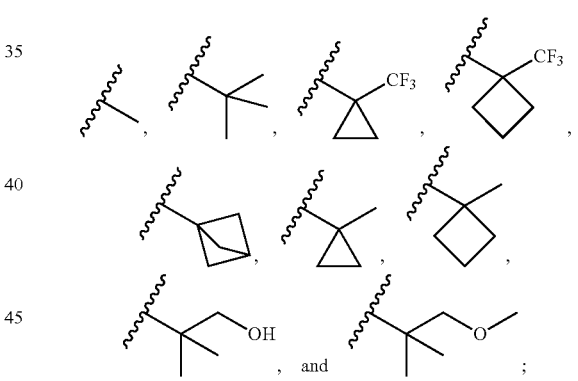

$R^2$ is chloro; and
$R^3$ is $C_{1-6}$alkoxy$C_{1-6}$alkoxy; or a pharmaceutically acceptable salt thereof.

In some embodiments, provided herein is a compound of Formula (I), wherein:
$R^1$ is selected from

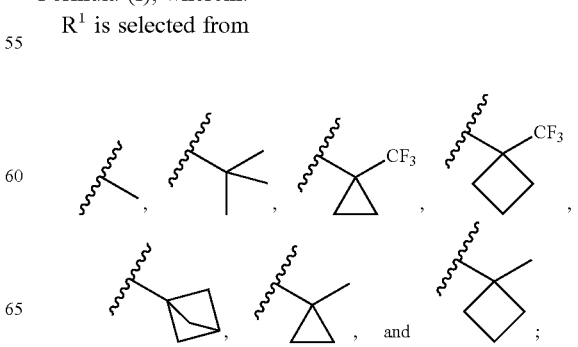

R² is halogen; and
R³ is C₁₋₆alkoxyC₁₋₆alkoxy; or a pharmaceutically acceptable salt thereof.

In some embodiments, provided herein is a compound of Formula (I), wherein:
R¹ is selected from

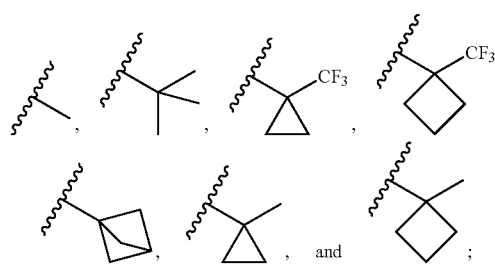

R² is chloro or methoxy; and
R³ is C₁₋₆alkoxyC₁₋₆alkoxy; or a pharmaceutically acceptable salt thereof.

In some embodiments, provided herein is a compound of Formula (I), wherein:
R¹ is selected from

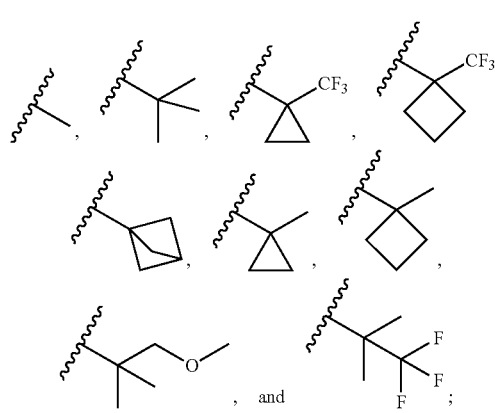

R² is chloro or methoxy; and
R³ is C₁₋₆alkoxyC₁₋₆alkoxy; or a pharmaceutically acceptable salt thereof.

In some embodiments, provided herein is a compound of Formula (I), wherein:
R¹ is selected from

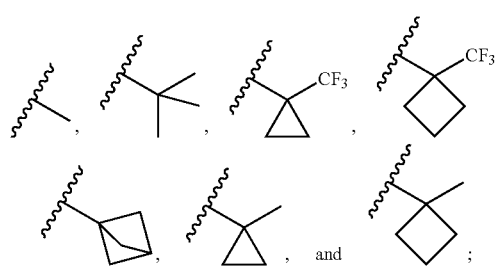

R² is chloro; and
R³ is C₁₋₆alkoxyC₁₋₆alkoxy; or a pharmaceutically acceptable salt thereof.

In some embodiments, provided herein is a compound selected from:

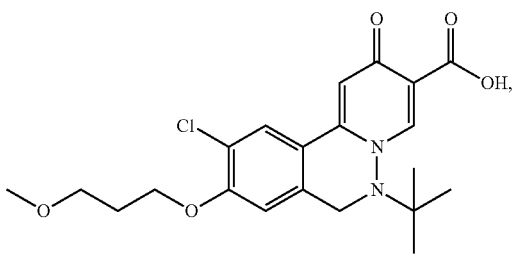 [SMILES: COCCCOc1cc2c(cc1Cl)-c1cc(=O)c(C(=O)O)cn1N(C(C)(C)C)C2]

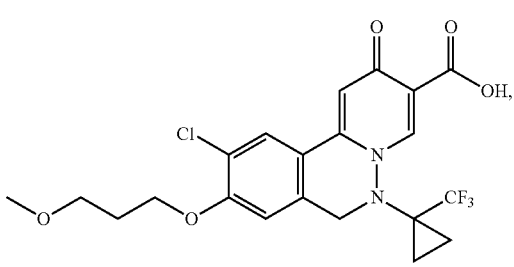

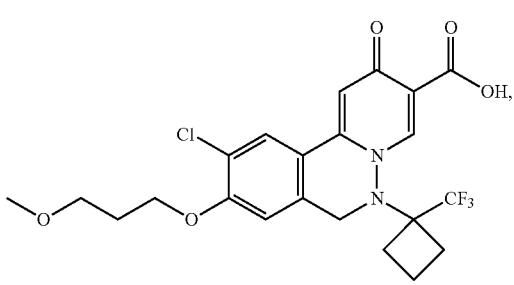

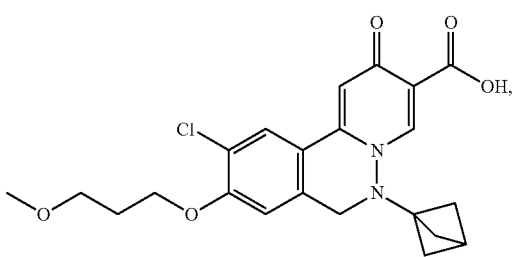

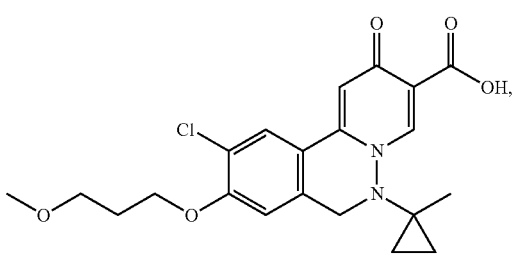

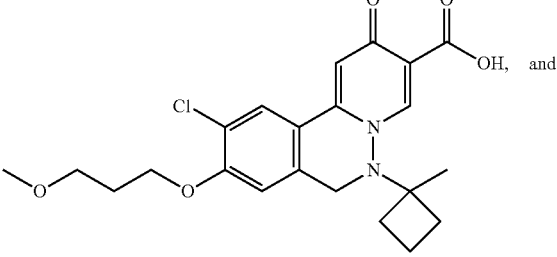

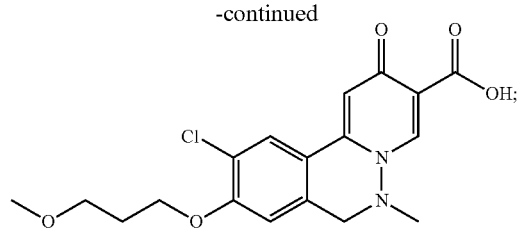
or a pharmaceutically acceptable salt thereof.
In some embodiments, provided herein is a compound selected from:
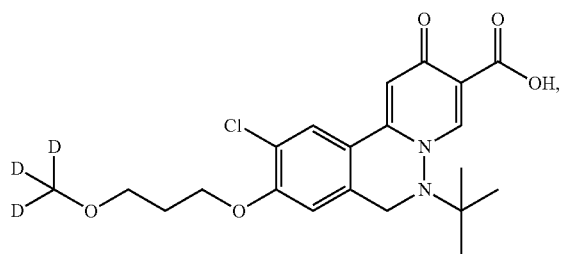
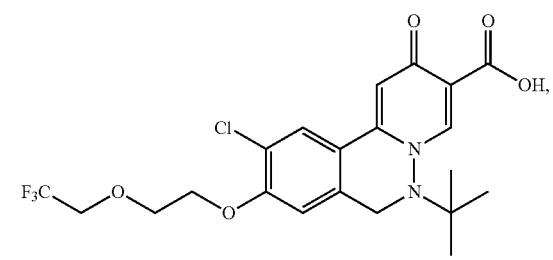
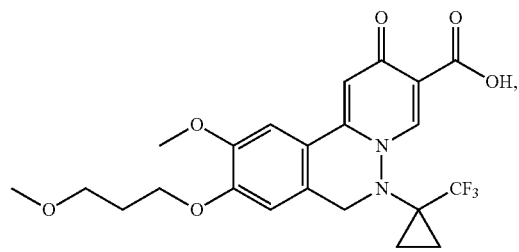
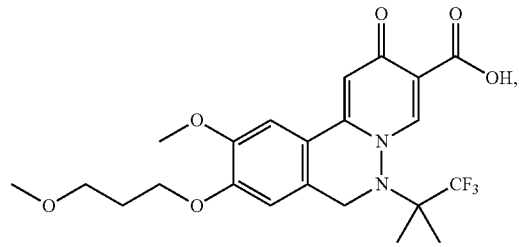
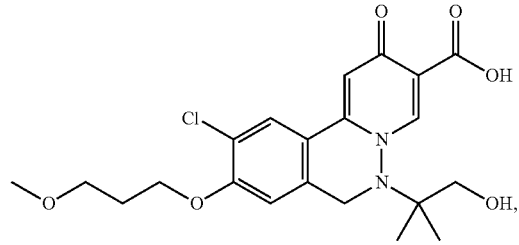
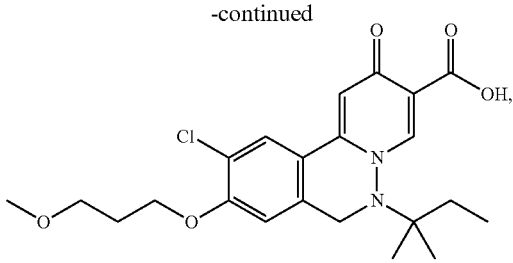
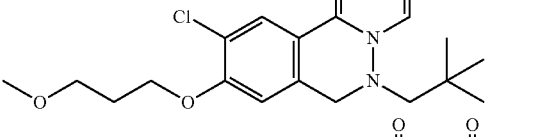
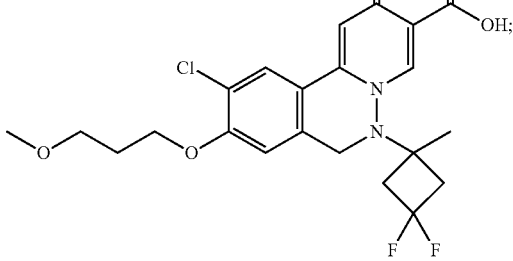
or a pharmaceutically acceptable salt thereof.
In some embodiments, provided herein is a compound selected from:
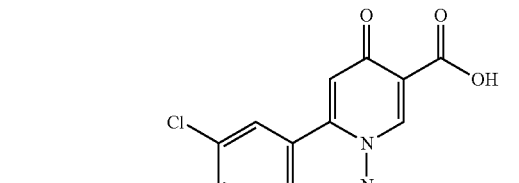
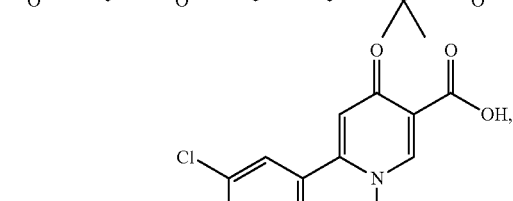
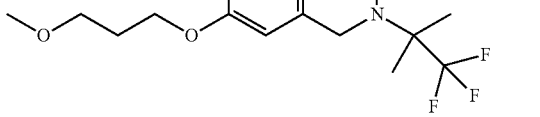
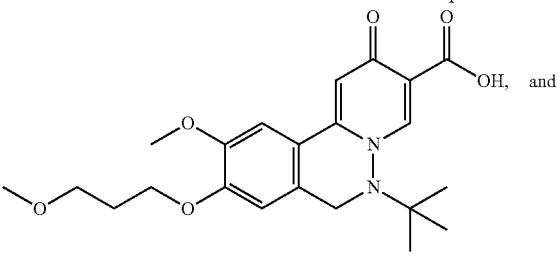

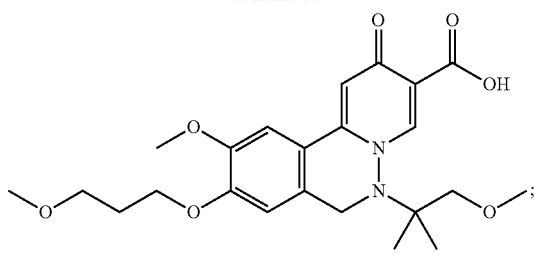

or a pharmaceutically acceptable salt thereof.

In one embodiment, provided herein is a compound having the formula:

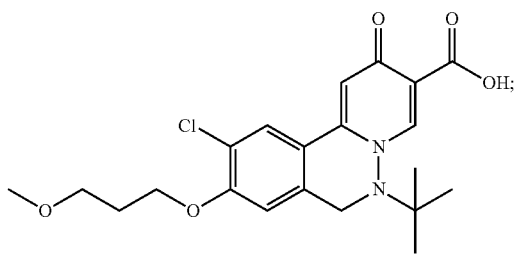

or a pharmaceutically acceptable salt thereof.

In one embodiment, provided herein is a compound having the formula:

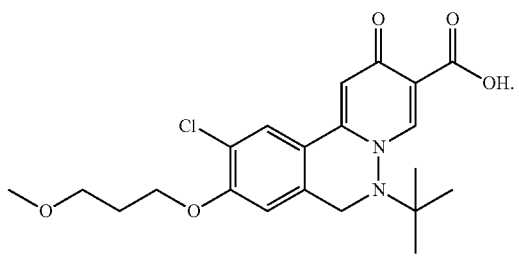 [SMILES: COCCCOc1cc2c(cc1Cl)-c1cc(=O)c(C(=O)O)cn1N(C(C)(C)C)C2]

In one embodiment, provided herein is a compound having the formula:

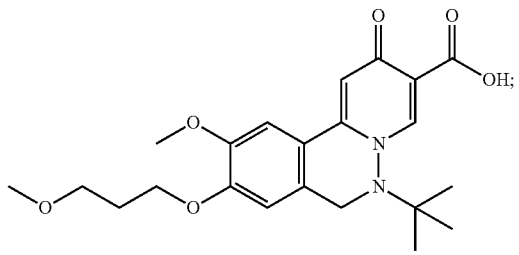 [SMILES: COCCCOc1cc2c(cc1OC)-c1cc(=O)c(C(=O)O)cn1N(C(C)(C)C)C2]

or a pharmaceutically acceptable salt thereof.

In one embodiment, provided herein is a compound having the formula:

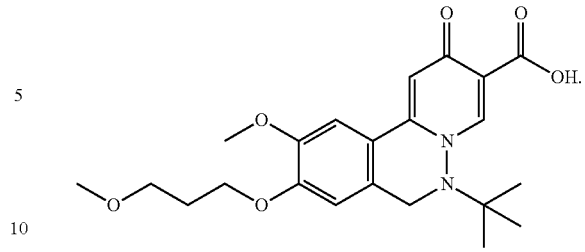

Also provided herein are compounds of Formula (I) in which from 1 to n hydrogen atoms attached to a carbon atom may be replaced by a deuterium atom or D, in which n is the number of hydrogen atoms in the molecule. As known in the art, the deuterium atom is a non-radioactive isotope of the hydrogen atom. Such compounds may increase resistance to metabolism, and thus may be useful for increasing the half-life of the compounds described herein or pharmaceutically acceptable salts, isomers, or mixtures thereof when administered to a mammal. See, e.g., Foster, "Deuterium Isotope Effects in Studies of Drug Metabolism", Trends Pharmacol. Sci., 5(12):524-527 (1984). Such compounds are synthesized by means known in the art, for example by employing starting materials in which one or more hydrogen atoms have been replaced by deuterium.

Examples of isotopes that can be incorporated into the disclosed compounds also include isotopes of hydrogen, carbon, nitrogen, oxygen, phosphorous, fluorine, chlorine, and iodine, such as $^{2}H$, $^{3}H$, $^{11}C$, $^{13}C$, $^{14}C$, $^{13}N$, $^{15}N$, $^{15}O$, $^{17}O$, $^{18}O$, $^{31}P$, $^{32}P$, $^{35}S$, $^{18}F$, $^{36}Cl$, $^{123}I$, and $^{125}I$, respectively. Substitution with positron emitting isotopes, such as $^{11}C$, $^{18}F$, $^{15}O$ and $^{13}N$, can be useful in Positron Emission Topography (PET) studies for examining substrate receptor occupancy. Isotopically-labeled compounds of Formula (I), can generally be prepared by conventional techniques known to those skilled in the art or by processes analogous to those described in the Examples as set out below using an appropriate isotopically-labeled reagent in place of the non-labeled reagent previously employed.

The compounds disclosed herein may contain one or more asymmetric centers and may thus give rise to enantiomers, diastereomers, and other stereoisomeric forms that may be defined, in terms of absolute stereochemistry, as (R)- or (S)- or, as (D)- or (L)-for amino acids. The present disclosure is meant to include all such possible isomers, as well as their racemic and optically pure forms. Optically active (+) and (−), (R)- and (S)-, or (D)- and (L)-isomers may be prepared using chiral synthons or chiral reagents, or resolved using conventional techniques, for example, chromatography and fractional crystallization. Conventional techniques for the preparation/isolation of individual enantiomers include chiral synthesis from a suitable optically pure precursor or resolution of the racemate (or the racemate of a salt or derivative) using, for example, chiral high pressure liquid chromatography (HPLC). Likewise, all tautomeric forms are also intended to be included.

In certain embodiments, the present disclosure provides a pharmaceutical composition comprising a compound of the present disclosure, or a pharmaceutically acceptable salt thereof, and a pharmaceutically acceptable excipient. In certain embodiments, the pharmaceutical composition comprises one or more additional therapeutic agents, as described in more detail below.

Pharmaceutical compositions comprising the compounds disclosed herein, or pharmaceutically acceptable salts thereof, may be prepared with one or more pharmaceutically acceptable excipients which may be selected in accord with ordinary practice. "Pharmaceutically acceptable excipient" includes without limitation any adjuvant, carrier, excipient, glidant, sweetening agent, diluent, preservative, dye/colorant, flavor enhancer, surfactant, wetting agent, dispersing agent, suspending agent, stabilizer, isotonic agent, solvent, or emulsifier which has been approved by the United States Food and Drug Administration as being acceptable for use in humans or domestic animals.

In certain embodiments, pharmaceutical compositions are provided as a solid dosage form, including a solid oral dosage form, such as a tablet. Tablets may contain excipients including glidants, fillers, binders and the like. Aqueous compositions may be prepared in sterile form, and when intended for delivery by other than oral administration generally may be isotonic. All compositions may optionally contain excipients such as those set forth in the Rowe et al, Handbook of Pharmaceutical Excipients, 6$^{th}$ edition, American Pharmacists Association, 2009. Excipients can include ascorbic acid and other antioxidants, chelating agents such as EDTA, carbohydrates such as dextrin, hydroxyalkylcellulose, hydroxyalkylmethylcellulose, stearic acid and the like.

Pharmaceutical compositions disclosed herein include those suitable for various administration routes, including oral administration. The compositions may be presented in unit dosage form and may be prepared by any of the methods well known in the art of pharmacy. Such methods include the step of bringing into association the active ingredient (e.g., a compound of the present disclosure or a pharmaceutical salt thereof) with one or more pharmaceutically acceptable excipients. The compositions may be prepared by uniformly and intimately bringing into association the active ingredient with liquid excipients or finely divided solid excipients or both, and then, if necessary, shaping the product. Techniques and formulations generally are found in Remington: The Science and Practice of Pharmacy, 21$^{st}$ Edition, Lippincott Wiliams and Wilkins, Philadelphia, Pa., 2006.

Compositions described herein that are suitable for oral administration may be presented as discrete units (a unit dosage form) including but not limited to capsules, cachets or tablets each containing a predetermined amount of the active ingredient. In one embodiment, the pharmaceutical composition is a tablet.

Pharmaceutical compositions disclosed herein comprise one or more compounds disclosed herein, or a pharmaceutically acceptable salt thereof, together with a pharmaceutically acceptable excipient and optionally other therapeutic agents. Pharmaceutical compositions containing the active ingredient may be in any form suitable for the intended method of administration. When used for oral use for example, tablets, troches, lozenges, aqueous or oil suspensions, dispersible powders or granules, emulsions, hard or soft capsules, syrups or elixirs may be prepared. Compositions intended for oral use may be prepared according to any method known to the art for the manufacture of pharmaceutical compositions and such compositions may contain one or more excipients including sweetening agents, flavoring agents, coloring agents and preserving agents, in order to provide a palatable preparation. Tablets containing the active ingredient in admixture with non-toxic pharmaceutically acceptable excipients which are suitable for manufacture of tablets are acceptable. These excipients may be, for example, inert diluents, such as calcium or sodium carbonate, lactose, lactose monohydrate, croscarmellose sodium, povidone, calcium or sodium phosphate; granulating and disintegrating agents, such as maize starch, or alginic acid; binding agents, such as cellulose, microcrystalline cellulose, starch, gelatin or acacia; and lubricating agents, such as magnesium stearate, stearic acid or talc. Tablets may be uncoated or may be coated by known techniques including microencapsulation to delay disintegration and adsorption in the gastrointestinal tract and thereby provide a sustained action over a longer period. For example, a time delay material such as glyceryl monostearate or glyceryl distearate alone or with a wax may be employed.

The amount of active ingredient that may be combined with the inactive ingredients to produce a dosage form may vary depending upon the intended treatment subject and the particular mode of administration. For example, in some embodiments, a dosage form for oral administration to humans may contain approximately 1 to 1000 mg of active material formulated with an appropriate and convenient amount of a pharmaceutically acceptable excipient. In certain embodiments, the pharmaceutically acceptable excipient varies from about 5 to about 95% of the total compositions (weight:weight).

Methods

In certain embodiments, the present disclosure provides methods of treating or preventing an HBV infection. In certain embodiments, a method of treating or preventing an HBV infection comprises administering to an individual (e.g. a human) a therapeutically effective amount a compound disclosed herein, or a pharmaceutically acceptable salt thereof. In certain embodiments, the present disclosure also provides methods for treating an HBV infection comprising administering to an individual (e.g. a human) infected with HBV a therapeutically effective amount a compound disclosed herein or a pharmaceutically acceptable salt thereof. In some embodiments, the individual is chronically infected with HBV. In some embodiments, the individual is acutely infected with HBV. In some embodiments, a method of treating an individual (e.g. a human) infected with HBV comprises inhibiting HBsAg secretion and/or production.

In certain embodiments, a compound disclosed herein or a pharmaceutically acceptable salt thereof for use in medical therapy is provided. In certain embodiments, the disease or condition is an HBV infection. In certain embodiments, a compound disclosed herein for use in treating or preventing an HBV infection is provided.

In certain embodiments, the use of a compound of the present disclosure, or a pharmaceutically acceptable salt thereof, for the manufacture of a medicament for treating or preventing HBV infection is provided. In certain embodiments, a compound of the present disclosure, or a pharmaceutically acceptable salt thereof, for the manufacture of a medicament for treating or preventing an HBV infection is provided.

As described more fully herein, compounds of the present disclosure can be administered with one or more additional therapeutic agent(s) to an individual (e.g. a human) infected with HBV. The additional therapeutic agent(s) can be administered to the infected individual (e.g. a human) at the same time as a compound disclosed herein or before or after administration of a compound disclosed herein. For example, in certain embodiments, when used to treat or prevent a HBV infection, a compound disclosed herein is administered with one or more additional therapeutic agent(s) selected from the group consisting of HBV DNA polymerase inhibitors, toll-like receptor 7 modulators, toll-like receptor 8 modulators, Toll-like receptor 7 and 8 modulators, Toll-like receptor 3 modulators, interferon alpha ligands, HBsAg inhibitors, compounds targeting HbcAg, cyclophilin inhibitors, HBV therapeutic vaccines, HBV prophylactic vaccines, HBV viral entry inhibitors, NTCP inhibitors, antisense oligonucleotide targeting viral mRNA, short interfering RNAs (siRNA), hepatitis B virus E antigen inhibitors, HBx inhibitors, cccDNA inhibitors, HBV antibodies including HBV antibodies targeting the surface antigens of the hepatitis B virus, thymosin agonists, cytokines, nucleoprotein inhibitors (HBV core or capsid protein inhibitors), stimulators of retinoic acid-inducible gene 1, stimulators of NOD2, recombinant thymosin alpha-1 and hepatitis B virus replication inhibitors, and combinations thereof. Specific examples are more fully described below.

In certain embodiments, the present disclosure provides a method for ameliorating a symptom associated with an HBV infection, wherein the method comprises administering to an individual (e.g. a human) infected with hepatitis B virus a therapeutically effective amount of a compound of the present disclosure, or a pharmaceutically acceptable salt thereof, wherein the therapeutically effective amount is sufficient to ameliorate a symptom associated with the HBV infection. Such symptoms include the presence of HBV virus particles in the blood, liver inflammation, jaundice, muscle aches, weakness and tiredness.

In certain embodiments, the present disclosure provides a method for reducing the rate of progression of a hepatitis B viral infection in an individual (e.g. a human), wherein the method comprises administering to an individual (e.g. a human) infected with hepatitis B virus a therapeutically effective amount of a compound disclosed herein, or a pharmaceutically acceptable salt thereof, wherein the therapeutically effective amount is sufficient to reduce the rate of progression of the hepatitis B viral infection. The rate of progression of the infection can be followed by measuring the amount of HBV virus particles in the blood.

In certain embodiments, the present disclosure provides a method for reducing the viral load associated with HBV infection, wherein the method comprises administering to an individual (e.g. a human) infected with HBV a therapeutically effective amount of a compound of the present disclosure, or a pharmaceutically acceptable salt thereof, wherein the therapeutically effective amount is sufficient to reduce the HBV viral load in the individual. In some embodiments, a method of treating an individual (e.g. a human) infected with hepatitis B virus comprises reducing the viral load associated with HBV infection as measured by PCR testing.

Compounds disclosed herein can be administered by any route appropriate for use in a method described herein. Suitable routes include oral, rectal, nasal, topical (including buccal and sublingual), transdermal, vaginal and parenteral (including subcutaneous, intramuscular, intravenous, intradermal, intrathecal and epidural), and the like.

Compounds disclosed herein may be administered to an individual in accordance with an effective dosing regimen for a desired period of time or duration, such as at least one week, at least about one month, at least about 2 months, at least about 3 months, at least about 6 months, or at least about 12 months or longer. In one variation, the compound is administered on a daily or intermittent schedule for the duration of the individual's life.

The dosage or dosing frequency of a compound of the present disclosure may be adjusted over the course of the treatment, based on the judgment of the administering physician.

Therapeutically effective amounts of compounds disclosed herein are from about 0.00001 mg/kg body weight per day to about 10 mg/kg body weight per day, such as from about 0.0001 mg/kg body weight per day to about 10 mg/kg body weight per day, or such as from about 0.001 mg/kg body weight per day to about 1 mg/kg body weight per day, or such as from about 0.01 mg/kg body weight per day to about 1 mg/kg body weight per day, or such as from about 0.05 mg/kg body weight per day to about 0.5 mg/kg body weight per day, or such as from about 0.3 µg to about 30 mg per day, or such as from about 30 µg to about 300 µg per day.

A compound of the present disclosure (e.g., any compound of Formula (I)) may be combined with one or more additional therapeutic agents in any dosage amount of the compound of the present disclosure (e.g., from 1 mg to 1000 mg of compound). Therapeutically effective amounts of the compound of Formula (I) can range from about 0.01 mg per dose to about 1000 mg per dose, such as from about 0.01 mg per dose to about 100 mg per dose, or such as from about 0.1 mg per dose to about 100 mg per dose, or such as from about 1 mg per dose to about 100 mg per dose, or such as from about 1 mg per dose to about 10 mg per dose. Other therapeutically effective amounts of the compound of Formula (I) are about 1 mg per dose, or about 2, 3, 4, 5, 6, 7, 8, 9, 10, 15, 20, 25, 30, 35, 40, 45, 50, 55, 60, 65, 70, 75, 80, 85, 90, 95, or about 100 mg per dose. Other therapeutically effective amounts of the compound of Formula (I) are about 100 mg per dose, or about 125, 150, 175, 200, 225, 250, 275, 300, 350, 400, 450, or about 500 mg per dose.

A single dose can be administered hourly, daily, or weekly. For example, a single dose can be administered once every 1 hour, 2, 3, 4, 6, 8, 12, 16 or once every 24 hours. A single dose can also be administered once every 1 day, 2, 3, 4, 5, 6, or once every 7 days. A single dose can also be administered once every 1 week, 2, 3, or once every 4 weeks. In certain embodiments, a single dose can be administered once every week. A single dose can also be administered once every month. In some embodiments, a compound disclosed herein is administered once daily in a method disclosed herein. In some embodiments, a compound disclosed herein is administered twice daily in a method disclosed herein.

The frequency of dosage of a compound disclosed herein will be determined by the needs of the individual patient and can be, for example, once per day or twice, or more times, per day. Administration of a compound continues for as long as necessary to treat an HBV infection. For example, a compound disclosed herein can be administered to a human being infected with HBV for a period of from 20 days to 180 days or, for example, for a period of from 20 days to 90 days or, for example, for a period of from 30 days to 60 days.

Administration can be intermittent, with a period of several or more days during which a patient receives a daily dose of a compound disclosed herein, followed by a period of several or more days during which a patient does not receive a daily dose of the compound. For example, a patient can receive a dose of a compound every other day, or three times per week. Again by way of non-limiting example, a patient can receive a dose of a compound each day for a period of from 1 to 14 days, followed by a period of 7 to 21 days during which the patient does not receive a dose of the compound, followed by a subsequent period (e.g., from 1 to 14 days) during which the patient again receives a daily dose of the compound. Alternating periods of administration of the compound, followed by non-administration of the compound, can be repeated as clinically required to treat the patient.

In one embodiment, pharmaceutical compositions comprising a compound of the present disclosure, or a pharmaceutically acceptable salt thereof, in combination with one or more (e.g., one, two, three, four, one or two, one to three, or one to four) additional therapeutic agents, and a pharmaceutically acceptable excipient are provided.

In one embodiment, kits comprising a compound of the present disclosure, or a pharmaceutically acceptable salt thereof, in combination with one or more (e.g., one, two, three, four, one or two, one to three, or one to four) additional therapeutic agents are provided.

In certain embodiments, a compound of the present disclosure, or a pharmaceutically acceptable salt thereof, is combined with one, two, three, four or more additional therapeutic agents. In certain embodiments, a compound of the present disclosure, or a pharmaceutically acceptable salt thereof, is combined with one additional therapeutic agent. In certain embodiments, a compound of the present disclosure, or a pharmaceutically acceptable salt thereof, is combined with two additional therapeutic agents. In other embodiments, a compound of the present disclosure, or a pharmaceutically acceptable salt thereof, is combined with three additional therapeutic agents. In further embodiments, a compound of the present disclosure, or a pharmaceutically acceptable salt thereof, is combined with four additional therapeutic agents. The one, two, three, four or more additional therapeutic agents can be different therapeutic agents selected from the same class of therapeutic agents, and/or they can be selected from different classes of therapeutic agents.

In certain embodiments, when a compound of the present disclosure is combined with one or more additional therapeutic agents as described herein, the components of the composition are administered as a simultaneous or sequential regimen. When administered sequentially, the combination may be administered in two or more administrations.

In certain embodiments, a compound of the present disclosure is combined with one or more additional therapeutic agents in a unitary dosage form for simultaneous administration to a patient, for example as a solid dosage form for oral administration.

In certain embodiments, a compound of the present disclosure is administered with one or more additional therapeutic agents. Co-administration of a compound of the present disclosure with one or more additional therapeutic agents generally refers to simultaneous or sequential administration of a compound of the present disclosure and one or more additional therapeutic agents, such that therapeutically effective amounts of the compound disclosed herein and one or more additional therapeutic agents are both present in the body of the patient.

Co-administration includes administration of unit dosages of the compounds disclosed herein before or after administration of unit dosages of one or more additional therapeutic agents, for example, administration of the compound disclosed herein within seconds, minutes, or hours of the administration of one or more additional therapeutic agents. For example, in some embodiments, a unit dose of a compound of the present disclosure is administered first, followed within seconds or minutes by administration of a unit dose of one or more additional therapeutic agents. Alternatively, in other embodiments, a unit dose of one or more additional therapeutic agents is administered first, followed by administration of a unit dose of a compound of the present disclosure within seconds or minutes. In some embodiments, a unit dose of a compound of the present disclosure is administered first, followed, after a period of hours (e.g., 1-12 hours), by administration of a unit dose of one or more additional therapeutic agents. In other embodiments, a unit dose of one or more additional therapeutic agents is administered first, followed, after a period of hours (e.g., 1-12 hours), by administration of a unit dose of a compound of the present disclosure.

Combination Therapy

In certain embodiments, a method for treating or preventing an HBV infection in an individual (e.g. a human) having or at risk of having the infection is provided, comprising administering to the individual a therapeutically effective amount of a compound of the present disclosure, or a pharmaceutically acceptable salt thereof, in combination with a therapeutically effective amount of one or more (e.g., one, two, three, four, one or two, one to three or one to four) additional therapeutic agents. In one embodiment, a method for treating an HBV infection in an individual (e.g. a human) having or at risk of having the infection is provided, comprising administering to the individual a therapeutically effective amount of a compound of the present disclosure, or a pharmaceutically acceptable salt thereof, in combination with a therapeutically effective amount of one or more (e.g., one, two, three, four, one or two, one to three or one to four) additional therapeutic agents. In some embodiments, a therapeutically effective amount of a compound of the present disclosure, or a pharmaceutically acceptable salt thereof, and one or more additional therapeutic agents are administered in a "fixed dose combination," also termed a "combined dosage form," wherein the active agents are combined in a solid (e.g. tablet or capsule), liquid (e.g. IV), or vaporized formulation.

In certain embodiments, the present disclosure provides a method for treating an HBV infection, comprising administering to a patient in need thereof a therapeutically effective amount of a compound of the present disclosure, or a pharmaceutically acceptable salt thereof, in combination with a therapeutically effective amount of one or more (e.g., one, two, three, four, one or two, one to three or one to four) additional therapeutic agents which are suitable for treating an HBV infection. In certain embodiments, one or more additional therapeutic agents includes, for example, one, two, three, four, one or two, one to three or one to four additional therapeutic agents.

In the above embodiments, the additional therapeutic agent may be an anti-HBV agent. For example, in some embodiments, the additional therapeutic agent is selected from the group consisting of HBV combination drugs, HBV DNA polymerase inhibitors, immunomodulators, toll-like receptor modulators (modulators of TLR-1, TLR-2, TLR-3, TLR-4, TLR-5, TLR-6, TLR-7, TLR-8, TLR-9, TLR-10, TLR-11, TLR-12 and TLR-13), interferon alpha receptor ligands, hyaluronidase inhibitors, recombinant IL-7, hepatitis B surface antigen (HBsAg) inhibitors, compounds targeting hepatitis B core antigen (HbcAg), cyclophilin inhibitors, HBV therapeutic vaccines, HBV prophylactic vaccines, HBV viral entry inhibitors, NTCP (Na+-taurocholate cotransporting polypeptide) inhibitors, antisense oligonucleotide targeting viral mRNA, short interfering RNAs (siRNA), miRNA gene therapy agents, endonuclease modulators, inhibitors of ribonucleotide reductase, hepatitis B virus E antigen inhibitors, recombinant scavenger receptor A (SRA) proteins, Src kinase inhibitors, HBx inhibitors, cccDNA inhibitors, short synthetic hairpin RNAs (sshRNAs), HBV antibodies including HBV antibodies targeting the surface antigens of the hepatitis B virus and bispecific antibodies and "antibody-like" therapeutic proteins (such as DARTs®, Duobodies®, Bites®, XmAbs®, TandAbs®, Fab derivatives), CCR2 chemokine antagonists, thymosin agonists, cytokines, nucleoprotein inhibitors (HBV core or capsid protein inhibitors), stimulators of retinoic acid-inducible gene 1, stimulators of NOD2, stimulators of NOD1, Arginase-1 inhibitors, STING agonists, PI3K inhibitors, lymphotoxin beta receptor activators, Natural Killer Cell Receptor 2B4 inhibitors, Lymphocyte-activation gene 3 inhibitors, CD160 inhibitors, cytotoxic T-lymphocyte-associated protein 4 inhibitors, CD137 inhibitors, Killer cell lectin-like receptor subfamily G member 1 inhibitors, TIM-3 inhibitors, B- and T-lymphocyte attenuator inhibitors, CD305 inhibitors, PD-1 inhibitors, PD-L1 inhibitors, PEG-Interferon Lambda, recombinant thymosin alpha-1, BTK inhibitors, modulators of TIGIT, modulators of CD47, modulators of SIRPalpha, modulators of ICOS, modulators of CD27, modulators of CD70, modulators of OX40, modulators of NKG2D, modulators of Tim-4, modulators of B7-H4, modulators of B7-H3, modulators of NKG2A, modulators of GITR, modulators of CD160, modulators of HEVEM, modulators of CD161, modulators of Axl, modulators of Mer, modulators of Tyro, gene modifiers or editors such as CRISPR (including CRISPR Cas9), zinc finger nucleases or synthetic nucleases (TALENs), Hepatitis B virus replication inhibitors, compounds such as those disclosed in U.S. Publication No. 2010/0143301 (Gilead Sciences), U.S. Publication No. 2011/0098248 (Gilead Sciences), U.S. Publication No. 2009/0047249 (Gilead Sciences), U.S. Pat. No. 8,722,054 (Gilead Sciences), U.S. Publication No. 2014/0045849 (Janssen), U.S. Publication No. 2014/0073642 (Janssen), WO2014/056953 (Janssen), WO2014/076221 (Janssen), WO2014/128189 (Janssen), U.S. Publication No. 2014/0350031 (Janssen), WO2014/023813 (Janssen), U.S. Publication No. 2008/0234251 (Array Biopharma), U.S. Publication No. 2008/0306050 (Array Biopharma), U.S. Publication No. 2010/0029585 (Ventirx Pharma), U.S. Publication No. 2011/0092485 (Ventirx Pharma), US2011/0118235 (Ventirx Pharma), U.S. Publication No. 2012/0082658 (Ventirx Pharma), U.S. Publication No. 2012/0219615 (Ventirx Pharma), U.S. Publication No. 2014/0066432 (Ventirx Pharma), U.S. Publication No. 2014/0088085 (Ventirx Pharma), U.S. Publication No. 2014/0275167 (Novira Therapeutics), U.S. Publication No. 2013/0251673 (Novira Therapeutics), U.S. Pat. No. 8,513,184 (Gilead Sciences), U.S. Publication No. 2014/0030221 (Gilead Sciences), U.S. Publication No. 2013/0344030 (Gilead Sciences), U.S. Publication No. 2013/0344029 (Gilead Sciences), U.S. Publication No. 2014/0343032 (Roche), WO2014037480 (Roche), U.S. Publication No. 2013/0267517 (Roche), WO2014131847 (Janssen), WO2014033176 (Janssen), WO2014033170 (Janssen), WO2014033167 (Janssen), U.S. Publication No. 2014/0330015 (Ono Pharmaceutical), U.S. Publication No. 2013/0079327 (Ono Pharmaceutical), U.S. Publication No. 2013/0217880 (Ono pharmaceutical), and other drugs for treating HBV, and combinations thereof. In some embodiments, the additional therapeutic agent is further selected from hepatitis B surface antigen (HBsAg) secretion or assembly inhibitors, TCR-like antibodies, IDO inhibitors, cccDNA epigenetic modifiers, IAPs inhibitors, SMAC mimetics, and compounds such as those disclosed in US20100015178 (Incyte).

In the above embodiments, the additional therapeutic agent may be an anti-HBV agent. For example, the additional therapeutic agent may be selected from the group consisting of HBV combination drugs, other drugs for treating HBV, 3-dioxygenase (IDO) inhibitors, antisense oligonucleotide targeting viral mRNA, Apolipoprotein A1 modulator, arginase inhibitors, B- and T-lymphocyte attenuator inhibitors, Bruton's tyrosine kinase (BTK) inhibitors, CCR2 chemokine antagonist, CD137 inhibitors, CD160 inhibitors, CD305 inhibitors, CD4 agonist and modulator, compounds targeting HBcAg, compounds targeting hepatitis B core antigen (HBcAg), covalently closed circular DNA (cccDNA) inhibitors, cyclophilin inhibitors, cytokines, cytotoxic T-lymphocyte-associated protein 4 (ipi4) inhibitors, DNA polymerase inhibitor, Endonuclease modulator, epigenetic modifiers, Farnesoid X receptor agonist, gene modifiers or editors, HBsAg inhibitors, HBsAg secretion or assembly inhibitors, HBV antibodies, HBV DNA polymerase inhibitors, HBV replication inhibitors, HBV RNAse inhibitors, HBV vaccines, HBV viral entry inhibitors, HBx inhibitors, Hepatitis B large envelope protein modulator, Hepatitis B large envelope protein stimulator, Hepatitis B structural protein modulator, hepatitis B surface antigen (HBsAg) inhibitors, hepatitis B surface antigen (HBsAg) secretion or assembly inhibitors, hepatitis B virus E antigen inhibitors, hepatitis B virus replication inhibitors, Hepatitis virus structural protein inhibitor, HIV-1 reverse transcriptase inhibitor, Hyaluronidase inhibitor, IAPs inhibitors, IL-2 agonist, IL-7 agonist, Immunoglobulin agonist, Immunoglobulin G modulator, immunomodulators, indoleamine-2, inhibitors of ribonucleotide reductase, Interferon agonist, Interferon alpha 1 ligand, Interferon alpha 2 ligand, Interferon alpha 5 ligand modulator, Interferon alpha ligand, Interferon alpha ligand modulator, interferon alpha receptor ligands, Interferon beta ligand, Interferon ligand, Interferon receptor modulator, Interleukin-2 ligand, ipi4 inhibitors, lysine demethylase inhibitors, histone demethylase inhibitors, KDM5 inhibitors, KDM1 inhibitors, killer cell lectin-like receptor subfamily G member 1 inhibitors, lymphocyte-activation gene 3 inhibitors, lymphotoxin beta receptor activators, microRNA (miRNA) gene therapy agents, modulators of Axl, modulators of B7-H3, modulators of B7-H4, modulators of CD160, modulators of CD161, modulators of CD27, modulators of CD47, modulators of CD70, modulators of GITR, modulators of HEVEM, modulators of ICOS, modulators of Mer, modulators of NKG2A, modulators of NKG2D, modulators of OX40, modulators of SIRPalpha, modulators of TIGIT, modulators of Tim-4, modulators of Tyro, Na+-taurocholate cotransporting polypeptide (NTCP) inhibitors, natural killer cell receptor 2B4 inhibitors, NOD2 gene stimulator, Nucleoprotein inhibitor, nucleoprotein modulators, PD-1 inhibitors, PD-L1 inhibitors, PEG-Interferon Lambda, Peptidylprolyl isomerase inhibitor, phosphatidylinositol-3 kinase (PI3K) inhibitors, recombinant scavenger receptor A (SRA) proteins, recombinant thymosin alpha-1, Retinoic acid-inducible gene 1 stimulator, Reverse transcriptase inhibitor, Ribonuclease inhibitor, RNA DNA polymerase inhibitor, short interfering RNAs (siRNA), short synthetic hairpin RNAs (sshRNAs), SLC10A1 gene inhibitor, SMAC mimetics, Src tyrosine kinase inhibitor, stimulator of interferon gene (STING) agonists, stimulators of NOD1, T cell surface glycoprotein CD28 inhibitor, T-cell surface glycoprotein CD8 modulator, Thymosin agonist, Thymosin alpha 1 ligand, Tim-3 inhibitors, TLR-3 agonist, TLR-7 agonist, TLR-9 agonist, TLR9 gene stimulator, toll-like receptor (TLR) modulators, Viral ribonucleotide reductase inhibitor, zinc finger nucleases or synthetic nucleases (TALENs), and combinations thereof.

In certain embodiments, the additional therapeutic agent is selected from the group consisting of HBV combination drugs, HBV DNA polymerase inhibitors, toll-like receptor 7 modulators, toll-like receptor 8 modulators, Toll-like receptor 7 and 8 modulators, Toll-like receptor 3 modulators, interferon alpha receptor ligands, HBsAg inhibitors, compounds targeting HbcAg, cyclophilin inhibitors, HBV therapeutic vaccines, HBV prophylactic vaccines, HBV viral entry inhibitors, NTCP inhibitors, antisense oligonucleotide targeting viral mRNA, short interfering RNAs (siRNA), hepatitis B virus E antigen (HBeAg) inhibitors, HBx inhibitors, cccDNA inhibitors, HBV antibodies including HBV antibodies targeting the surface antigens of the hepatitis B virus, thymosin agonists, cytokines, nucleoprotein inhibitors (HBV core or capsid protein inhibitors), stimulators of retinoic acid-inducible gene 1, stimulators of NOD2, stimulators of NOD1, recombinant thymosin alpha-1, BTK inhibitors, and hepatitis B virus replication inhibitors, and combinations thereof. In certain embodiments, the additional therapeutic is selected from hepatitis B surface antigen (HBsAg) secretion or assembly inhibitors, IDO inhibitors, and combinations thereof.

In certain embodiments, the additional therapeutic agent is selected from the group consisting of HBV combination drugs, HBV DNA polymerase inhibitors, toll-like receptor 7 modulators, toll-like receptor 8 modulators, Toll-like receptor 7 and 8 modulators, Toll-like receptor 3 modulators, interferon alpha receptor ligands, HBsAg inhibitors, compounds targeting HbcAg, cyclophilin inhibitors, HBV therapeutic vaccines, HBV prophylactic vaccines, HBV viral entry inhibitors, NTCP inhibitors, antisense oligonucleotide targeting viral mRNA, short interfering RNAs (siRNA), hepatitis B virus E antigen (HBeAg) inhibitors, HBx inhibitors, cccDNA inhibitors, HBV antibodies including HBV antibodies targeting the surface antigens of the hepatitis B virus, thymosin agonists, cytokines, nucleoprotein inhibitors (HBV core or capsid protein inhibitors), stimulators of retinoic acid-inducible gene 1, stimulators of NOD2, stimulators of NOD1, recombinant thymosin alpha-1, BTK inhibitors, and hepatitis B virus replication inhibitors, and combinations thereof. In certain embodiments, the additional therapeutic is selected from hepatitis B surface antigen (HBsAg) secretion or assembly inhibitors, IDO inhibitors, KDM5 inhibitors, and combinations thereof.

In certain embodiments a compound of the present disclosure is formulated as a tablet, which may optionally contain one or more other compounds useful for treating HBV. In certain embodiments, the tablet can contain another active ingredient for treating HBV, such as HBV DNA polymerase inhibitors, immunomodulators, toll-like receptor modulators (modulators of TLR-1, TLR-2, TLR-3, TLR-4, TLR-5, TLR-6, TLR-7, TLR-8, TLR-9, TLR-10, TLR-11, TLR-12 and TLR-13), modulators of tlr7, modulators of tlr8, modulators of tlr7 and tlr8, interferon alpha receptor ligands, hyaluronidase inhibitors, hepatitis B surface antigen (HBsAg) inhibitors, compounds targeting hepatitis B core antigen (HbcAg), cyclophilin inhibitors, HBV viral entry inhibitors, NTCP (Na+-taurocholate cotransporting polypeptide) inhibitors, endonuclease modulators, inhibitors of ribonucleotide reductase, hepatitis B virus E antigen inhibitors, Src kinase inhibitors, HBx inhibitors, cccDNA inhibitors, CCR2 chemokine antagonists, thymosin agonists, nucleoprotein inhibitors (HBV core or capsid protein inhibitors), stimulators of retinoic acid-inducible gene 1, stimulators of NOD2, stimulators of NOD1, Arginase-1 inhibitors, STING agonists, PI3K inhibitors, lymphotoxin beta receptor activators, Natural Killer Cell Receptor 2B4 inhibitors, Lymphocyte-activation gene 3 inhibitors, CD160 inhibitors, cytotoxic T-lymphocyte-associated protein 4 inhibitors, CD137 inhibitors, Killer cell lectin-like receptor subfamily G member 1 inhibitors, TIM-3 inhibitors, B- and T-lymphocyte attenuator inhibitors, CD305 inhibitors, PD-1 inhibitors, PD-L1 inhibitors, BTK inhibitors, modulators of TIGIT, modulators of CD47, modulators of SIRP alpha, modulators of ICOS, modulators of CD27, modulators of CD70, modulators of OX40, modulators of NKG2D, modulators of Tim-4, modulators of B7-H4, modulators of B7-H3, modulators of NKG2A, modulators of GITR, modulators of CD160, modulators of HEVEM, modulators of CD161, modulators of Axl, modulators of Mer, modulators of Tyro, and Hepatitis B virus replication inhibitors, and combinations thereof. In certain embodiments, the tablet can contain another active ingredient for treating HBV, such as hepatitis B surface antigen (HBsAg) secretion or assembly inhibitors, cccDNA epigenetic modifiers, IAPs inhibitors, SMAC mimetics, and IDO inhibitors.

In certain embodiments, such tablets are suitable for once daily dosing.

In certain embodiments, the additional therapeutic agent is selected from one or more of:
(1) Combination drugs selected from the group consisting of tenofovir disoproxil fumarate+emtricitabine (TRUVADA®); adefovir+clevudine and GBV-015, as well as combination drugs selected from ABX-203+lamivudine+PEG-IFNalpha, ABX-203+adefovir+PEG-IFNalpha, and INO-9112+RG7944 (INO-1800);
(2) HBV DNA polymerase inhibitors selected from the group consisting of besifovir, entecavir (Baraclude®), adefovir (Hepsera®), tenofovir disoproxil fumarate (Viread®), tenofovir alafenamide, tenofovir, tenofovir disoproxil, tenofovir alafenamide fumarate, tenofovir alafenamide hemifumarate, tenofovir dipivoxil, tenofovir dipivoxil fumarate, tenofovir octadecyloxyethyl ester, telbivudine (Tyzeka®), pradefovir, Clevudine, emtricitabine (Emtriva®), ribavirin, lamivudine (Epivir-HBV®), phosphazide, famciclovir, SNC-019754, FMCA, fusolin, AGX-1009 and metacavir, as well as HBV DNA polymerase inhibitors selected from AR-II-04-26 and HS-10234;
(3) Immunomodulators selected from the group consisting of rintatolimod, imidol hydrochloride, ingaron, dermaVir, plaquenil (hydroxychloroquine), proleukin, hydroxyurea, mycophenolate mofetil (MPA) and its ester derivative mycophenolate mofetil (MMF), WF-10, ribavirin, IL-12, polymer polyethyleneimine (PEI), Gepon, VGV-1, MOR-22, BMS-936559 and IR-103, as well as immunomodulators selected from INO-9112, polymer polyethyleneimine (PEI), Gepon, VGV-1, MOR-22, BMS-936559, RO-7011785, RO-6871765 and IR-103;
(4) Toll-like receptor 7 modulators selected from the group consisting of GS-9620, GSK-2245035, imiquimod, resiquimod, DSR-6434, DSP-3025, IMO-4200, MCT-465, 3M-051, SB-9922, 3M-052, Limtop, TMX-30X, TMX-202 RG-7863 and RG-7795;
(5) Toll-like receptor 8 modulators selected from the group consisting of motolimod, resiquimod, 3M-051, 3M-052, MCT-465, IMO-4200, VTX-763, VTX-1463;
(6) Toll-like receptor 3 modulators selected from the group consisting of rintatolimod, poly-ICLC, MCT-465, MCT-475, Riboxxon, Riboxxim and ND-1.1;
(7) Interferon alpha receptor ligands selected from the group consisting of interferon alpha-2b (Intron A®), pegylated interferon alpha-2a (Pegasys®), interferon alpha 1b (Hapgen®), Veldona, Infradure, Roferon-A, YPEG-interferon alfa-2a (YPEG-rhIFNalpha-2a), P-1101, Algeron, Alfarona, Ingaron (interferon gamma), rSIFN-co (recombinant super compound interferon), Ypeginterferon alfa-2b (YPEG-rhIFNalpha-2b), MOR-22, peginterferon alfa-2b (PEG-Intron®), Bioferon, Novaferon, Inmutag (Inferon), Multiferon®, interferon alfa-n1 (Humoferon®), interferon beta-1a (Avonex®), Shaferon, interferon alfa-2b (AXXO), Alfaferone, interferon alfa-2b (BioGeneric Pharma), interferon-alpha 2 (CJ), Laferonum, VIPEG, BLAUFERON-B, BLAUFERON-A, Intermax Alpha, Realdiron, Lanstion, Pegaferon, PDferon-B PDferon-B, interferon alfa-2b (IFN, Laboratorios Bioprofarma), alfainterferona 2b, Kalferon, Pegnano, Feronsure, Pegi-Hep, interferon alfa 2b (Zydus-Cadila), Optipeg A, Realfa 2B, Reliferon, interferon alfa-2b (Amega), interferon alfa-2b (Virchow), peginterferon alfa-2b (Amega), Reaferon-EC, Proquiferon, Uniferon, Urifron, interferon alfa-2b (Changchun Institute of Biological Products), Anterferon, Shanferon, Layfferon, Shang Sheng Lei Tai, INTEFEN, SINOGEN, Fukangtai, Pegstat, rHSA-IFN alpha-2b and Interapo (Interapa);

(8) Hyaluronidase inhibitors selected from the group consisting of astodrimer;

(9) Modulators of IL-10;

(10) HBsAg inhibitors selected from the group consisting of HBF-0259, PBHBV-001, PBHBV-2-15, PBHBV-2-1, REP 9AC, REP-9C and REP 9AC', as well as HBsAg inhibitors selected from REP-9, REP-2139, REP-2139-Ca, REP-2165, REP-2055, REP-2163, REP-2165, REP-2053, REP-2031 and REP-006 and REP-9AC'

(11) Toll like receptor 9 modulators selected from CYT003, as well as Toll like receptor 9 modulators selected from CYT-003, IMO-2055, IMO-2125, IMO-3100, IMO-8400, IMO-9200, agatolimod, DIMS-9054, DV-1179, AZD-1419, MGN-1703, and CYT-003-QbG10;

(12) Cyclophilin inhibitors selected from the group consisting of OCB-030, SCY-635 and NVP-018;

(13) HBV Prophylactic vaccines selected from the group consisting of Hexaxim, Heplisav, Mosquirix, DTwP-HBV vaccine, Bio-Hep-B, D/T/P/HBV/M (LBVP-0101; LBVW-0101), DTwP-Hepb-Hib-IPV vaccine, Heberpenta L, DTwP-HepB-Hib, V-419, CVI-HBV-001, Tetrabhay, hepatitis B prophylactic vaccine (Advax Super D), Hepatrol-07, GSK-223192A, Engerix B®, recombinant hepatitis B vaccine (intramuscular, Kangtai Biological Products), recombinant hepatitis B vaccine (Hansenual polymorpha yeast, intramuscular, Hualan Biological Engineering), Bimmugen, Euforavac, Eutravac, anrix-DTaP—IPV-Hep B, Infanrix-DTaP—IPV-Hep B-Hib, Pentabio Vaksin DTP—HB-Hib, Comvac 4, Twinrix, Euvax-B, Tritanrix HB, Infanrix Hep B, Comvax, DTP-Hib-HBV vaccine, DTP-HBV vaccine, Yi Tai, Heberbiovac HB, Trivac HB, GerVax, DTwP-Hep B-Hib vaccine, Bilive, Hepavax-Gene, SUPERVAX, Comvac5, Shanvac-B, Hebsulin, Recombivax HB, Revac B mcf, Revac B+, Fendrix, DTwP-HepB-Hib, DNA-001, Shan6, rhHBsAG vaccine, and DTaP-rHB-Hib vaccine;

(14) HBV Therapeutic vaccines selected from the group consisting of HBsAG-HBIG complex, Bio-Hep-B, NAS-VAC, abi-HB (intravenous), ABX-203, Tetrabhay, GX-110E, GS-4774, peptide vaccine (epsilonPA-44), Hepatrol-07, NASVAC (NASTERAP), IMP-321, BEVAC, Revac B mcf, Revac B+, MGN-1333, KW-2, CVI-HBV-002, AltraHepB, VGX-6200, FP-02, TG-1050, NU-500, HBVax, im/TriGrid/antigen vaccine, Mega-CD40L-adjuvanted vaccine, HepB-v, NO-1800, recombinant VLP-based therapeutic vaccine (HBV infection, VLP Biotech), AdTG-17909, AdTG-17910 AdTG-18202, ChronVac-B, and Lm HBV, as well as HBV Therapeutic vaccines selected from FP-02.2 and RG7944 (INO-1800);

(15) HBV viral entry inhibitor selected from the group consisting of Myrcludex B;

(16) Antisense oligonucleotide targeting viral mRNA selected from the group consisting of ISIS-HBVRx;

(17) short interfering RNAs (siRNA) selected from the group consisting of TKM-HBV (TKM-HepB), ALN—HBV, SR-008, ddRNAi and ARC-520;

(18) Endonuclease modulators selected from the group consisting of PGN-514;

(19) Inhibitors of ribonucleotide reductase selected from the group consisting of Trimidox;

(20) Hepatitis B virus E antigen inhibitors selected from the group consisting of wogonin;

(21) HBV antibodies targeting the surface antigens of the hepatitis B virus selected from the group consisting of GC-1102, XTL-17, XTL-19, XTL-001, KN-003 and fully human monoclonal antibody therapy (hepatitis B virus infection, Humabs BioMed), as well as HBV antibodies targeting the surface antigens of the hepatitis B virus selected from IV Hepabulin SN;

(22) HBV antibodies including monoclonal antibodies and polyclonal antibodies selected from the group consisting of Zutectra, Shang Sheng Gan Di, Uman Big (Hepatitis B Hyperimmune), Omri-Hep-B, Nabi-HB, Hepatect CP, HepaGam B, igantibe, Niuliva, CT-P24, hepatitis B immunoglobulin (intravenous, pH4, HBV infection, Shanghai RAAS Blood Products) and Fovepta (BT-088);

(23) CCR2 chemokine antagonists selected from the group consisting of propagermanium;

(24) Thymosin agonists selected from the group consisting of Thymalfasin;

(25) Cytokines selected from the group consisting of recombinant IL-7, CYT-107, interleukin-2 (IL-2, Immunex); recombinant human interleukin-2 (Shenzhen Neptunus) and celmoleukin, as well as cytokines selected from IL-15, IL-21, IL-24;

(26) Nucleoprotein inhibitors (HBV core or capsid protein inhibitors) selected from the group consisting of NVR-1221, NVR-3778, BAY 41-4109, morphothiadine mesilate and DVR-23;

(27) Stimulators of retinoic acid-inducible gene 1 selected from the group consisting of SB-9200, SB-40, SB-44, ORI-7246, ORI-9350, ORI-7537, ORI-9020, ORI-9198 and ORI-7170;

(28) Stimulators of NOD2 selected from the group consisting of SB-9200;

(29) Recombinant thymosin alpha-1 selected from the group consisting of NL-004 and PEGylated thymosin alpha 1;

(30) Hepatitis B virus replication inhibitors selected from the group consisting of isothiafludine, IQP-HBV, RM-5038 and Xingantie;

(31) PI3K inhibitors selected from the group consisting of idelalisib, AZD-8186, buparlisib, CLR-457, pictilisib, neratinib, rigosertib, rigosertib sodium, EN-3342, TGR-1202, alpelisib, duvelisib, UCB-5857, taselisib, XL-765, gedatolisib, VS-5584, copanlisib, CAI orotate, perifosine, RG-7666, GSK-2636771, DS-7423, panulisib, GSK-2269557, GSK-2126458, CUDC-907, PQR-309, INCB-040093, pilaralisib, BAY-1082439, puquitinib mesylate, SAR-245409, AMG-319, RP-6530, ZSTK-474, MLN-1117, SF-1126, RV-1729, sonolisib, LY-3023414, SAR-260301 and CLR-1401;

(32) cccDNA inhibitors selected from the group consisting of BSBI-25;

(33) PD-L1 inhibitors selected from the group consisting of MEDI-0680, RG-7446, durvalumab, KY-1003, KD-033, MSB-0010718C, TSR-042, ALN-PDL, STI-A1014 and BMS-936559;

(34) PD-1 inhibitors selected from the group consisting of nivolumab, pembrolizumab, pidilizumab, BGB-108 and mDX-400;
(35) BTK inhibitors selected from the group consisting of ACP-196, dasatinib, ibrutinib, PRN-1008, SNS-062, ONO-4059, BGB-3111, MSC-2364447, X-022, spebrutinib, TP-4207, HM-71224, KBP-7536, AC-0025;
(36) Other drugs for treating HBV selected from the group consisting of gentiopicrin (gentiopicroside), nitazoxanide, birinapant, NOV-205 (Molixan; BAM-205), Oligotide, Mivotilate, Feron, levamisole, Ka Shu Ning, Alloferon, WS-007, Y-101 (Ti Fen Tai), rSIFN-co, PEG-IIFNm, KW-3, BP-Inter-014, oleanolic acid, HepB-nRNA, cTP-5 (rTP-5), HSK-II-2, HEISCO-106-1, HEISCO-106, Hepbarna, IBPB-006IA, Hepuyinfen, DasKloster 0014-01, Jiangantai (Ganxikang), picroside, GA5 NM-HBV, DasKloster-0039, hepulantai, IMB-2613, TCM-800B and ZH-2N, as well as other drugs for treating HBV selected from reduced glutathione, and RO-6864018; and
(37) The compounds disclosed in US20100143301 (Gilead Sciences), US20110098248 (Gilead Sciences), US20090047249 (Gilead Sciences), U.S. Pat. No. 8,722,054 (Gilead Sciences), US20140045849 (Janssen), US20140073642 (Janssen), WO2014/056953 (Janssen), WO2014/076221 (Janssen), WO2014/128189 (Janssen), US20140350031 (Janssen), WO2014/023813 (Janssen), US20080234251 (Array Biopharma), US20080306050 (Array Biopharma), US20100029585 (Ventirx Pharma), US20110092485 (Ventirx Pharma), US20110118235 (Ventirx Pharma), US20120082658 (Ventirx Pharma), US20120219615 (Ventirx Pharma), US20140066432 (Ventirx Pharma), US20140088085 (VentirxPharma), US20140275167 (Novira therapeutics), US20130251673 (Novira therapeutics), U.S. Pat. No. 8,513,184 (Gilead Sciences), US20140030221 (Gilead Sciences), US20130344030 (Gilead Sciences), US20130344029 (Gilead Sciences), US20140343032 (Roche), WO2014037480 (Roche), US20130267517 (Roche), WO2014131847 (Janssen), WO2014033176 (Janssen), WO2014033170 (Janssen), WO2014033167 (Janssen), US20140330015 (Ono pharmaceutical), US20130079327 (Ono pharmaceutical), and US20130217880 (Ono pharmaceutical), and the compounds disclosed in US20100015178 (Incyte);
(38) IDO inhibitors selected from the group consisting of epacadostat (INCB24360), F-001287, resminostat (4SC-201), SN-35837, NLG-919, GDC-0919, and indoximod;
(39) Arginase inhibitors selected from CB-1158, C-201, and resminostat;
(40) Cytotoxic T-lymphocyte-associated protein 4 (ipi4) inhibitors selected from ipilumimab, belatacept, PSI-001, PRS-010, tremelimumab, and JHL-1155; and
(41) KDM5 inhibitors include the compounds disclosed in WO2016057924 (Genentech/Constellation Pharmaceuticals), US20140275092 (Genentech/Constellation Pharmaceuticals), US20140371195 (Epitherapeutics) and US20140371214 (Epitherapeutics), US20160102096 (Epitherapeutics), US20140194469 (Quanticel), US20140171432, US20140213591 (Quanticel), US20160039808 (Quanticel), US20140275084 (Quanticel), WO2014164708 (Quanticel).

In certain embodiments, a compound of the present disclosure, or a pharmaceutically acceptable salt thereof, is combined with one, two, three, four or more additional therapeutic agents. In certain embodiments, a compound of the present disclosure, or a pharmaceutically acceptable salt thereof, is combined with two additional therapeutic agents. In other embodiments, a compound of the present disclosure, or a pharmaceutically acceptable salt thereof, is combined with three additional therapeutic agents. In further embodiments, a compound of the present disclosure, or a pharmaceutically acceptable salt thereof, is combined with four additional therapeutic agents. The one, two, three, four or more additional therapeutic agents can be different therapeutic agents selected from the same class of therapeutic agents, and/or they can be selected from different classes of therapeutic agents.

In one embodiment, a compound of the present disclosure, or a pharmaceutically acceptable salt thereof, is combined with an HBV DNA polymerase inhibitor. In another embodiment, a compound of the present disclosure, or a pharmaceutically acceptable salt thereof, is combined with an HBV DNA polymerase inhibitor and at least one additional therapeutic agent selected from the group consisting of: immunomodulators, toll-like receptor modulators (modulators of TLR-1, TLR-2, TLR-3, TLR-4, TLR-5, TLR-6, TLR-7, TLR-8, TLR-9, TLR-10, TLR-11, TLR-12 and TLR-13), interferon alpha receptor ligands, hyaluronidase inhibitors, recombinant IL-7, HBsAg inhibitors, compounds targeting HbcAg, cyclophilin inhibitors, HBV therapeutic vaccines, HBV prophylactic vaccines HBV viral entry inhibitors, NTCP inhibitors, antisense oligonucleotide targeting viral mRNA, short interfering RNAs (siRNA), miRNA gene therapy agents, endonuclease modulators, inhibitors of ribonucleotide reductase, Hepatitis B virus E antigen inhibitors, recombinant scavenger receptor A (SRA) proteins, src kinase inhibitors, HBx inhibitors, cccDNA inhibitors, short synthetic hairpin RNAs (sshRNAs), HBV antibodies including HBV antibodies targeting the surface antigens of the hepatitis B virus and bispecific antibodies and "antibody-like" therapeutic proteins (such as DARTs®, Duobodies®, Bites®, XmAbs®, TandAbs®, Fab derivatives), CCR2 chemokine antagonists, thymosin agonists, cytokines, nucleoprotein inhibitors (HBV core or capsid protein inhibitors), stimulators of retinoic acid-inducible gene 1, stimulators of NOD2, stimulators of NOD1, Arginase-1 inhibitors, STING agonists, PI3K inhibitors, lymphotoxin beta receptor activators, Natural Killer Cell Receptor 2B4 inhibitors, Lymphocyte-activation gene 3 inhibitors, CD160 inhibitors, cytotoxic T-lymphocyte-associated protein 4 inhibitors, CD137 inhibitors, Killer cell lectin-like receptor subfamily G member 1 inhibitors, TIM-3 inhibitors, B- and T-lymphocyte attenuator inhibitors, CD305 inhibitors, PD-1 inhibitors, PD-L1 inhibitors, PEG-Interferon Lambda, recombinant thymosin alpha-1, BTK inhibitors, modulators of TIGIT, modulators of CD47, modulators of SIRPalpha, modulators of ICOS, modulators of CD27, modulators of CD70, modulators of OX40, modulators of NKG2D, modulators of Tim-4, modulators of B7-H4, modulators of B7-H3, modulators of NKG2A, modulators of GITR, modulators of CD160, modulators of HEVEM, modulators of CD161, modulators of Axl, modulators of Mer, modulators of Tyro, gene modifiers or editors such as CRISPR (including CRISPR Cas9), zinc finger nucleases or synthetic nucleases (TALENs), and Hepatitis B virus replication inhibitors. In certain embodiments the at least one additional therapeutic agent is further selected from hepatitis B surface antigen (HBsAg) secretion or assembly inhibitors, TCR-like antibodies, cccDNA epigenetic modifiers, IAPs inhibitors, SMAC mimetics, and IDO inhibitors.

In another embodiment, a compound of the present disclosure, or a pharmaceutically acceptable salt thereof, is combined with an HBV DNA polymerase inhibitor and at least one additional therapeutic agent selected from the group consisting of: HBV viral entry inhibitors, NTCP inhibitors, HBx inhibitors, cccDNA inhibitors, HBV antibodies targeting the surface antigens of the hepatitis B virus, short interfering RNAs (siRNA), miRNA gene therapy agents, short synthetic hairpin RNAs (sshRNAs), and nucleoprotein inhibitors (HBV core or capsid protein inhibitors).

In another embodiment, a compound of the present disclosure, or a pharmaceutically acceptable salt thereof, is combined with an HBV DNA polymerase inhibitor, one or two additional therapeutic agents selected from the group consisting of: immunomodulators, toll-like receptor modulators (modulators of TLR-1, TLR-2, TLR-3, TLR-4, TLR-5, TLR-6, TLR-7, TLR-8, TLR-9, TLR-10, TLR-11, TLR-12 and TLR-13), HBsAg inhibitors, HBV therapeutic vaccines, HBV antibodies including HBV antibodies targeting the surface antigens of the hepatitis B virus and bispecific antibodies and "antibody-like" therapeutic proteins (such as DARTs®, Duobodies®, Bites®, XmAbs®, TandAbs®, Fab derivatives), cyclophilin inhibitors, stimulators of retinoic acid-inducible gene 1, PD-1 inhibitors, PD-L1 inhibitors, Arginase-1 inhibitors, PI3K inhibitors and stimulators of NOD2, and one or two additional therapeutic agents selected from the group consisting of: HBV viral entry inhibitors, NTCP inhibitors, HBx inhibitors, cccDNA inhibitors, HBV antibodies targeting the surface antigens of the hepatitis B virus, short interfering RNAs (siRNA), miRNA gene therapy agents, short synthetic hairpin RNAs (sshRNAs), and nucleoprotein inhibitors (HBV core or capsid protein inhibitors). In certain embodiments one or two additional therapeutic agents is further selected from hepatitis B surface antigen (HBsAg) secretion or assembly inhibitors, TCR-like antibodies, and IDO inhibitors.

In a particular embodiment, a compound of the present disclosure, or a pharmaceutically acceptable salt thereof, is combined with one, two, three, four or more additional therapeutic agents selected from adefovir (Hepsera®), tenofovir disoproxil fumarate+emtricitabine (TRUVADA®), tenofovir disoproxil fumarate (Viread®), entecavir (Baraclude®), lamivudine (Epivir-HBV®), tenofovir alafenamide, tenofovir, tenofovir disoproxil, tenofovir alafenamide fumarate, tenofovir alafenamide hemifumarate, telbivudine (Tyzeka®), Clevudine®, emtricitabine (Emtriva®), peginterferon alfa-2b (PEG-Intron®), Multiferon®, interferon alpha 1b (Hapgen®), interferon alpha-2b (Intron A®), pegylated interferon alpha-2a (Pegasys®), interferon alfa-n1 (Humoferon®), ribavirin, interferon beta-1a (Avonex®), Bioferon, Ingaron, Inmutag (Inferon), Algeron, Roferon-A, Oligotide, Zutectra, Shaferon, interferon alfa-2b (AXXO), Alfaferone, interferon alfa-2b (BioGeneric Pharma), Feron, interferon-alpha 2 (CJ), BEVAC, Laferonum, VIPEG, BLAUFERON-B, BLAUFERON-A, Intermax Alpha, Realdiron, Lanstion, Pegaferon, PDferon-B, interferon alfa-2b (IFN, Laboratorios Bioprofarma), alfainterferona 2b, Kalferon, Pegnano, Feronsure, PegiHep, interferon alfa 2b (Zydus-Cadila), Optipeg A, Realfa 2B, Reliferon, interferon alfa-2b (Amega), interferon alfa-2b (Virchow), peginterferon alfa-2b (Amega), Reaferon-EC, Proquiferon, Uniferon, Urifron, interferon alfa-2b (Changchun Institute of Biological Products), Anterferon, Shanferon, MOR-22, interleukin-2 (IL-2, Immunex), recombinant human interleukin-2 (Shenzhen Neptunus), Layfferon, Ka Shu Ning, Shang Sheng Lei Tai, INTEFEN, SINOGEN, Fukangtai, Alloferon and celmoleukin In a particular embodiment, a compound of the present disclosure, or a pharmaceutically acceptable salt thereof, is combined with entecavir (Baraclude®), adefovir (Hepsera®), tenofovir disoproxil fumarate (Viread®), tenofovir alafenamide, tenofovir, tenofovir disoproxil, tenofovir alafenamide fumarate, tenofovir alafenamide hemifumarate, telbivudine (Tyzeka®) or lamivudine (Epivir-HBV®)

In a particular embodiment, a compound of the present disclosure, or a pharmaceutically acceptable salt thereof, is combined with entecavir (Baraclude®), adefovir (Hepsera®), tenofovir disoproxil fumarate (Viread®), tenofovir alafenamide hemifumarate, telbivudine (Tyzeka®) or lamivudine (Epivir-HBV®).

In a particular embodiment, a compound of the present disclosure, or a pharmaceutically acceptable salt thereof is combined with a PD-1 inhibitor. In a particular embodiment, a compound of the present disclosure, or a pharmaceutically acceptable salt thereof is combined with a PD-L1 inhibitor. In a particular embodiment, a compound of the present disclosure, or a pharmaceutically acceptable salt thereof is combined with an IDO inhibitor. In a particular embodiment, a compound of the present disclosure, or a pharmaceutically acceptable salt thereof is combined with an IDO inhibitor and a PD-1 inhibitor. In a particular embodiment, a compound of the present disclosure, or a pharmaceutically acceptable salt thereof, is combined with an IDO inhibitor and a PD-L1 inhibitor. In a particular embodiment, a compound of the present disclosure, or a pharmaceutically acceptable salt thereof, is combined with a TLR7 modulator, such as GS-9620. As used herein, GS-9620 (4-amino-2-butoxy-8-({3-[(pyrrolidin-1-yl)methyl]phenyl}methyl)-7,8-dihydropteridin-6(5H)-one), includes pharmaceutically acceptable salts thereof.

In a particular embodiment, a compound of the present disclosure, or a pharmaceutically acceptable salt thereof, is combined with a first additional therapeutic agent selected from the group consisting of: entecavir (Baraclude®), adefovir (Hepsera®), tenofovir disoproxil fumarate (Viread®), tenofovir alafenamide, tenofovir, tenofovir disoproxil, tenofovir alafenamide fumarate, tenofovir alafenamide hemifumarate, telbivudine (Tyzeka®) or lamivudine (Epivir-HBV®) and at least one additional therapeutic agent selected from the group consisting of immunomodulators, toll-like receptor modulators (modulators of TLR-1, TLR-2, TLR-3, TLR-4, TLR-5, TLR-6, TLR-7, TLR-8, TLR-9, TLR-10, TLR-11, TLR-12 and TLR-13), interferon alpha receptor ligands, hyaluronidase inhibitors, recombinant IL-7, HBsAg inhibitors, compounds targeting HbcAg, cyclophilin inhibitors, HBV Therapeutic vaccines, HBV prophylactic vaccines, HBV viral entry inhibitors, NTCP inhibitors, antisense oligonucleotide targeting viral mRNA, short interfering RNAs (siRNA), miRNA gene therapy agents, endonuclease modulators, inhibitors of ribonucleotide reductase, Hepatitis B virus E antigen inhibitors, recombinant scavenger receptor A (SRA) proteins, src kinase inhibitors, HBx inhibitors, cccDNA inhibitors, short synthetic hairpin RNAs (sshRNAs), HBV antibodies including HBV antibodies targeting the surface antigens of the hepatitis B virus and bispecific antibodies and "antibody-like" therapeutic proteins (such as DARTs®, Duobodies®, Bites®, XmAbs®, TandAbs®, Fab derivatives), CCR2 chemokine antagonists, thymosin agonists, cytokines, nucleoprotein inhibitors (HBV core or capsid protein inhibitors), stimulators of retinoic acid-inducible gene 1, stimulators of NOD2, stimulators of NOD1, recombinant thymosin alpha-1, Arginase-1 inhibitors, STING agonists, PI3K inhibitors, lymphotoxin beta receptor activators, Natural Killer Cell Receptor 2B4 inhibitors, Lymphocyte-activation gene 3 inhibitors, CD160 inhibitors, cytotoxic T-lymphocyte-associated protein 4 inhibitors, CD137 inhibitors, Killer cell lectin-like receptor subfamily G member 1 inhibitors, TIM-3 inhibitors, B- and T-lymphocyte attenuator inhibitors, CD305 inhibitors, PD-1 inhibitors, PD-L1 inhibitors, PEG-Interferon Lambd, BTK inhibitors, modulators of TIGIT, modulators of CD47, modulators of SIRPalpha, modulators of ICOS, modulators of CD27, modulators of CD70, modulators of OX40, modulators of NKG2D, modulators of Tim-4, modulators of B7-H4, modulators of B7-H3, modulators of NKG2A, modulators of GITR, modulators of CD160, modulators of HEVEM, modulators of CD161, modulators of Axl, modulators of Mer, modulators of Tyro, gene modifiers or editors such as CRISPR (including CRISPR Cas9), zinc finger nucleases or synthetic nucleases (TALENs), a and Hepatitis B virus replication inhibitors. In certain embodiments, the at least one additional therapeutic agent is further selected from hepatitis B surface antigen (HBsAg) secretion or assembly inhibitors, TCR-like antibodies, IDO inhibitors, cccDNA epigenetic modifiers, IAPs inhibitors, and SMAC mimetics.

In a particular embodiment, a compound of the present disclosure, or a pharmaceutically acceptable salt thereof, is combined with a first additional therapeutic agent selected from the group consisting of: entecavir (Baraclude®), adefovir (Hepsera®), tenofovir disoproxil fumarate (Viread®), tenofovir alafenamide, tenofovir, tenofovir disoproxil, tenofovir alafenamide fumarate, tenofovir alafenamide hemifumarate, telbivudine (Tyzeka®) or lamivudine (Epivir-HBV®) and at least a one additional therapeutic agent selected from the group consisting of peginterferon alfa-2b (PEG-Intron®), Multiferon®, interferon alpha 1b (Hapgen®), interferon alpha-2b (Intron A®), pegylated interferon alpha-2a (Pegasys®), interferon alfa-n1 (Humoferon®), ribavirin, interferon beta-1a (Avonex®), Bioferon, Ingaron, Inmutag (Inferon), Algeron, Roferon-A, Oligotide, Zutectra, Shaferon, interferon alfa-2b (AXXO), Alfaferone, interferon alfa-2b (BioGeneric Pharma), Feron, interferon-alpha 2 (CJ), BEVAC, Laferonum, VIPEG, BLAUFERON-B, BLAUFERON-A, Intermax Alpha, Realdiron, Lanstion, Pegaferon, PDferon-B, interferon alfa-2b (IFN, Laboratorios Bioprofarma), alfainterferona 2b, Kalferon, Pegnano, Feronsure, PegiHep, interferon alfa 2b (Zydus-Cadila), Optipeg A, Realfa 2B, Reliferon, interferon alfa-2b (Amega), interferon alfa-2b (Virchow), peginterferon alfa-2b (Amega), Reaferon-EC, Proquiferon, Uniferon, Urifron, interferon alfa-2b (Changchun Institute of Biological Products), Anterferon, Shanferon, MOR-22, interleukin-2 (IL-2, Immunex), recombinant human interleukin-2 (Shenzhen Neptunus), Layfferon, Ka Shu Ning, Shang Sheng Lei Tai, INTEFEN, SINOGEN, Fukangtai, Alloferon and celmoleukin.

In a particular embodiment, a compound of the present disclosure, or a pharmaceutically acceptable salt thereof, is combined with a first additional therapeutic agent selected from the group consisting of: entecavir (Baraclude®), adefovir (Hepsera®), tenofovir disoproxil fumarate (Viread®), tenofovir alafenamide, tenofovir, tenofovir disoproxil, tenofovir alafenamide fumarate, tenofovir alafenamide hemifumarate, telbivudine (Tyzeka®) or lamivudine (Epivir-HBV®) and at least one additional therapeutic agent selected from the group consisting of HBV viral entry inhibitors, NTCP inhibitors, HBx inhibitors, cccDNA inhibitors, HBV antibodies targeting the surface antigens of the hepatitis B virus, short interfering RNAs (siRNA), miRNA gene therapy agents, short synthetic hairpin RNAs (sshRNAs), and nucleoprotein inhibitors (HBV core or capsid protein inhibitors).

In a particular embodiment, a compound of the present disclosure, or a pharmaceutically acceptable salt thereof, is combined with a first additional therapeutic agent selected from the group consisting of: entecavir (Baraclude®), adefovir (Hepsera®), tenofovir disoproxil fumarate (Viread®), tenofovir alafenamide, tenofovir, tenofovir disoproxil, tenofovir alafenamide fumarate, tenofovir alafenamide hemifumarate, telbivudine (Tyzeka®) or lamivudine (Epivir-HBV®), one or two additional therapeutic agents selected from the group consisting of: immunomodulators, toll-like receptor modulators (modulators of TLR-1, TLR-2, TLR-3, TLR-4, TLR-5, TLR-6, TLR-7, TLR-8, TLR-9, TLR-10, TLR-11, TLR-12 and TLR-13), HBsAg inhibitors, HBV therapeutic vaccines, HBV antibodies including HBV antibodies targeting the surface antigens of the hepatitis B virus and bispecific antibodies and "antibody-like" therapeutic proteins (such as DARTs®, Duobodies®, Bites®, XmAbs®, TandAbs®, Fab derivatives), cyclophilin inhibitors, stimulators of retinoic acid-inducible gene 1, PD-1 inhibitors, PD-L1 inhibitors, Arginase-1 inhibitors, PI3K inhibitors and stimulators of NOD2, and one or two additional therapeutic agents selected from the group consisting of: HBV viral entry inhibitors, NTCP inhibitors, HBx inhibitors, cccDNA inhibitors, HBV antibodies targeting the surface antigens of the hepatitis B virus, short interfering RNAs (siRNA), miRNA gene therapy agents, short synthetic hairpin RNAs (sshRNAs), and nucleoprotein inhibitors (HBV core or capsid protein inhibitors). In certain embodiments, the one or two additional therapeutic agents is further selected from hepatitis B surface antigen (HBsAg) secretion or assembly inhibitors, TCR-like antibodies, and IDO inhibitors.

In a particular embodiment, a compound of the present disclosure, or a pharmaceutically acceptable salt thereof, is combined with a first additional therapeutic agent selected from the group consisting of: tenofovir disoproxil fumarate (Viread®), tenofovir alafenamide, tenofovir, tenofovir disoproxil, tenofovir alafenamide fumarate, and tenofovir alafenamide hemifumarate; and a second therapeutic agent selected from the group consisting of: modulators of TLR-7 and modulators of TLR-8.

In certain embodiments, a compound of the present disclosure, or a pharmaceutically acceptable salt thereof, is combined with 5-30 mg tenofovir alafenamide fumarate, tenofovir alafenamide hemifumarate, or tenofovir alafenamide. In certain embodiments, a compound of the present disclosure, or a pharmaceutically acceptable salt thereof, is combined with 5-10; 5-15; 5-20; 5-25; 25-30; 20-30; 15-30; or 10-30 mg tenofovir alafenamide fumarate, tenofovir alafenamide hemifumarate, or tenofovir alafenamide. In certain embodiments, a compound of the present disclosure, or a pharmaceutically acceptable salt thereof, is combined with 10 mg tenofovir alafenamide fumarate, tenofovir alafenamide hemifumarate, or tenofovir alafenamide. In certain embodiments, a compound of the present disclosure, or a pharmaceutically acceptable salt thereof, is combined with 25 mg tenofovir alafenamide fumarate, tenofovir alafenamide hemifumarate, or tenofovir alafenamide. A compound of the present disclosure (e.g., a compound of Formula (I)) may be combined with the agents provided herein in any dosage amount of the compound (e.g., from 50 mg to 500 mg of compound) the same as if each combination of dosages were specifically and individually listed. A compound of the present disclosure (e.g., a compound of Formula (I)) may be combined with the agents provided herein in any dosage amount of the compound (e.g. from about 1 mg to about 150 mg of compound) the same as if each combination of dosages were specifically and individually listed.

In certain embodiments, a compound of the present disclosure, or a pharmaceutically acceptable salt thereof, is combined with 100-400 mg tenofovir disoproxil fumarate, tenofovir disoproxil hemifumarate, or tenofovir disoproxil. In certain embodiments, a compound of the present disclosure, or a pharmaceutically acceptable salt thereof, is combined with 100-150; 100-200, 100-250; 100-300; 100-350; 150-200; 150-250; 150-300; 150-350; 150-400; 200-250; 200-300; 200-350; 200-400; 250-350; 250-400; 350-400 or 300-400 mg tenofovir disoproxil fumarate, tenofovir disoproxil hemifumarate, or tenofovir disoproxil. In certain embodiments, a compound of the present disclosure, or a pharmaceutically acceptable salt thereof, is combined with 300 mg tenofovir disoproxil fumarate, tenofovir disoproxil hemifumarate, or tenofovir disoproxil. In certain embodiments, a compound of the present disclosure, or a pharmaceutically acceptable salt thereof, is combined with 250 mg tenofovir disoproxil fumarate, tenofovir disoproxil hemifumarate, or tenofovir disoproxil. In certain embodiments, a compound of the present disclosure, or a pharmaceutically acceptable salt thereof, is combined with 150 mg tenofovir disoproxil fumarate, tenofovir disoproxil hemifumarate, or tenofovir disoproxil. A compound of the present disclosure (e.g., a compound of Formula (I)) may be combined with the agents provided herein in any dosage amount of the compound (e.g., from 50 mg to 500 mg of compound) the same as if each combination of dosages were specifically and individually listed. A compound of the present disclosure (e.g., a compound of Formula (I)) may be combined with the agents provided herein in any dosage amount of the compound (e.g., from about 1 mg to about 150 mg of compound) the same as if each combination of dosages were specifically and individually listed.

Also provided herein is a compound of the present disclosure (e.g., a compound of Formula (I)), or a pharmaceutically acceptable salt thereof, and one or more additional active ingredients for treating HBV, for use in a method of treating or preventing HBV.

Also provided herein is a compound of the present disclosure (e.g., a compound of Formula (I)), or a pharmaceutically acceptable salt thereof, for use in a method of treating or preventing HBV, wherein the compound, or a pharmaceutically acceptable salt thereof is administered simultaneously, separately or sequentially with one or more additional therapeutic agents fort for treating HBV.

Kits

The present disclosure provides a kit comprising a compound of the present disclosure or a pharmaceutically acceptable salt thereof. The kit may further comprise instructions for use in treating an HBV infection. The instructions may be written instructions or electronic storage media (e.g., magnetic diskette or optical disk) containing instructions.

The present disclosure also provides a pharmaceutical kit comprising one or more containers comprising a compound of the present disclosure or a pharmaceutically acceptable salt thereof. Optionally associated with such container(s) can be a notice in the form prescribed by a governmental agency regulating the manufacture, use or sale of pharmaceuticals, which notice reflects approval by the agency for the manufacture, use or sale for human administration. Each component (if there is more than one component) can be packaged in separate containers or some components can be combined in one container where cross-reactivity and shelf life permit. The kits may be in unit dosage forms, bulk packages (e.g., multi-dose packages) or sub-unit doses. Kits may also include multiple unit doses of the compounds and instructions for use and be packaged in quantities sufficient for storage and use in pharmacies (e.g., hospital pharmacies and compounding pharmacies).

Compound Preparation

Also provided are articles of manufacture comprising a unit dosage of a compound of the present disclosure or a pharmaceutically acceptable salt thereof, in suitable packaging for use in the methods described herein. Suitable packaging is known in the art and includes, for example, vials, vessels, ampules, bottles, jars, flexible packaging and the like. An article of manufacture may further be sterilized and/or sealed.

Some embodiments of the instant disclosure are directed to processes and intermediates useful for preparing the subject compounds or pharmaceutically acceptable salts thereof.

Many general references providing commonly known chemical synthetic schemes and conditions useful for synthesizing the disclosed compounds are available (see, e.g., Smith, March's Advanced Organic Chemistry: Reactions, Mechanisms, and Structure, $7^{th}$ edition, Wiley-Interscience, 2013.)

Compounds as described herein can be purified by any of the means known in the art, including chromatographic means, such as high performance liquid chromatography (HPLC), preparative thin layer chromatography, flash column chromatography and ion exchange chromatography. Any suitable stationary phase can be used, including normal and reversed phases as well as ionic resins. Most typically the disclosed compounds are purified via silica gel and/or alumina chromatography.

During any of the processes for preparation of the subject compounds, it may be necessary and/or desirable to protect sensitive or reactive groups on any of the molecules concerned. This may be achieved by means of conventional protecting groups as described in standard works, such as T. W. Greene and P. G. M. Wuts, "Protective Groups in Organic Synthesis," $4^{th}$ ed., Wiley, New York 2006. The protecting groups may be removed at a convenient subsequent stage using methods known from the art.

EXAMPLES

Exemplary chemical entities of the present disclosure are provided in the specific examples that follow. Those skilled in the art will recognize that, to obtain the various compounds herein, starting materials may be suitably selected so that the ultimately desired substituents will be carried through the reaction scheme with or without protection as appropriate to yield the desired product. Alternatively, it may be necessary or desirable to employ, in the place of the ultimately desired substituent, a suitable group that may be carried through the reaction scheme and replaced as appropriate with the desired substituent. Furthermore, one of skill in the art will recognize that the transformations shown in the schemes below may be performed in any order that is compatible with the functionality of the particular pendant groups.

The Examples provided herein describe the synthesis of compounds disclosed herein as well as intermediates used to prepare the compounds. It is to be understood that individual steps described herein may be combined. It is also to be understood that separate batches of a compound may be combined and then carried forth in the next synthetic step.

In the following description of the Examples, specific embodiments are described. These embodiments are described in sufficient detail to enable those skilled in the art to practice certain embodiments of the present disclosure. Other embodiments may be utilized and logical and other changes may be made without departing from the scope of the disclosure. The following description is, therefore, not intended to limit the scope of the present disclosure.

Example 1: 10-chloro-9-(3-methoxypropoxy)-6-methyl-2-oxo-6,7-dihydro-2H-pyrido[2,1-a]phthalazine-3-carboxylic acid

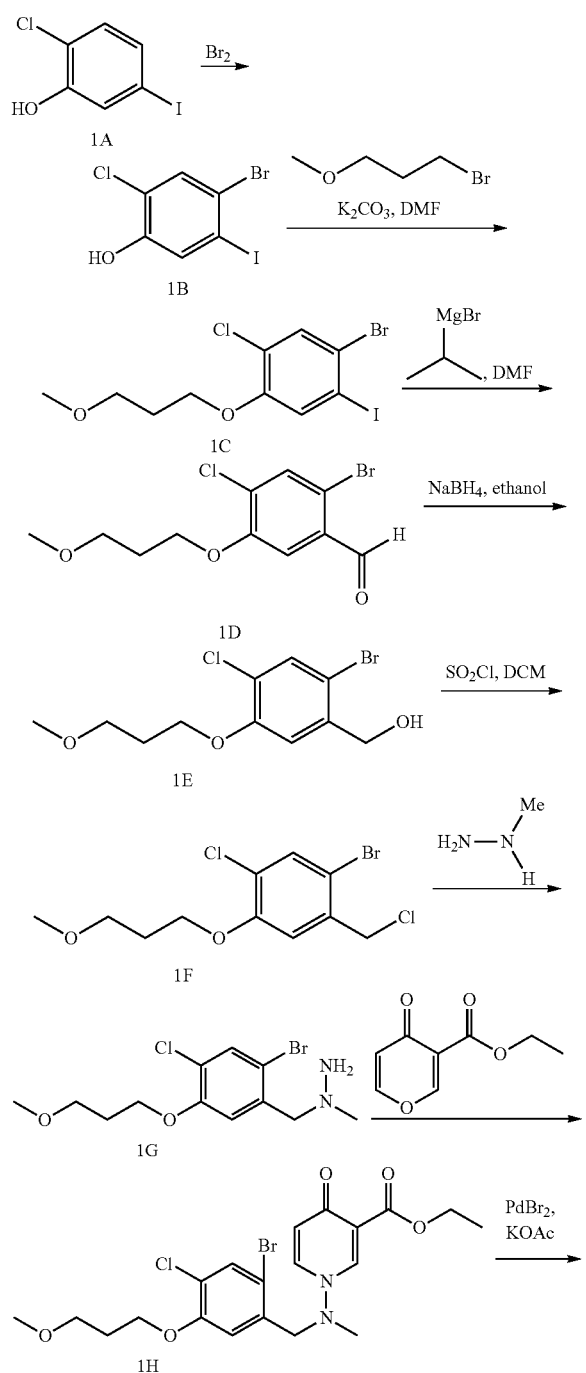

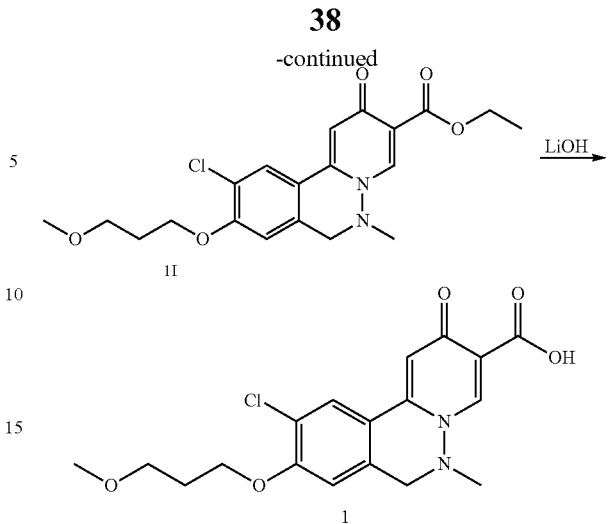

Synthesis of 4-bromo-2-chloro-5-iodophenol (1B)

To a solution of 2-chloro-5-iodophenol (1A) (10 g, 39.3 mmol) in AcOH (20 ml) was added dropwise bromine (2.22 ml, 43.23 mmol) maintaining an internal temperature less than 30° C. After stirring for 20 min, additional bromine (200 μL) was added the reaction was stirred for 20 min. To the reaction was added water (10 mL) followed by 40% $NaHSO_3$ (4 mL). The precipitates were filtered, washed with 50% AcOH (20 mL), followed by water (30 mL). The solids in the filtrate were filtered, washed, combined, and air dried. $^1H$ NMR (400 MHz, Chloroform-d) δ 7.55 (d, J=0.7 Hz, 1H), 7.53 (d, J=0.7 Hz, 1H), 5.46 (s, 1H). MS (m/z) 333.1 [M-H]-.

Synthesis of 1-bromo-5-chloro-2-iodo-4-(3-methoxypropoxy)benzene (1C)

To a solution of 1B (3 g, 9 mmol) in DMF (9 ml) was added $Cs_2CO_3$ (3.81 g, 11.7 mmol) followed by dropwise addition of 1-bromo-3-methoxypropane (1.06 ml, 9.45 mmol). The mixture was stirred overnight at ambient temperature. The mixture was diluted with 10% hexane in EtOAc (40 mL) and washed with water (2×40 mL). The organic layer was dried with $Na_2SO_4$, filtered, and concentrated. Product was purified by silica chromatography using EtOAc in hexane (0-10%). Rf~0.45 w/10% EtOAc/hexanes. $^1H$ NMR (400 MHz, Chloroform-d) δ 7.56 (s, 1H), 7.36 (s, 1H), 4.08 (t, J=6.2 Hz, 2H), 3.57 (t, J=6.0 Hz, 2H), 3.36 (s, 3H), 2.08 (p, J=6.1 Hz, 2H).

Synthesis of 2-bromo-4-chloro-5-(3-methoxypropoxy)benzaldehyde (1D)

To a solution of 1C (3 g, 7.4 mmol) in Me-THF (7 ml) was added isopropylmagnesium chloride lithium chloride complex (1.3 M in THF, 6.26 ml) at −78° C. The mixture was stirred for 1 min, warmed to −20° C., and DMF (1.5 ml) was added in one portion. The mixture was gradually warmed to 0° C. and stirred for 1 h. The reaction was quenched with 4M $NH_4Cl$ (20 mL). The aqueous layer was removed and the organic layer was dried with $Na_2SO_4$, filtered, and concentrated. Product was purified by silica chromatography using EtOAc in hexane (0-10%). Rf ~0.75 w/20% EtOAc in hexane. $^1H$ NMR (400 MHz, Chloroform-d) δ 10.24 (s, 1H), 7.65 (s, 1H), 7.45 (s, 1H), 4.17 (t, J=6.2 Hz, 3H), 3.57 (t, J=6.0 Hz, 3H), 3.35 (s, J=1.1 Hz, 4H), 2.15-2.07 (m, 3H).

Synthesis of (2-bromo-4-chloro-5-(3-methoxypropoxy)phenyl)methanol (1E)

To a solution of 1D (0.5 g, 1.5 mmol) in THF (5 mL) was added NaBH$_4$ (30 mg, 0.8 mmol) followed by MeOH (1.5 mL) The mixture was stirred at room temperature for 1.5 h. The reaction was quenched with aqueous HCl (4 mL, 1 M) and the product was extracted with 3×20 mL of DCM. The combined organic phases was dried with Na$_2$SO$_4$, filtered, and concentrated. $^1$H NMR (400 MHz, Chloroform-d) δ 7.51 (d, J=1.2 Hz, 1H), 7.12 (s, 1H), 4.68 (s, 2H), 4.13 (td, J=6.2, 1.2 Hz, 3H), 3.58 (td, J=6.1, 1.3 Hz, 2H), 3.35 (d, J=1.2 Hz, 3H), 2.09 (pd, J=6.2, 1.3 Hz, 3H).

Synthesis of 1-bromo-5-chloro-2-(chloromethyl)-4-(3-methoxypropoxy)benzene (1F)

To solution of 1E (0.5 g, 1.5 mmol) in DCM (3 mL), thionyl chloride was added dropwise at +5° C. The resulting solution was stirred at room temperature overnight, evaporated to dryness, and then the residue was dissolved in 5 ml dichloromethane. The formed solution was washed by 25 ml of water. The organic layer was separated and the aqueous layer was extracted with 2×5 ml of dichloromethane. The combined organic phases was dried with Na$_2$SO$_4$, filtered, and concentrated. $^1$H NMR (400 MHz, Chloroform-d) δ 7.56 (s, 1H), 7.06 (s, 1H), 4.63 (s, 2H), 4.13 (t, J=6.2 Hz, 2H), 3.59 (t, J=6.0 Hz, 2H), 3.36 (s, 3H), 2.17-2.01 (m, 2H).

Synthesis of 1-(2-bromo-4-chloro-5-(3-methoxypropoxy)benzyl)-1-methylhydrazine (1G)

A solution of 1F (0.038 g, 0.11 mmol) in ethanol (1 mL) was treated with methylhydrazine (0.037 mL, 0.69 mmol) and heated at 50° C. for 2 h. The reaction mixture was concentrated and used as is for the following step. MS (m/z) 339.0 [M+H]+.

Synthesis of ethyl 1-((2-bromo-4-chloro-5-(3-methoxypropoxy)benzyl)(methyl)amino)-4-oxo-1,4-dihydropyridine-3-carboxylate (1H)

A solution of 1G (0.15 g, 0.44 mmol) in ethanol (2 mL) was treated with ethyl 4-oxo-4H-pyran-3-carboxylate (75 mg, 0.44 mmol) and heated to 100° C. for 16 h. The reaction mixture was concentrated, dissolved in DCM (5 mL) and washed with water (25 mL). The combined organic phases was dried with Na$_2$SO$_4$, filtered, and concentrated. MS (m/z) 489.2 [M+H]+.

Synthesis of ethyl 10-chloro-9-(3-methoxypropoxy)-6-methyl-2-oxo-6,7-dihydro-2H-pyrido[2,1-a]phthalazine-3-carboxylate (1I)

A solution of 1H (50 mg, 0.10 mmol), PdBr$_2$ (4 mg, 0.01 mmol), and potassium acetate (25 mg, 0.25 mmol) in N,N-dimethylacetamide (1 ml) was purged with argon for 2 min. The reaction vessel was sealed and the mixture was stirred for 24 h at 90° C. The mixture was cooled and the reaction mixture diluted with acetonitrile filtered through a filter syringe and loaded directly onto the RHPLC using ACN/H$_2$O as eluent, with a 0.1% TFA modifier. $^1$H NMR (400 MHz, Chloroform-d) δ 8.52 (s, 1H), 7.84 (s, 1H), 7.30 (s, 1H), 6.82 (s, 1H), 4.39 (q, J=7.1 Hz, 2H), 4.27 (s, 2H), 4.21 (t, J=6.2 Hz, 2H), 3.61 (t, J=5.9 Hz, 2H), 3.36 (s, 3H), 2.70 (s, 3H), 2.15 (q, J=6.1 Hz, 2H), 1.39 (t, J=7.1 Hz, 3H). MS (m/z) 407.4 [M+H]+.

Synthesis of 10-chloro-9-(3-methoxypropoxy)-6-methyl-2-oxo-6,7-dihydro-2H-pyrido[2,1-a]phthalazine-3-carboxylic acid (1)

The crude reaction mixture containing a solution of 11 in N,N-dimethylacetamide (1 ml) was treated with 2M LiOH (0.25 ml) was heated at 50° C. for 1 h. The mixture was cooled to rt, then acidified with 1 M HCl (0.5 mL). The reaction mixture diluted with acetonitrile filtered through a filter syringe and loaded directly onto the RHPLC using ACN/H$_2$O as eluent, with a 0.1% TFA modifier. $^1$H NMR (400 MHz, Chloroform-d) δ 8.67 (s, 1H), 7.80 (s, 1H), 7.03 (s, 1H), 6.85 (s, 1H), 4.28 (bs, 2H), 4.22 (t, 2H), 3.61 (t, 2H), 3.37 (s, 3H), 2.69 (s, 3H), 2.18-2.14 (m, 2H). MS (m/z) 379.2 [M+H]+.

Example 2: 6-(tert-Butyl)-10-chloro-9-(3-methoxypropoxy)-2-oxo-6,7-dihydro-2H-pyrido[2,1-a]-phthalazine-3-carboxylic acid

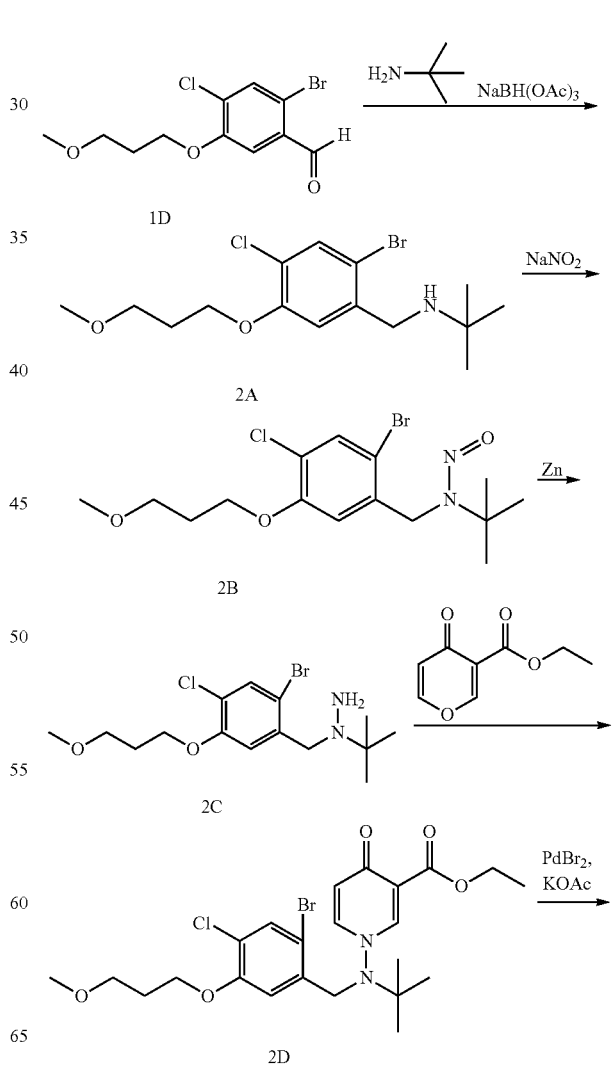

-continued

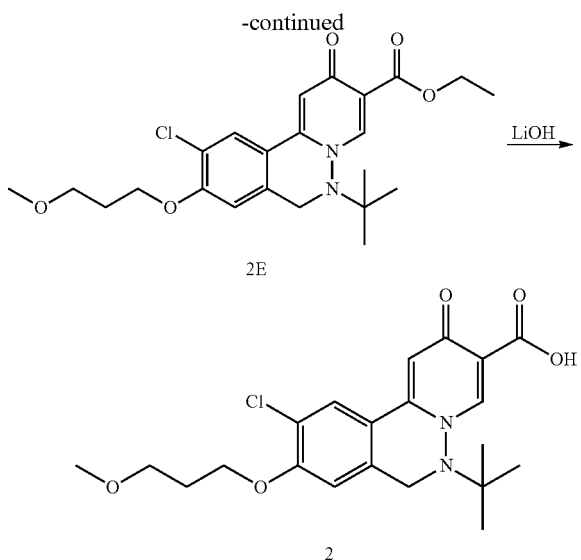

2E

2

Synthesis of N-(2-bromo-4-chloro-5-(3-methoxypropoxy)benzyl)-2-methylpropan-2-amine (2A)

To a solution of 1D (4 g, 13.0 mmol) and tert-butylamine (4.12 ml, 39 mmol) in DCM (40 ml) was added dropwise AcOH (2.23 ml, 39 mmol) at 0° C. The mixture was warmed to room temperature and sodium triacetoxyborohydride (3.31 g, 15.61 mmol) was added. The mixture was vigorously stirred for 8 h, additional sodium triacetoxyborohydride (1.1 g, 5.2 mmol) was added, and the reaction was stirred overnight. The mixture was washed with water (50 mL), followed by 0.2M NaOH (50 mL). The organic layer was dried with $Na_2SO_4$, filtered, and concentrated. Product was purified by silica chromatography using MeOH in DCM (0-10%). $^1$H NMR (400 MHz, Chloroform-d) δ 7.49 (s, 1H), 7.12 (s, 1H), 4.13 (t, J=6.2 Hz, 2H), 3.73 (d, J=2.4 Hz, 2H), 3.58 (t, J=6.1 Hz, 3H), 3.35 (s, 3H), 2.14-2.00 (m, 3H), 1.18 (s, 9H). MS (m/z) 366.0 [M+H]+.

Synthesis of N-(2-bromo-4-chloro-5-(3-methoxypropoxy)benzyl)-N-(tert-butyl)nitrous amide (2B)

To a solution of 2A (0.5 g, 1.5 mmol) in THF (7.5 mL) was added an aqueous solution of $NaNO_2$ (200 mg, 3 mmol in 6 mL of water) followed by acetic acid (0.2 mL, 3.0 mmol). The mixture was stirred at room temperature for 16 h. The reaction mixture was then diluted with $Et_2O$, washed with aqueous $NaHCO_3$ followed by brine, dried with $Na_2SO_4$, filtered, and concentrated. $^1$H NMR (400 MHz, Chloroform-d) δ 7.51 (s, 1H), 6.18 (s, 1H), 4.84-4.74 (m, 2H), 3.94 (t, J=6.2 Hz, 2H), 3.54 (t, J=6.1 Hz, 2H), 3.33 (d, J=0.7 Hz, 3H), 2.01 (p, J=6.1 Hz, 2H), 1.57 (s, 9H). MS (m/z) 394.9 [M+H]+.

Synthesis of 1-(2-bromo-4-chloro-5-(3-methoxypropoxy)benzyl)-1-(tert-butyl)hydrazine (2C)

To a solution of 2B (0.48 g, 1.219 mmol) in TFA (1.44 ml) and water (0.96 ml) was added zinc powder (0.4 g, 6.1 mmol). The mixture was sonicated for 45 min. The solids were filtered and the filtrate was concentrated under vacuum. The crude mixture was diluted with water (8 mL) and basified with 8N NaOH (aq, 1.6 mL). The product was extracted with EtOAc (10 mL). The extractive mixture was filtered and the organic layer was collected from the filtrate. The organic layer was washed with water, dried under $Na_2SO_4$, filtered, and concentrated. Product was purified by silica chromatography using EtOAc in hexanes (0-30%). $^1$H NMR (400 MHz, Chloroform-d) δ 7.50 (s, 1H), 7.25 (s, 1H), 4.14 (t, J=6.1 Hz, 2H), 3.71 (s, 2H), 3.60 (t, J=6.1 Hz, 2H), 3.36 (s, 3H), 2.09 (p, J=6.1 Hz, 2H), 1.19 (s, 9H). MS (m/z) 381.1 [M+H]+.

Synthesis of ethyl 1-((2-bromo-4-chloro-5-(3-methoxypropoxy)benzyl)(tert-butyl)amino)-4-oxo-1,4-dihydropyridine-3-carboxylate (2D)

A solution of ethyl 4-oxo-4H-pyran-3-carboxylate (350 mg, 2.08 mmol) and 2C (869.43 mg, 2.29 mmol) in acetic acid (2.1 ml) was heated in a microwave reactor at 130° C. for 20 min. The mixture was concentrated under vacuum, basified with 1M $NaHCO_3$ (30 mL) and extracted with dichloromethane (20 mL×2). The organic layer was dried with $Na_2SO_4$, filtered, and concentrated. Product was purified by silica chromatography using methanol in dichloromethane (0-5%). Rf ~0.5 w/5% MeOH/DCM. $^1$H NMR (400 MHz, Chloroform-d) δ 8.21 (dd, J=2.9, 1.5 Hz, 1H), 7.48 (d, J=1.7 Hz, 1H), 7.23 (ddd, J=7.9, 3.1, 1.5 Hz, 1H), 6.74 (d, J=1.5 Hz, 1H), 6.24 (dd, J=7.8, 1.7 Hz, 1H), 4.37-4.22 (m, 4H), 4.05-3.89 (m, 2H), 3.58-3.50 (m, 2H), 3.35 (d, J=1.8 Hz, 3H), 2.03 (p, J=6.2, 1.6 Hz, 2H), 1.40-1.27 (m, 11H). MS (m/z) 531.2 [M+H]+.

Synthesis of ethyl 6-(tert-butyl)-10-chloro-9-(3-methoxypropoxy)-2-oxo-6,7-dihydro-2H-pyrido[2,1-a]phthalazine-3-carboxylate (2E)

A solution of ethyl 1-((2-bromo-4-chloro-5-(3-methoxypropoxy)benzyl)(tert-butyl)amino)-4-oxo-1,4-dihydropyridine-3-carboxylate (610 mg, 1.15 mmol), $PdBr_2$ (46 mg, 0.17 mmol), and potassium acetate (282 mg, 2.88 mmol) in N,N-dimethylacetamide (3.7 ml) was purged with argon for 2 min. The reaction vessel was sealed and the mixture was stirred for 24 h at 90° C. The mixture was cooled, diluted with dichloromethane (40 mL) and washed with water (50 mL). The organic layer was dried with $Na_2SO_4$, filtered, and concentrated. Product was purified by silica chromatography using ethanol in dichloromethane (0-8%). $^1$H NMR (400 MHz, Chloroform-d) δ 8.56 (s, 1H), 7.83 (s, 1H), 7.56 (s, 1H), 6.81 (s, 1H), 4.49 (s, 2H), 4.41 (q, J=7.0 Hz, 2H), 4.29-4.13 (m, 2H), 3.67-3.55 (m, 2H), 3.37 (s, 3H), 2.14 (p, J=6.1 Hz, 2H), 1.40 (t, J=7.0 Hz, 3H), 1.02 (s, 9H). MS (m/z) 449.3 [M+H]+.

Synthesis of 6-(tert-butyl)-10-chloro-9-(3-methoxypropoxy)-2-oxo-6,7-dihydro-2H-pyrido[2,1-a]phthalazine-3-carboxylic acid (2)

A solution of ethyl 6-(tert-butyl)-10-chloro-9-(3-methoxypropoxy)-2-oxo-6,7-dihydro-2H-pyrido[2,1-a]phthalazine-3-carboxylate (435 mg, 0.97 mmol) in EtOH (4 ml) and 2M LiOH (1.5 ml) was heated at 50° C. for 1 h. The mixture was cooled to 0° C., concentrated, and then acidified with 1 M HCl (0.25 mL). The resulting precipitates were filtered, washed with 3:2 EtOH:water (2 mL), and water (2 mL). The solids were dried overnight under vacuum. $^1$H NMR (400 MHz, Chloroform-d) δ 8.59 (s, 1H), 7.74 (s, 1H), 6.98 (s, 1H), 6.81 (s, 1H), 4.45 (s, 2H), 4.29-4.12 (m, 2H), 3.68-3.54 (m, 2H), 2.15 (p, J=6.1 Hz, 2H), 1.01 (s, 9H). MS (m/z) 421.2 [M+H]+.

Example 3: 10-chloro-9-(3-methoxypropoxy)-2-oxo-6-(1-(trifluoromethyl)cyclopropyl)-6,7-dihydro-2H-pyrido[2,1-a]phthalazine-3-carboxylic acid

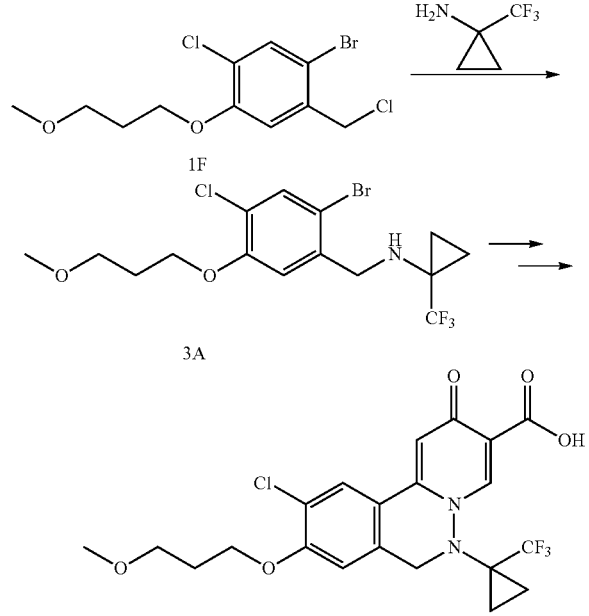

3A

3

Synthesis of N-(2-bromo-4-chloro-5-(3-methoxypropoxy)benzyl)-1-(trifluoromethyl)cyclopropan-1-amine (3A)

A solution of 1F (200 mg, 0.61 mmol) in DMA (4 mL) was treated with 1-(trifluoromethyl)cyclopropan-1-amine hydrochloride (197 mg, 1.2 mmol) followed by K₂CO₃ (337 mg, 2 mmol) and NaI (137 mg, 0.9 mmol) The reaction was heated to 50° C. for 2 h. Upon cooling the reaction was filtered through Celite, and the filtrate was poured onto brine solution (20 mL). The product was extracted with dichloromethane (20 mL×2) and the organic layer was dried with Na₂SO₄, filtered, and concentrated. MS (m/z) 417.9 [M+H]+.

Synthesis of 10-chloro-9-(3-methoxypropoxy)-2-oxo-6-(1-(trifluoromethyl)cyclopropyl)-6,7-dihydro-2H-pyrido[2,1-a]phthalazine-3-carboxylic acid (3)

Example 3 was prepared analogously to Example 2 using N-(2-bromo-4-chloro-5-(3-methoxypropoxy)benzyl)-1-(trifluoromethyl)cyclopropan-1-amine in place of N-(2-bromo-4-chloro-5-(3-methoxypropoxy)benzyl)-2-methylpropan-2-amine. ¹H NMR (400 MHz, Chloroform-d) δ 8.70 (s, 1H), 7.76 (s, 1H), 6.94 (s, 1H), 6.84 (s, 1H), 4.57 (s, 2H), 4.22 (t, J=6.2 Hz, 2H), 3.61 (t, J=5.9 Hz, 2H), 3.37 (s, 3H), 2.16 (p, J=6.2 Hz, 2H), 1.25 (s, 2H), 1.14 (s, 2H), 0.80 (s, 2H). MS (m/z) 473.2 [M+H]+.

Example 4: 10-chloro-9-(3-methoxypropoxy)-2-oxo-6-(1-(trifluoromethyl)cyclobutyl)-6,7-dihydro-2H-pyrido[2,1-a]phthalazine-3-carboxylic acid

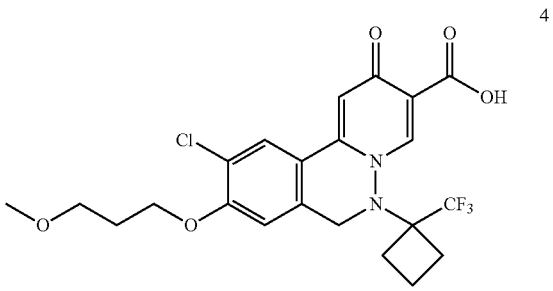 [SMILES: COCCCOc1cc2c(cc1Cl)-c1cc(=O)c(C(=O)O)cn1N(C1(C(F)(F)F)CCC1)C2]

4

Synthesis of 10-chloro-9-(3-methoxypropoxy)-2-oxo-6-(1-(trifluoromethyl)cyclobutyl)-6,7-dihydro-2H-pyrido[2,1-a]phthalazine-3-carboxylic acid (4)

Example 4 was prepared similarly to Example 3 using 1-(trifluoromethyl)cyclobutan-1-amine hydrochloride in place of 1-(trifluoromethyl)-cyclopropan-1-amine hydrochloride. ¹H NMR (400 MHz, Chloroform-d) δ 8.49 (s, 1H), 7.86 (s, 1H), 7.07 (s, 1H), 6.83 (s, 1H), 4.21 (bs, 2H), 4.20 (t, 2H), 3.61 (t, 2H), 3.37 (s, 3H), 2.17-2.14 (m, 4H), 1.90-1.45 (m, 4H). MS (m/z) 487.3 [M+H]+.

Example 5: 6-(bicyclo[1.1.1]pentan-1-yl)-10-chloro-9-(3-methoxypropoxy)-2-oxo-6,7-dihydro-2H-pyrido[2,1-a]phthalazine-3-carboxylic acid

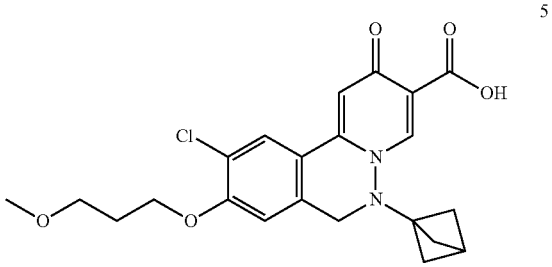 [SMILES: COCCCOc1cc2c(cc1Cl)-c1cc(=O)c(C(=O)O)cn1N(C13CC(C1)C3)C2]

5

Synthesis of 6-(bicyclo[1.1.1]pentan-1-yl)-10-chloro-9-(3-methoxypropoxy)-2-oxo-6,7-dihydro-2H-pyrido[2,1-a]phthalazine-3-carboxylic acid (5)

Example 5 was prepared analogously to Example 3 using bicyclo[1.1.1]pentan-1-amine hydrochloride in place of 1-(trifluoromethyl)-cyclopropan-1-amine hydrochloride. ¹H NMR (400 MHz, Chloroform-d) δ 8.54 (s, 1H), 7.77 (s, 1H), 7.07 (s, 1H), 6.82 (s, 1H), 4.37 (s, 2H), 4.21 (t, J=6.3 Hz, 2H), 3.62 (t, J=5.9 Hz, 2H), 3.37 (s, 3H), 2.40 (s, 1H), 2.20-2.09 (m, 2H), 1.58 (s, 6H). MS (m/z) 431.2 [M+H]+.

Example 6: 10-chloro-9-(3-methoxypropoxy)-6-(1-methylcyclopropyl)-2-oxo-6,7-dihydro-2H-pyrido[2,1-a]phthalazine-3-carboxylic acid

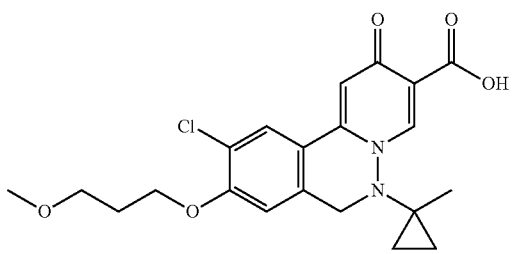

Synthesis of 10-chloro-9-(3-methoxypropoxy)-6-(1-methylcyclopropyl)-2-oxo-6,7-dihydro-2H-pyrido[2,1-a]phthalazine-3-carboxylic acid (6)

Example 6 was prepared analogously to Example 2 using 1-methylcyclopropan-1-amine hydrochloride in place of tert-butyl amine. $^1$H NMR (400 MHz, Chloroform-d) δ 8.49 (s, 1H), 7.71 (s, 1H), 6.99 (s, 1H), 6.77 (s, 1H), 4.36 (s, 2H), 4.15 (t, J=6.2 Hz, 2H), 3.54 (t, J=5.9 Hz, 2H), 3.30 (s, 3H), 2.08 (t, J=6.1 Hz, 2H), 1.05 (s, 2H), 0.59 (s, 3H), 0.52 (d, J=1.5 Hz, 2H). MS (m/z) 419.1 [M+H]+.

Example 7: 10-chloro-9-(3-methoxypropoxy)-6-(1-methylcyclobutyl)-2-oxo-6,7-dihydro-2H-pyrido[2,1-a]phthalazine-3-carboxylic acid

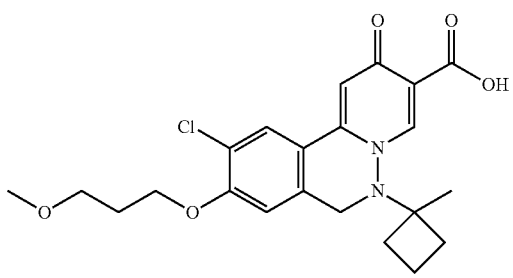

Synthesis of 10-chloro-9-(3-methoxypropoxy)-6-(1-methylcyclobutyl)-2-oxo-6,7-dihydro-2H-pyrido[2,1-a]phthalazine-3-carboxylic acid (7)

Example 7 was prepared analogously to Example 2 using 1-methylcyclobutan-1-amine hydrochloride in place of tert-butyl amine. $^1$H NMR (400 MHz, Chloroform-d) δ 8.60 (s, 1H), 7.75 (s, 1H), 7.08 (s, 1H), 6.78 (s, 1H), 4.36 (s, 2H), 4.20 (t, J=6.3 Hz, 2H), 3.61 (t, J=5.9 Hz, 2H), 3.37 (s, 3H), 2.15 (p, J=6.1 Hz, 2H), 2.06-1.91 (m, 2H), 1.69-1.41 (m, 4H), 1.11 (s, 3H). MS (m/z) 433.3 [M+H]+.

Example 8: 10-chloro-6-(1-methoxy-2-methylpropan-2-yl)-9-(3-methoxypropoxy)-2-oxo-6,7-dihydro-2H-pyrido[2,1-a]phthalazine-3-carboxylic acid

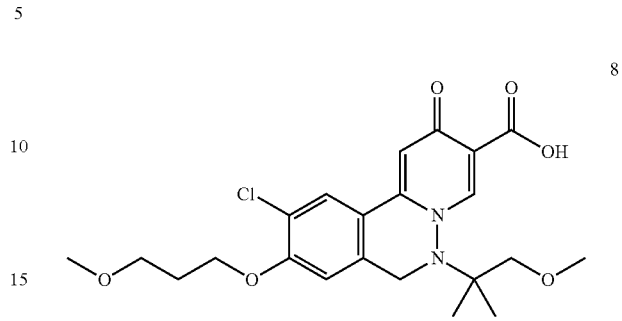

Synthesis of 10-chloro-6-(1-methoxy-2-methylpropan-2-yl)-9-(3-methoxypropoxy)-2-oxo-6,7-dihydro-2H-pyrido[2,1-a]phthalazine-3-carboxylic acid (8)

Example 8 was prepared analogously to Example 2 using 1-methoxy-2-methylpropan-2-amine hydrochloride in place of tert-butyl amine. $^1$H NMR (400 MHz, Chloroform-d) δ 8.73 (s, 1H), 7.77 (s, 1H), 7.15 (s, 1H), 6.84 (s, 1H), 4.63-4.31 (m, 2H), 4.32-4.08 (m, 2H), 3.79-3.53 (m, 2H), 3.38 (d, J=0.7 Hz, 3H), 3.16 (s, 3H), 3.12-2.91 (m, 2H), 2.15 (q, J=6.0 Hz, 2H), 1.14 (s, 3H), 0.83 (s, 3H). MS (m/z) 451.3 [M+H]+.

Example 9: 10-chloro-9-(3-methoxypropoxy)-2-oxo-6-(1,1,1-trifluoro-2-methylpropan-2-yl)-6,7-dihydro-2H-pyrido[2,1-a]phthalazine-3-carboxylic acid

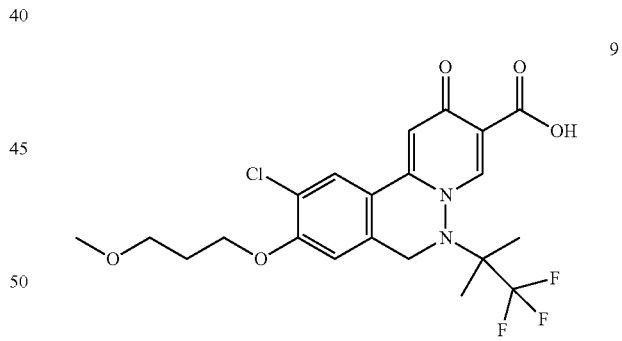

Synthesis of 10-chloro-9-(3-methoxypropoxy)-2-oxo-6-(1,1,1-trifluoro-2-methylpropan-2-yl)-6,7-dihydro-2H-pyrido[2,1-a]phthalazine-3-carboxylic acid (9)

Example 9 was prepared analogously to Example 2 using 1,1,1-trifluoro-2-methylpropan-2-amine hydrochloride in place of tert-butyl amine. $^1$H NMR (400 MHz, Chloroform-d) δ 8.57 (s, 1H), 8.10 (s, 1H), 7.23 (s, 1H), 7.14 (s, 1H), 4.71 (d, J=8.1 Hz, 2H), 4.25 (qt, J=9.2, 6.2 Hz, 2H), 3.62 (td, J=6.1, 1.0 Hz, 2H), 3.35 (s, 2H), 2.11 (p, J=6.2 Hz, 2H), 1.26 (s, 4H), 1.03 (s, 3H). MS (m/z) 475.3 [M+H]+.

Example 10: 6-(tert-butyl)-10-methoxy-9-(3-methoxypropoxy)-2-oxo-6,7-dihydro-2H-pyrido[2,1-a]phthalazine-3-carboxylic acid

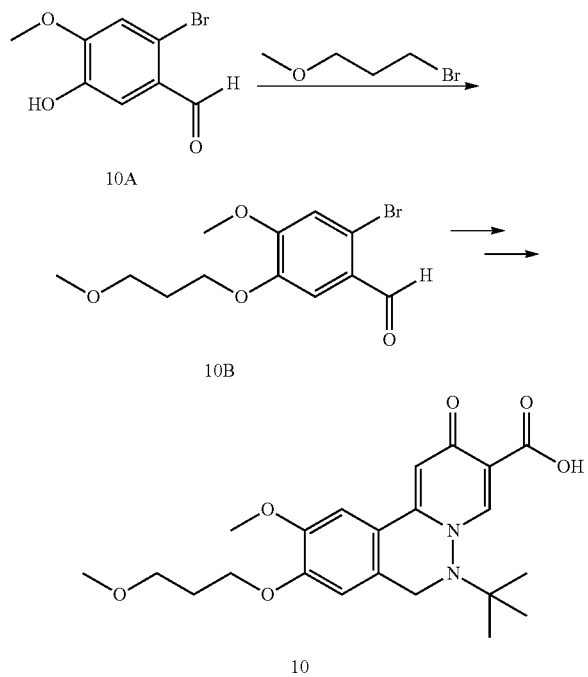

Synthesis of 2-bromo-4-methoxy-5-(3-methoxypropoxy)benzaldehyde (10B)

To a solution of 10A (10 g, 43 mmol) in DMF (40 ml) was added K$_2$CO$_3$ (12 g, 87 mmol) followed by dropwise addition of 1-bromo-3-methoxypropane (7.3 g, 48 mmol). The reaction mixture was heated to 50° C. for 1 h. The reaction was then poured onto ice and water and the resulting solid was collected by filtration. The solid was washed with water and dried. $^1$H NMR (400 MHz, Chloroform-d) δ 10.17 (s, 1H), 7.43 (s, 1H), 7.04 (s, 1H), 4.14 (t, J=6.5 Hz, 3H), 3.93 (s, 3H), 3.54 (t, J=6.1 Hz, 3H), 3.34 (s, 3H), 2.10 (p, J=6.3 Hz, 3H).

Synthesis of 6-(tert-butyl)-10-methoxy-9-(3-methoxypropoxy)-2-oxo-6,7-dihydro-2H-pyrido[2,1-a]phthalazine-3-carboxylic acid (10)

Example 10 was prepared analogously to Example 2 using 10B and 2-bromo-4-methoxy-5-(3-methoxypropoxy)benzaldehyde in place of 2-bromo-4-chloro-5-(3-methoxypropoxy)benzaldehyde. $^1$H NMR (400 MHz, Chloroform-d) δ 8.65 (s, 1H), 7.25 (s, 1H), 7.18 (s, 1H), 6.75 (s, 1H), 4.51-4.40 (m, 2H), 4.27-4.13 (m, 2H), 3.94 (s, 3H), 3.60 (td, J=6.1, 3.6 Hz, 2H), 3.37 (s, 3H), 2.16 (p, J=6.3 Hz, 2H), 1.01 (s, 8H). MS (m/z) 417.4 [M+H]+.

Example 11: 10-methoxy-6-(1-methoxy-2-methyl-propan-2-yl)-9-(3-methoxypropoxy)-2-oxo-6,7-dihydro-2H-pyrido[2,1-a]phthalazine-3-carboxylic acid

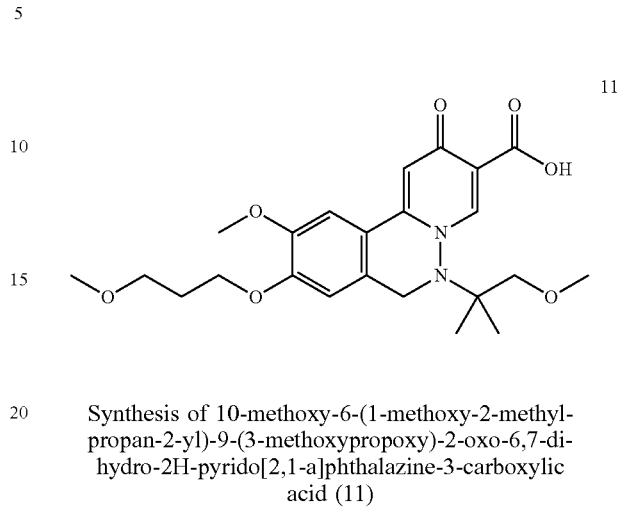

Synthesis of 10-methoxy-6-(1-methoxy-2-methyl-propan-2-yl)-9-(3-methoxypropoxy)-2-oxo-6,7-dihydro-2H-pyrido[2,1-a]phthalazine-3-carboxylic acid (11)

Example 11 was prepared analogously to Example 10 using 1-methoxy-2-methylpropan-2-amine hydrochloride in place of tert-butyl amine. $^1$H NMR (400 MHz, Chloroform-d) δ 8.69 (s, 1H), 7.16 (s, 1H), 7.17 (s, 1H), 6.75 (s, 1H), 4.44 (s, 2H), 4.18 (qt, J=9.3, 6.4 Hz, 2H), 3.93 (s, 3H), 3.70 (s, 2H), 3.59 (tq, J=7.4, 3.6 Hz, 2H), 3.36 (s, 3H), 3.17 (s, 3H), 3.03 (s, 2H), 2.15 (p, J=6.3 Hz, 2H), 1.12 (s, 3H), 0.80 (s, 3H). MS (m/z) 475.3 [M+H]+.

Example 12: 6-(tert-butyl)-10-chloro-9-(3-(methoxy-d3)propoxy)-2-oxo-6,7-dihydro-2H-pyrido[2,1-a]phthalazine-3-carboxylic acid

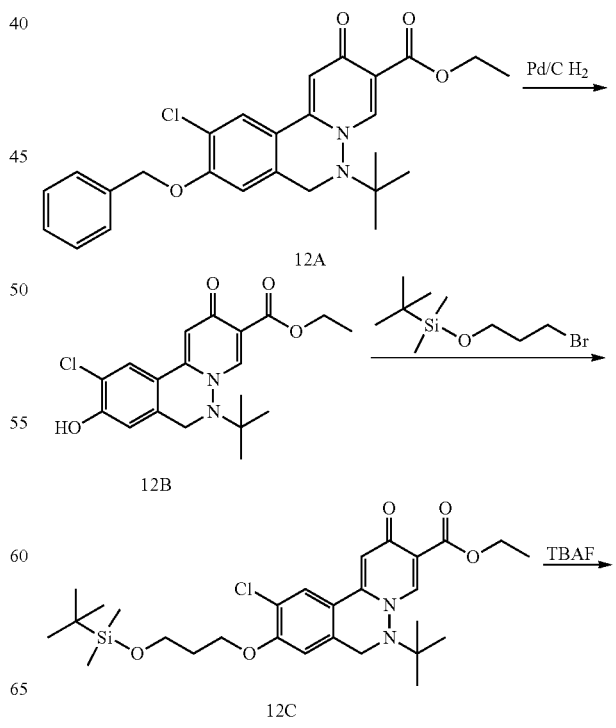

-continued

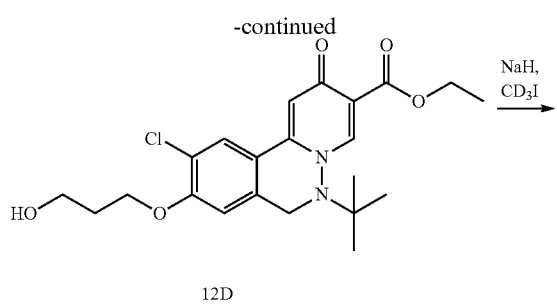

12D

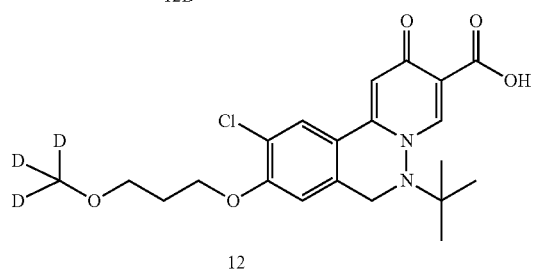

12

Synthesis of ethyl 9-(benzyloxy)-6-(tert-butyl)-10-chloro-2-oxo-6,7-dihydro-2H-pyrido[2,1-a]phthalazine-3-carboxylate (12A)

12A was prepared similarly to 2E substituting 1D with 12A.

Synthesis of ethyl 6-(tert-butyl)-10-chloro-9-hydroxy-2-oxo-6,7-dihydro-2H-pyrido[2,1-a]phthalazine-3-carboxylate (12B)

A suspension of 12A (20.0 g, 42.83 mmol) in EtOH (1000 mL) was twice purged with argon/vacuum. Added Pd/C (2.279 g, 2.14 mmol) and purged with argon/vac twice. The atmosphere was replaced with hydrogen, and the mixture was stirred under a balloon of hydrogen. After 4 hr, the suspension was filtered over celite and rinsed with EtOH and acetone. The filtered solids and celite cake was suspended in water and 17 mL of 2N NaOH was added. The suspension was diluted to ~800 mL total volume. After 2 hr, the suspension filtered, and the filtrate was treated with 17 mL of 2N HCl to give a precipitate. The solids were rinsed with water and dried under vacuum give desired product as a white solid. $^1$H NMR (400 MHz, Methanol-d4) δ 8.46 (s, 1H), 7.90 (s, 1H), 6.91 (s, 1H), 6.88 (s, 1H), 4.63-4.38 (m, 2H), 4.32 (q, J=7.1 Hz, 2H), 1.35 (t, J=7.1 Hz, 3H), 1.02 (s, 9H). MS (m/z) 377.1 [M+H]+.

Synthesis of ethyl 6-(tert-butyl)-9-(3-((tert-butyldimethylsilyl)oxy)propoxy)-10-chloro-2-oxo-6,7-dihydro-2H-pyrido[2,1-a]phthalazine-3-carboxylate (12C)

To a solution of 12B (130 mg, 344.98 μmol) in DMF (2 mL) in a 50 ml rb flask, was added potassium carbonate (143 mg, 1.04 mmol) and (3-bromopropoxy)(tert-butyl)dimethylsilane (0.13 ml, 560 μmol). The reaction was heated at 65 deg for 2 hr. The reaction was cooled to rt, diluted with EtOAc and washed with 5% LiCl and brine 2x. The organic extract was dried over sodium sulfate, filtered, and concentrated. The crude carried onto next step without purification. MS (m/z) 549.4 [M]+.

Synthesis of ethyl 6-(tert-butyl)-10-chloro-9-(3-hydroxypropoxy)-2-oxo-6,7-dihydro-2H-pyrido[2,1-a]phthalazine-3-carboxylate (12D)

To a solution of 12C (188.9 mg, 343.97 μmol) in THF (10 mL) at 0 deg, was added TBAF (1.0 M in THF) (500 μl). The reaction was gradually warmed to rt and stirred overnight. The reaction was quenched with NaHCO3 solution and stirred for 1 hr, then diluted with DCM. The organic was separated and washed with brine 2x. The organic extract was dried over sodium sulfate, filtered, and concentrated. The crude was carried onto next step without purification. MS (m/z) 435.2 [M+H]+.

Synthesis of 6-(tert-butyl)-10-chloro-9-(3-(methoxy-d3)propoxy)-2-oxo-6,7-dihydro-2H-pyrido[2,1-a]phthalazine-3-carboxylic acid (12)

To a solution 12D (200 mg, 161.41 μmol) and iodomethane-d3 (0.3 ml, 4621.1 μmol) in THF (5 mL), was added sodium hydride 60% dispersion in mineral oil (94.3 mg, 2.358 mmol). The suspension was heated at 40 deg for 2 hr. The reaction was cooled to rt, diluted with DCM and washed with NH$_4$Cl 2x. The organic extract was dried over sodium sulfate, filtered and concentrated. The product was purified with RHPLC using ACN/H$_2$O as eluent, with a 0.1% TFA modifier to give desired product as a white solid. $^1$H NMR (400 MHz, Chloroform-d) δ 8.64 (s, 1H), 7.76 (s, 1H), 7.12 (s, 1H), 6.83 (s, 1H), 4.47 (s, 2H), 4.35-4.11 (m, 2H), 3.76-3.57 (m, 2H), 2.15 (p, J=6.1 Hz, 2H), 1.02 (s, 9H). MS (m/z) 424.3 [M+H]+.

Example 13: 6-(tert-butyl)-10-chloro-2-oxo-9-(2-(2,2,2-trifluoroethoxy)ethoxy)-6,7-dihydro-2H-pyrido[2,1-a]phthalazine-3-carboxylic acid

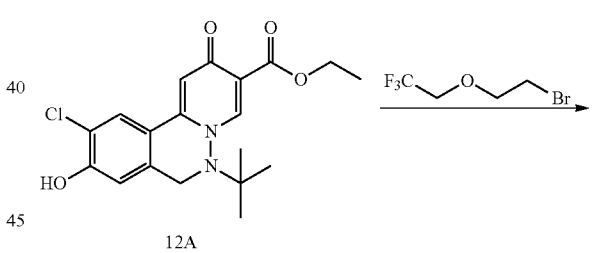

12A

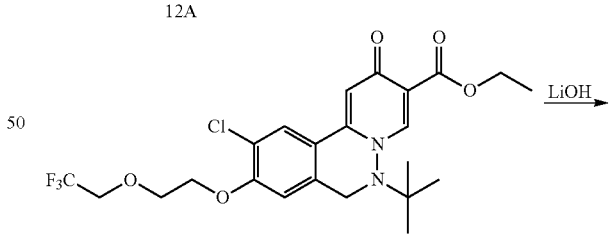

13A

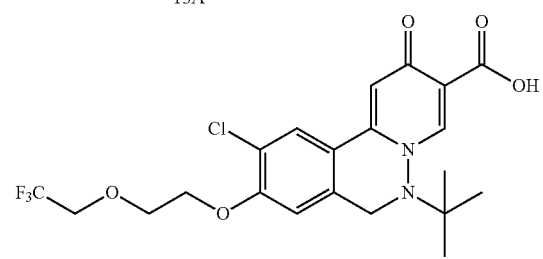

13

Synthesis of ethyl 6-(tert-butyl)-10-chloro-9-hydroxy-2-oxo-6,7-dihydro-2H-pyrido[2,1-a]phthalazine-3-carboxylate (13A)

13A was prepared similarly to 12C, substituting 2-(2-bromoethoxy)-1,1,1-trifluoroethane for (3-bromopropoxy)(tert-butyl)dimethylsilane.

Synthesis of 6-(tert-butyl)-10-chloro-2-oxo-9-(2-(2,2,2-trifluoroethoxy)ethoxy)-6,7-dihydro-2H-pyrido[2,1-a]phthalazine-3-carboxylic acid (13)

13 was prepared similarly to 2, substituting 13A for 2E. $^1$H NMR (400 MHz, Chloroform-d) δ 8.65 (d, J=15.5 Hz, 1H), 7.77 (s, 1H), 7.06 (s, 1H), 6.88 (d, J=10.0 Hz, 1H), 4.51-4.32 (m, 3H), 4.30 (s, 1H), 4.14-3.97 (m, 4H), 1.01 (s, 8H), 0.96 (s, 2H). MS (m/z) 475.61 [M+H]+.

Example 14: 10-methoxy-9-(3-methoxypropoxy)-2-oxo-6-(1-(trifluoromethyl)cyclopropyl)-6,7-dihydro-2H-pyrido[2,1-a]phthalazine-3-carboxylic acid

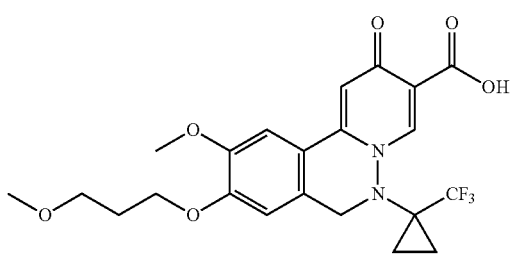

14

Synthesis of 10-methoxy-9-(3-methoxypropoxy)-2-oxo-6-(1-(trifluoromethyl)cyclopropyl)-6,7-dihydro-2H-pyrido[2,1-a]phthalazine-3-carboxylic acid (14)

14 was prepared similarly to 2 using 2-bromo-4-methoxy-5-(2-methoxyethoxy)benzaldehyde in place of 1D and 1-(trifluoromethyl)cyclopropan-1-amine hydrochloride in place of tert-butylamine. 1H NMR (400 MHz, Chloroform-d) δ 8.73 (s, 1H), 7.15 (s, 1H), 7.09 (s, 1H), 6.77 (s, 1H), 4.54 (s, 2H), 4.19 (t, J=6.5 Hz, 2H), 3.94 (s, 3H), 3.58 (t, J=5.9 Hz, 2H), 3.36 (s, 3H), 2.15 (p, J=6.3 Hz, 2H), 1.17-1.03 (m, 2H), 0.77 (s, 2H). MS (m/z) 469.39 [M+H]+.

Example 15: 10-methoxy-9-(3-methoxypropoxy)-2-oxo-6-(1,1,1-trifluoro-2-methylpropan-2-yl)-6,7-dihydro-2H-pyrido[2,1-a]phthalazine-3-carboxylic acid

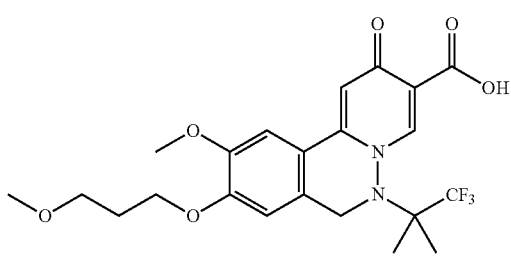

15

Synthesis of 10-methoxy-9-(3-methoxypropoxy)-2-oxo-6-(1,1,1-trifluoro-2-methylpropan-2-yl)-6,7-dihydro-2H-pyrido[2,1-a]phthalazine-3-carboxylic acid (15)

15 was prepared similarly to Example 14 using 1,1,1-trifluoro-2-methylpropan-2-amine in place of 1-(trifluoromethyl)cyclopropan-1-amine hydrochloride. 1H NMR (400 MHz, Chloroform-d) δ 8.66 (s, 1H), 7.19 (s, 1H), 7.11 (s, 1H), 6.77 (s, 1H), 4.59 (d, J=17.2 Hz, 1H), 4.43 (d, J=17.2 Hz, 1H), 4.27-4.11 (m, 2H), 3.95 (s, 3H), 3.59 (tq, J=7.1, 3.6 Hz, 2H), 3.37 (s, 3H), 2.15 (p, J=6.3 Hz, 2H), 1.16 (s, 3H), 1.04 (s, 3H). MS (m/z) 471.50 [M+H]+.

Example 16: 10-chloro-6-(1-hydroxy-2-methylpropan-2-yl)-9-(3-methoxypropoxy)-2-oxo-6,7-dihydro-2H-pyrido[2,1-a]phthalazine-3-carboxylic acid

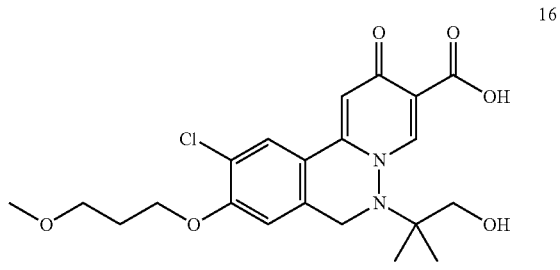 [SMILES: COCCCOc1cc2c(cc1Cl)-c1cc(=O)c(C(=O)O)cn1N(C(C)(C)CO)C2]

16

Synthesis of 10-chloro-6-(1-hydroxy-2-methylpropan-2-yl)-9-(3-methoxypropoxy)-2-oxo-6,7-dihydro-2H-pyrido[2,1-a]phthalazine-3-carboxylic acid (16)

16 was made according the method used in Example 2 using 2-amino-2-methylpropan-1-ol in place of tert-butylamine. 1H NMR (400 MHz, Chloroform-d) δ 8.75 (s, 1H), 8.58 (s, 1H), 7.77 (s, 1H), 7.06 (d, J=16.2 Hz, 1H), 6.84 (s, 1H), 4.69-4.39 (m, 2H), 4.28-4.06 (m, 2H), 3.73-3.55 (m, 2H), 3.25 (m, 2H), 1.25 (s, 5H), 2.1 (m, 2H), 1.17-1.00 (m, 6H). 19F NMR (377 MHz, Chloroform-d) 6-75.15. MS (m/z) 437.33 [M+H]+.

Example 17: 10-chloro-9-(3-methoxypropoxy)-2-oxo-6-(tert-pentyl)-6,7-dihydro-2H-pyrido[2,1-a]phthalazine-3-carboxylic acid

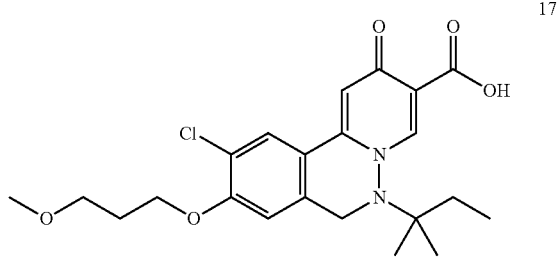 [SMILES: CCC(C)(C)N1Cc2cc(OCCCOC)c(Cl)cc2-c2cc(=O)c(C(=O)O)cn21]

17

Synthesis of 10-chloro-9-(3-methoxypropoxy)-2-oxo-6-(tert-pentyl)-6,7-dihydro-2H-pyrido[2,1-a]phthalazine-3-carboxylic acid (13)

The titled compound was made similarly to 2 using 2-methylbutan-2-amine in place of and tert-butylamine. 1H NMR (400 MHz, DMSO-d6) δ 8.37 (s, 1H), 8.22 (s, 1H), 7.42 (s, 1H), 7.37 (s, 1H), 4.62 (d, J=17.2 Hz, 1H), 4.55-4.41 (m, 2H), 4.26-4.05 (m, 3H), 3.53-3.43 (m, 3H), 3.23 (d, J=4.9 Hz, 2H), 1.98 (dt, J=17.0, 6.2 Hz, 2H), 1.49 (dd, J=14.4, 7.2 Hz, 1H), 1.40-1.29 (m, 2H), 0.90 (t, J=7.3 Hz, 3H), 0.80 (s, 3H), 0.70 (s, 3H). 19F NMR (377 MHz, DMSO-d6) δ −73.97. MS (m/z) 435.36 [M+H]+.

Example 18: 10-chloro-9-(3-methoxypropoxy)-6-neopentyl-2-oxo-6,7-dihydro-2H-pyrido[2,1-a]phthalazine-3-carboxylic acid

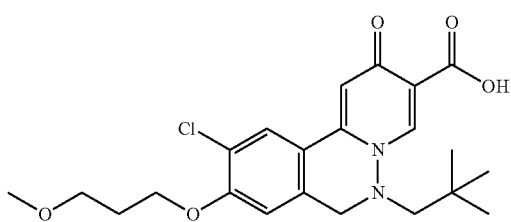

Synthesis of 10-chloro-9-(3-methoxypropoxy)-6-neopentyl-2-oxo-6,7-dihydro-2H-pyrido[2,1-a]phthalazine-3-carboxylic acid (18)

18 was made in a similar fashion to 2 substituting neopentylamine for tert-butylamine. ¹H NMR (400 MHz, Chloroform-d) δ 8.73 (s, 1H), 7.82 (s, 1H), 7.14 (s, 1H), 6.85 (s, 1H), 4.32 (s, 2H), 4.23 (t, J=6.2 Hz, 2H), 3.63 (t, J=5.9 Hz, 2H), 3.38 (s, 3H), 2.58 (s, 2H), 2.16 (t, J=6.0 Hz, 2H), 1.00 (s, 9H). MS (m/z) 435.4 [M+H]+.

Example 19: 10-chloro-6-(3,3-difluoro-1-methylcyclobutyl)-9-(3-methoxypropoxy)-2-oxo-6,7-dihydro-2H-pyrido[2,1-a]phthalazine-3-carboxylic acid

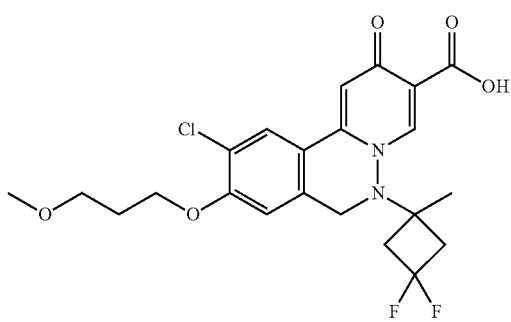 [SMILES: COCCCOc1cc2c(cc1Cl)-c1cc(=O)c(C(=O)O)cn1N(C1(C)CC(F)(F)C1)C2]

Synthesis of 10-chloro-6-(3,3-difluoro-1-methylcyclobutyl)-9-(3-methoxypropoxy)-2-oxo-6,7-dihydro-2H-pyrido[2,1-a]phthalazine-3-carboxylic acid (19)

19 was prepared similarly to 2 using 3,3-difluoro-1-methylcyclobutan-1-amine in place of tert-butylamine. ¹H NMR (400 MHz, Chloroform-d) δ 8.59 (s, 1H), 7.77 (s, 1H), 7.01 (s, 1H), 6.80 (s, 1H), 4.41 (s, 2H), 4.21 (t, J=6.3 Hz, 2H), 3.61 (t, J=5.8 Hz, 2H), 3.37 (s, 3H), 2.67 (t, J=14.1 Hz, 2H), 2.35 (t, J=12.9 Hz, 2H), 2.14 (q, J=6.1 Hz, 2H), 1.11 (s, 3H). MS (m/z) 469.3 [M+H]+.

Example 20: PHH Assay for Inhibition of HBsAg

Primary human hepatocytes (PHH) (Bioreclamation IVT) were plated on collagen-coated flasks using Plating Media (Life Technologies) containing William's Medium E supplemented with 1% penicillin/streptomycin, 4 μg/mL human recombinant insulin, 2 mM GlutaMAX, 15 mM HEPES, 1 μM dexamethasone, 5% fetal bovine serum, and 0.2% Torpedo Antibiotic Mix (Bioreclamation IVT). After a 4-hour incubation at 37° C., cells were switched to Maintenance Media (Life Technologies) containing William's Medium E supplemented with 0.5% penicillin/streptomycin, 6.25 g/mL human recombinant insulin, 6.25 μg/mL human transferrin, 6.25 ng/mL selenous acid, 1.25 mg/mL bovine serum albumin, 5.35 μg/mL linoleic acid, 2 mM GlutaMAX, 15 mM HEPES, 0.1 μM dexamethasone, 2% fetal bovine serum, 2% DMSO, and 0.2% Torpedo Antibiotic Mix (Bioreclamation IVT). On the next day, PHH were infected with 500 genome equivalent per cell of genotype D (AD38-derived) HBV in Maintenance Media supplemented with 4% PEG 8000 (Promega). After 24 hour incubation, cells were washed three times with William's Medium E and fed with fresh Maintenance Media. At 3 days after infection, infected PHH cells were seeded on 96-well plates pre-coated with collagen at a density of 65000 cells per well containing serially diluted solutions of certain compounds disclosed herein or DMSO (1% final concentration) in a final volume of 125 μl of Maintenance Media (Life Technologies) containing William's Medium E supplemented with 0.5% penicillin/streptomycin, 6.25 μg/mL human recombinant insulin, 6.25 μg/mL human transferrin, 6.25 ng/mL selenous acid, 1.25 mg/mL bovine serum albumin, 5.35 μg/mL linoleic acid, 2 mM GlutaMAX, 15 mM HEPES, 0.1 μM dexamethasone, 5% fetal bovine serum, 1 mM 1-amininobenzotriaole, and 0.2% Torpedo Antibiotic Mix (Bioreclamation IVT). Media with compounds was replenished every 2-3 days. After an incubation time of 12 days, secreted HBsAg in the supernatant were measured using a multiplex chemiluminescent (Mesoscale discovery, MSD) assay using capture and detection antibody pairs specific for HBsAg. $EC_{50}$ values were calculated from the fit of the dose-response curves to a four-parameter equation and are reported in the following Table 1. Comparative Example 1 and Comparative Example 2 have the following structures and were prepared according to International Publication No. WO 2015/113990.

Comparative Example 1

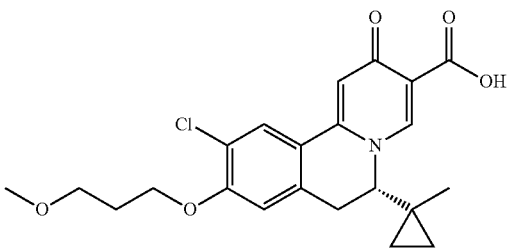

Comparative Example 2

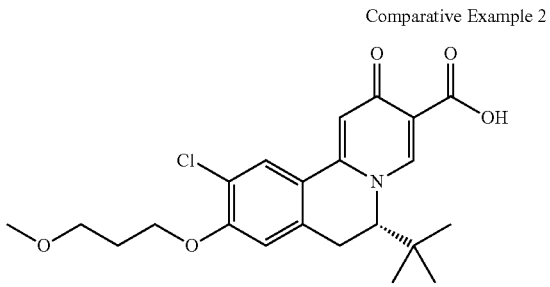

TABLE 1

| Example | HBsAg EC$_{50}$ (nM) |
|---|---|
| 1 | 363 |
| 2 | 3.0 |
| 3 | 3.1 |
| 4 | 11.2 |
| 5 | 4.0 |
| 7 | 6.8 |
| 8 | 11 |
| 10 | 1.6 |
| 12 | 7.7 |
| 13 | 58.8 |
| 14 | 8.7 |
| 15 | 25.3 |
| 16 | 66.9 |
| 17 | 29.5 |
| 18 | 167.6 |
| 19 | 99.2 |
| Comparative Example 1 | 1.8 |
| Comparative Example 2 | 0.5 |

These data suggest that compounds of the instant disclosure inhibit the production and/or secretion of HBsAg.

Example 21: MT-4 Cytotoxicity Assay

The MT-4 cell line (HTLV-1 transformed, human T lymphoblastoid cells) was obtained from the NIH AIDS Reagent program (Bethesda, Md.). MT-4 cells were maintained in RPMI-1640 supplemented with 10% fetal bovine serum (FBS, Hyclone, Logan, Utah). All cell culture media were also supplemented with 100 Units/mL penicillin, 100 µg/mL streptomycin (Gibco). For the MT-4 cytotoxicity assay, 0.4 µL of serially diluted solutions of certain compounds disclosed herein were added to 40 µL of cell maintenance media in 384-well black, solid bottom plate using a Biomek FX workstation (Beckman Coulter). Two thousand cells in 35 µL were added to each well using a Biotek uFlow Workstation (Biotek). Each assay plate contained 10 µM puromycin (final concentration) and 0.5% DMSO in RPMI-1640 as positive and negative controls, respectively. Assay plates were incubated for five days at 37° C. in an incubator set at 5% CO$_2$ and 90% humidity. After five days, 22 µL of Cell Titer Glo reagent (Promega) was added to the assay plates with a Biotek uFlow Workstation. Plates were subsequently placed on a Perkin Elmer Envision Plate Reader for five minutes before the luminescence signal was read. CC$_{50}$ values were calculated by non-linear regression using Pipeline Pilot software by applying a four parameter fit equation (Accelrys, San Diego, Calif.) and are reported in the following Table 2.

TABLE 2

| Example | MT-4 CC$_{50}$ (µM) |
|---|---|
| 1 | 8.9 |
| 2 | >10 |
| 3 | >10 |
| 4 | 8.1 |
| 5 | >10 |
| 6 | >10 |
| 7 | >10 |
| 8 | >10 |
| 9 | >10 |
| 10 | >10 |
| 11 | >10 |
| 12 | 9.3 |
| 13 | 5.2 |
| 14 | >10 |
| 15 | >10 |
| 16 | >10 |
| 17 | >10 |
| 18 | >10 |
| 19 | >10 |
| Comparative Example 1 | 4.2 |
| Comparative Example 2 | 5.7 |

These data suggest that compounds of the instant disclosure are less cytotoxic in the MT-4 assay than the comparator compounds.

Example 22: In Vitro Metabolic Stability

Pooled hepatic microsomes were diluted in 0.1 mM potassium phosphate buffer to 1.0 mg/mL final protein concentration. Alamethicin was added to the microsomal fraction to permeabilize the membrane to allow access of the UDP-glucronic acid (UDPGA) co-substrate to the active site of the UDP glucuronosyl transferase (UGT) enzymes. The final concentration was 25 µg/mL (ratio 25 µg alamethicin/mg microsomal protein) and the microsomes were then placed on ice for 15 min prior to the start of the reaction. Test compound was added to a final concentration of 1 µM. Positive control compounds known to be metabolized by oxidative and UGT enzymes were used. The metabolic reaction was warmed to 37° C. and initiated by the addition of a cofactor mix that consisted of 1.55 mM NADP, 3.3 mM glucose-6-phosphate, 0.4 U/mL glucose-6-phosphate dehydrogenase, 5 mM UDP-glucuronic acid and 3.3 mM MgCl$_2$ all dissolved in 0.1 M potassium phosphate buffer, pH 7.4. At 2, 12, 25, 45, and 65 min, 25 µL aliquots of the reaction mixture were transferred to plates containing 225 µl of quenching solution (acetonitrile containing 300 nM labetalol IS and 0.1% formic acid). After quenching, the plates are centrifuged at 3000×g for 30 minutes to precipitate proteins, and 10 µL aliquots of the supernatant are analyzed by HPLC coupled to a high-resolution mass spectrometer.

For hepatocyte stability incubations, cells were obtained from BioreclamationIVT (Baltimore, Md.), thawed according to the manufacturer's directions, and resuspended to a final concentration of 1×10$^6$ cells/mL in Krebs-Henseleit buffer prewarmed to 37° C. The total cell count and the proportion of viable cells were determined by Trypan Blue dye exclusion using a hemocytometer. The final concentration of test compounds and positive controls was 2 µM. Incubations were carried out in duplicate wells of a 24-well plate out with gentle shaking at 37° C. under a humid atmosphere of 95% air/5% CO$_2$ (v/v). Aliquots (50 µL) were removed after 0, 1, 3, and 6 hours and added to 100 µL quenching solution. Samples were then processed and analyzed in a manner similar to the microsomal stability samples.

Quantification of test compounds and positive controls were performed using analyte/internal standard peak area ratios (PAR) measured on a Q-Exactive mass spectrometer (Thermo Scientific, San Jose, Calif.) coupled to an Aria Transcend LX-4 multiplex UHPLC system (Thermo Scientific, San Jose, Calif.). A Hypersil Gold C18 UHPLC column (1.9 m particle size, 50×2.1 mm) was used with mobile phases A and B consisting of 0.1% formic acid in water and 0.1% formic acid in acetonitrile, respectively. Elution was achieved by a series of linear gradients with increasing proportions of mobile phase B. The mass spectrometer was configured with a heated electrospray source and operated in positive ion mode. Analytes and the MS internal standard peak areas were obtained from full scan high resolution spectra (100-1400 m/z, resolution 70,000) using the exact masses of the compounds (+5 ppm). Half-lives of compounds in the incubations were calculated from extracted data using GMSU/QuickCalc (Gubbs, Inc.) and data are summarized in the following Table 3.

TABLE 3

| Example | Microsome Stability $T_{1/2}$ (min) | | Hepatocyte Stability $T_{1/2}$ (h) | |
|---|---|---|---|---|
| | Rat | Human | Rat | Human |
| 2 | >350 | >350 | >39.5 | 26.6 |
| Comparative Example 1 | 229 | 234 | 7 | 8.9 |
| Comparative Example 2 | 230 | 294 | — | — |

These data suggest that compounds of the instant disclosure have improved in vitro metabolic stability relative to comparator compounds.

Example 23: Pharmacokinetic Analysis Following Oral or Intravenous Administration to Rats Pharmacokinetic analysis was performed on various test compounds following intravenous or oral administration to male Sprague-Dawley rats.

For pharmacokinetic analysis of intravenously administered compounds, the test compounds were formulated in 5% NMP, 30% PG, 45% PEG 300 and 20% water at 0.5 mg/mL for IV infusion. For pharmacokinetic analysis following oral administration, compounds were formulated in the same vehicle and concentration.

Each dosing group consisted of 3 male, naïve Sprague-Dawley rats. At dosing, animals weighed approximately 0.28 kg. The animals were fasted overnight prior to dose administration and up to 4 hr after dosing. For studies of intravenous administration, the test article was administered to the animals by intravenous infusion over 30 min. The rate of infusion was adjusted according to the body weight of each animal to deliver a dose of 1 mg/kg. For studies of oral administration, the test article was administered according to the body weight of each animal to deliver a dose of 5 mg/kg.

For pharmacokinetic analysis of intravenously administered compounds, serial venous blood samples (approximately 0.3 mL each) were taken from each animal at 0, 0.250, 0.483, 0.583, 0.750, 1.50, 3.00, 6.00, 8.00, 12.0, and 24.0 hours after dosing. The blood samples were collected into Vacutainer™ tubes containing EDTA-K2 as the anticoagulant and were immediately placed on wet ice pending centrifugation for plasma. An LC/MS/MS method was used to measure the concentration of the test compound in plasma. An aliquot of 100 µL of each plasma sample was added to a clean 96 well plate, and 400 µL of cold acetonitrile/internal standard solution (ACN)/(ISTD) was added. After protein precipitation, an aliquot of 100 µL of the supernatant was transferred to a clean 96-well plate and diluted with 175 µL of water. An aliquot of 10 µL of the above solution was injected into an ABSciex API-4000 LC/MS/MS system utilizing a HyPurity C18 HPLC column (30×2.1 mm, 3 m; Thermo-Hypersil Part #22103-032130). An Agilent 1200 series binary pump (P/N G1312A Bin Pump) was used for elution and separation, and an HTS Pal autosampler (LEAP Technologies, Carrboro, N.C.) was used for sample injection. A TSQ Quantum Ultra triple quadrupole mass spectrometer was utilized in selective reaction monitoring mode (Applied Biosystems, Foster City, Calif.). Liquid chromatography was performed using two mobile phases: mobile phase A contained 0.1% formic acid and 1% isopropanol in water; and mobile phase B contained 0.1% formic acid and 1% isopropanol in acetonitrile. Non-compartmental pharmacokinetic analysis was performed on the plasma concentration-time data.

The resulting data are shown in the first three columns of Table 4. In Table 4, CL refers to clearance, which characterizes the rate at which drug is removed from plasma. The lower the clearance of a drug is, the longer the elimination half-life is in the body. $V_{ss}$ refers to the steady state volume of distribution and indicates how well a drug is distributed into the tissues. The larger the $V_{ss}$ is, the longer the elimination half-life is in the body. $T_{1/2}$ refers to the terminal plasma half-life of the compound.

For pharmacokinetic analysis of orally administered compounds, serial venous blood samples (approximately 0.3 mL each) were taken from each animal at time points of 0, 0.25, 0.50, 1.0, 2.0, 4.0, 6.0, 8.0, 12.0 and 24.0 hours after dosing. Blood samples were collected, prepared and analyzed in a similar way to the intravenous studies described above. Non-compartmental pharmacokinetic analysis was performed on the plasma concentration-time data. The resulting data are shown in the last three columns of Table 4. In Table 4, F (%) refers to oral bioavailability. $C_{max}$ refers to the peak plasma concentration of the compound after administration. $AUC_{0-24}$ refers to area under the curve for the 0 to 24 hr plasma collection interval and is a measure of total plasma exposure of the indicated compound.

TABLE 4

| Example | CL (L/h/kg) | $V_{ss}$ (L/kg) | $T_{1/2}$ (h) | F (%) | $C_{max}$ (nM) | $AUC_{0-24}$ (nM * h) |
|---|---|---|---|---|---|---|
| 2 | 0.178 | 0.623 | 3.34 | 109 | 6760 | 68600 |
| Comparative Example 1 | 0.340 | 0.570 | 1.62 | 53.8 | 4030 | 22100 |
| Comparative Example 2 | 0.303 | 0.661 | 1.99 | 40.5 | 2430 | 15200 |

These data suggest that compounds of the instant disclosure have improved pharmacokinetic properties relative to comparator compounds. The improvements suggest that compounds disclosed herein may be administered at lower doses and/or less frequently to treat or prevent an HBV infection relative to the comparator compounds.

All of the U.S. patents, U.S. patent application publications, U.S. patent applications, foreign patents, foreign patent applications and non-patent publications referred to in this specification are incorporated herein by reference, in their entirety to the extent not inconsistent with the present description.

The invention claimed is:
1. A compound selected from the group consisting of:
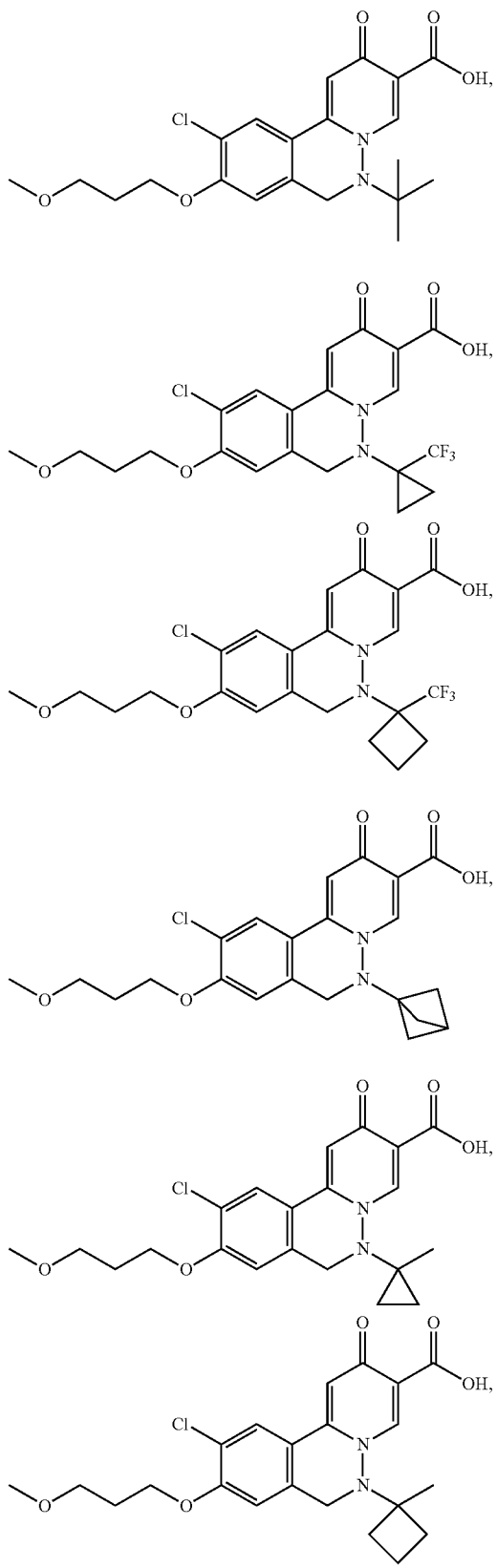
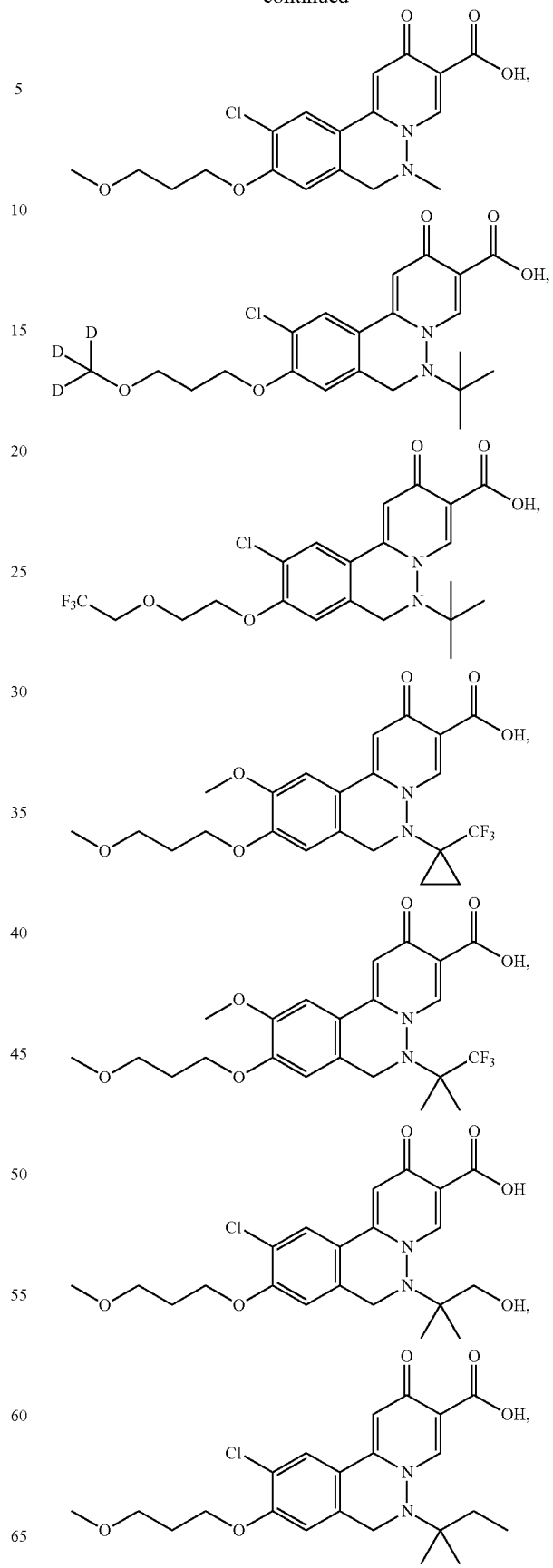

-continued

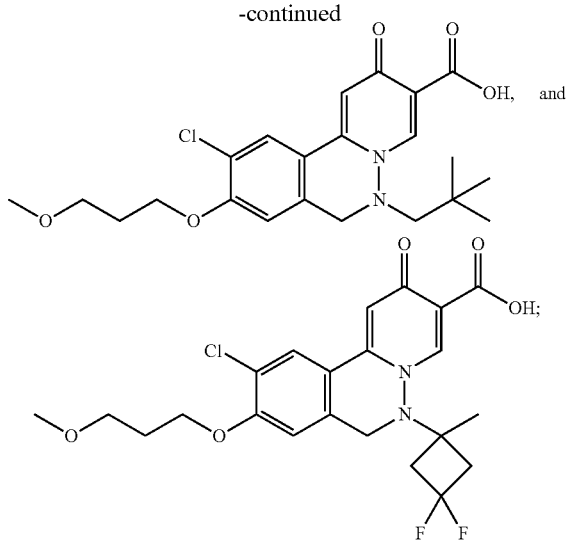

or a pharmaceutically acceptable salt thereof.

2. A compound selected from the group consisting of:

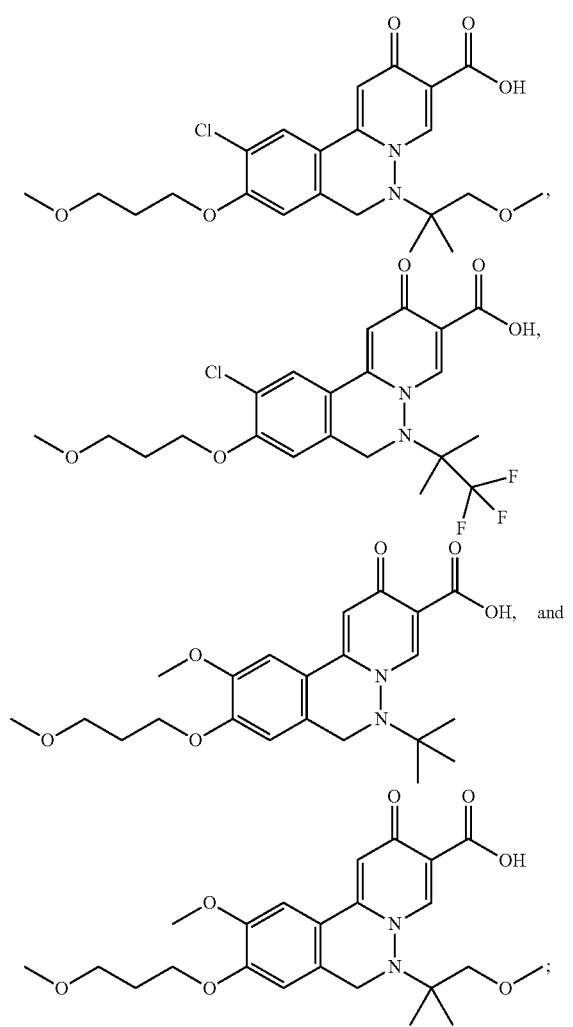

or a pharmaceutically acceptable salt thereof.

3. The compound of claim 1 having the formula:

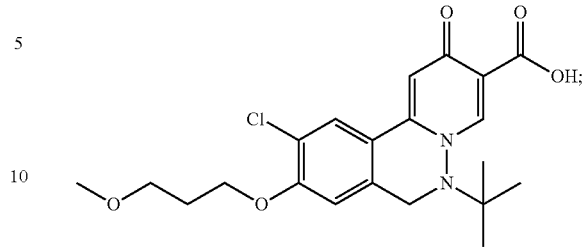

or a pharmaceutically acceptable salt thereof.

4. The compound of claim 1 having the formula:

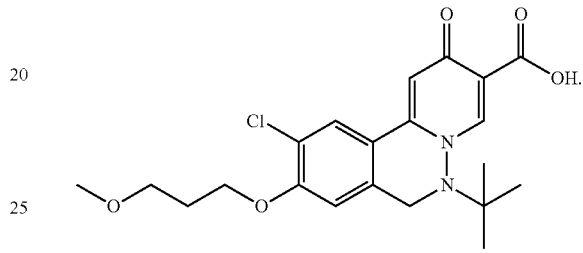

5. The compound of claim 2 having the formula:

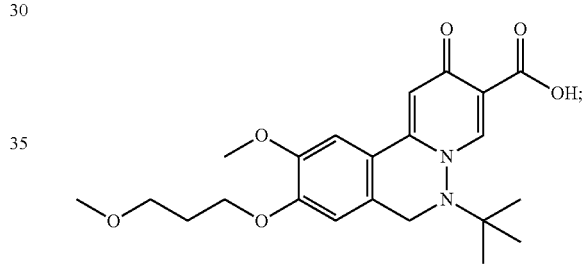

or a pharmaceutically acceptable salt thereof.

6. The compound of claim 2 having the formula:

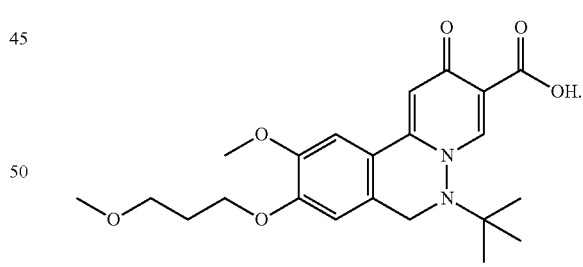

7. A pharmaceutical composition comprising a compound or pharmaceutically acceptable salt of claim 1, and a pharmaceutically acceptable excipient.

8. A method of inhibiting the production and/or secretion of HBsAg in an individual infected with HBV comprising administering a therapeutically effective amount of a compound or pharmaceutically acceptable salt of claim 1 to the individual.

9. A method of treating or preventing an HBV infection comprising administering to an individual in need thereof a therapeutically effective amount of a compound or pharmaceutically acceptable salt of claim 1 to the individual.

* * * * *